June 5, 1962 A. BLAIN ETAL 3,037,606

MACHINE FOR RECORDING AND VERIFYING MAGNETIC TAPE DATA

Filed Sept. 4, 1957 24 Sheets-Sheet 1

INVENTORS
ALBERT BLAIN
HERBERT F. WELSH
LOUIS D. WILSON
EDWIN O. ROGGENSTEIN
SAUL MEYER

BY John J. Lynch

ATTORNEY

MACHINE FOR RECORDING AND VERIFYING MAGNETIC TAPE DATA

Filed Sept. 4, 1957

INVENTORS
ALBERT BLAIN
HERBERT F. WELSH
LOUIS D. WILSON
EDWIN O. ROGGENSTEIN
SAUL MEYER
BY
John J. Lipnch
ATTORNEY June 5, 1962 A. BLAIN ETAL 3,037,606

MACHINE FOR RECORDING AND VERIFYING MAGNETIC TAPE DATA

Filed Sept. 4, 1957 24 Sheets-Sheet 3

INVENTORS
ALBERT BLAIN
HERBERT F. WELSH
LOUIS D. WILSON
EDWIN O. ROGGENSTEIN
SAUL MEYER

BY John J. Lynch

ATTORNEY

MACHINE FOR RECORDING AND VERIFYING MAGNETIC TAPE DATA

Filed Sept. 4, 1957

INVENTORS
ALBERT BLAIN
HERBERT F. WELSH
LOUIS D. WILSON
EDWIN O. ROGGENSTEIN
SAUL MEYER
BY
John J. Lynch
ATTORNEY

MACHINE FOR RECORDING AND VERIFYING MAGNETIC TAPE DATA

Filed Sept. 4, 1957 24 Sheets-Sheet 5

INVENTORS
ALBERT BLAIN
HERBERT F. WELSH
LOUIS D. WILSON
EDWIN O. ROGGENSTEIN
SAUL MEYER
BY
ATTORNEY

MACHINE FOR RECORDING AND VERIFYING MAGNETIC TAPE DATA

Filed Sept. 4, 1957 24 Sheets-Sheet 6

INVENTORS
ALBERT BLAIN
HERBERT F. WELSH
LOUIS D. WILSON
EDWIN O. ROGGENSTEIN
SAUL MEYER
BY
ATTORNEY

MACHINE FOR RECORDING AND VERIFYING MAGNETIC TAPE DATA

Filed Sept. 4, 1957 24 Sheets-Sheet 7

INVENTORS
ALBERT BLAIN
HERBERT F. WELSH
LOUIS D. WILSON
EDWIN O. ROGGENSTEIN
SAUL MEYER
BY
John J. Fynch
ATTORNEY

MACHINE FOR RECORDING AND VERIFYING MAGNETIC TAPE DATA

Filed Sept. 4, 1957

24 Sheets-Sheet 8

INVENTORS
ALBERT BLAIN
HERBERT F. WELSH
LOUIS D. WILSON
EDWIN O. ROGGENSTEIN
SAUL MEYER

BY [signature]
ATTORNEY

INVENTORS
ALBERT BLAIN
HERBERT F. WELSH
LOUIS D. WILSON
EDWIN O. ROGGENSTEIN
SAUL MEYER

BY John J. Lynch

ATTORNEY

INVENTORS
ALBERT BLAIN
HERBERT F. WELSH
LOUIS D. WILSON
EDWIN O. ROGGENSTEIN
SAUL MEYER
BY
John J. Lynch
ATTORNEY

MACHINE FOR RECORDING AND VERIFYING MAGNETIC TAPE DATA

Filed Sept. 4, 1957

INVENTORS
ALBERT BLAIN
HERBERT F. WELSH
LOUIS D. WILSON
EDWIN O. ROGGENSTEIN
SAUL MEYER

BY

ATTORNEY

INVENTORS
ALBERT BLAIN
HERBERT F. WELSH
LOUIS D. WILSON
EDWIN O. ROGGENSTEIN
SAUL MEYER

BY

ATTORNEY

MACHINE FOR RECORDING AND VERIFYING MAGNETIC TAPE DATA

Filed Sept. 4, 1957 24 Sheets-Sheet 13

INVENTORS
ALBERT BLAIN
HERBERT F. WELSH
LOUIS D. WILSON
EDWIN O. ROGGENSTEIN
SAUL MEYER
BY
John J. Lynch
ATTORNEY

MACHINE FOR RECORDING AND VERIFYING MAGNETIC TAPE DATA

INVENTORS
ALBERT BLAIN
HERBERT F. WELSH
LOUIS D. WILSON
EDWIN O. ROGGENSTEIN
SAUL MEYER

BY John J. [signature]

ATTORNEY

MACHINE FOR RECORDING AND VERIFYING MAGNETIC TAPE DATA

Filed Sept. 4, 1957 24 Sheets-Sheet 15

INVENTORS
ALBERT BLAIN
HERBERT F. WELSH
LOUIS D. WILSON
EDWIN O. ROGGENSTEIN
SAUL MEYER
BY
John J. [signature]
ATTORNEY June 5, 1962 A. BLAIN ETAL 3,037,606

MACHINE FOR RECORDING AND VERIFYING MAGNETIC TAPE DATA

Filed Sept. 4, 1957 24 Sheets-Sheet 16

INVENTORS
ALBERT BLAIN
HERBERT F. WELSH
LOUIS D. WILSON
EDWIN O. ROGGENSTEIN
SAUL MEYER

BY John J. Lynch
ATTORNEY

MACHINE FOR RECORDING AND VERIFYING MAGNETIC TAPE DATA

Filed Sept. 4, 1957 24 Sheets-Sheet 17

INVENTORS
ALBERT BLAIN
HERBERT F. WELSH
LOUIS D. WILSON
EDWIN O. ROGGENSTEIN
SAUL MEYER
BY
John J. Lynch
ATTORNEY

MACHINE FOR RECORDING AND VERIFYING MAGNETIC TAPE DATA

Filed Sept. 4, 1957 24 Sheets-Sheet 18

INVENTORS
ALBERT BLAIN
HERBERT F. WELSH
LOUIS D. WILSON
EDWIN O. ROGGENSTEIN
SAUL MEYER
BY [signature]
ATTORNEY INVENTORS
ALBERT BLAIN
HERBERT F. WELSH
LOUIS D. WILSON
EDWIN O. ROGGENSTEIN
SAUL MEYER
BY
ATTORNEY June 5, 1962 A. BLAIN ETAL 3,037,606

MACHINE FOR RECORDING AND VERIFYING MAGNETIC TAPE DATA

Filed Sept. 4, 1957 24 Sheets-Sheet 20

INVENTORS
ALBERT BLAIN
HERBERT F. WELSH
LOUIS D. WILSON
EDWIN O. ROGGENSTEIN
SAUL MEYER

BY John J. Lynch
ATTORNEY

INVENTORS
ALBERT BLAIN
HERBERT F. WELSH
LOUIS D. WILSON
EDWIN O. ROGGENSTEIN
SAUL MEYER
BY
ATTORNEY

INVENTORS
ALBERT BLAIN
HERBERT F. WELSH
LOUIS D. WILSON
EDWIN O. ROGGENSTEIN
SAUL MEYER
BY [signature]
ATTORNEY

MACHINE FOR RECORDING AND VERIFYING MAGNETIC TAPE DATA

INVENTORS
ALBERT BLAIN
HERBERT F. WELSH
LOUIS D. WILSON
EDWIN O. ROGGENSTEIN
SAUL MEYER
BY [signature]
ATTORNEY INVENTORS
ALBERT BLAIN
HERBERT F. WELSH
LOUIS D. WILSON
EDWIN O. ROGGENSTEIN
SAUL MEYER
BY John J. Lynch
ATTORNEY 3,037,606

MACHINE FOR RECORDING AND VERIFYING MAGNETIC TAPE DATA

Albert Blain, Herbert F. Welsh, Louis D. Wilson, and Saul Meyer, Philadelphia, Pa., and Edwin O. Roggenstein, Stamford, Conn., assignors to Sperry Rand Corporation, New York, N.Y., a corporation of Delaware Filed Sept. 4, 1957, Ser. No. 681,950

29 Claims. (Cl. 197—1)

This invention relates to a machine for use in printing, verifying and correcting data carried by a tape, as employed in computing machines and systems of the electronic type.

The data to be entered in high speed, automatic, electronic controlled devices is prepared in advance on tapes so that large quantities of the data, programming instructions, formulas and the like, can be supplied to the devices in a minimum of time. Various forms of tape controls and means for entering data on the tape, are illustrated in Patent No. 2,938,952 granted May 31, 1960, and Patent No. 2,874,369 granted February 17, 1959, wherein the operator of a typewriter can prepare a visual record of the data at the same time that it is being entered on the tape, in code form, by an entry head of the magnetic type shown in Patent No. 2,686,100 to J. P. Eckert, Jr., et al. as controlled from the keyboard.

This invention has for one of its objects the production of a machine for decoding and printing data from a tape automatically so that a readable record can be made without the need of a skilled operator.

Another object is the provision of a machine adjustable to receive the data from a tape for comparison with the simultaneous typing of the same data performed by an operator for verification purposes.

A further object is to provide a machine in which errors, found in the data during verification, can be corrected by the operator from the keyboard without manual adjustment of the tape.

Other objects of the invention include the provision of means for decoding the data received from a tape; encoding the correct data to be applied to the tape; operatively associating the keyboard of a typewriter with the decoding or encoding means, selectively; identifying the operations of printing and verifying by a change in the color of the data being typed; providing a decoding device that can operate as a unit without employing power operated parts such as a clutch, reduction gearing and pulleys; adapting said decoding mechanism to a typewriter for printing data from magnetic or punched tapes and through which decoder upper and lower case data can be detected to eliminate the necessity of using extra or special code symbols in the tape for this purpose; and conditioning the machine for regular manual typing without using either of the encoding or decoding mechanisms and the control means associated therewith.

Other objects and advantages of the invention will be apparent during the course of the following description.

In the accompanying drawings, forming a part of this specification, and in which like numerals are employed to designate like parts throughout the same;

Figure 4:
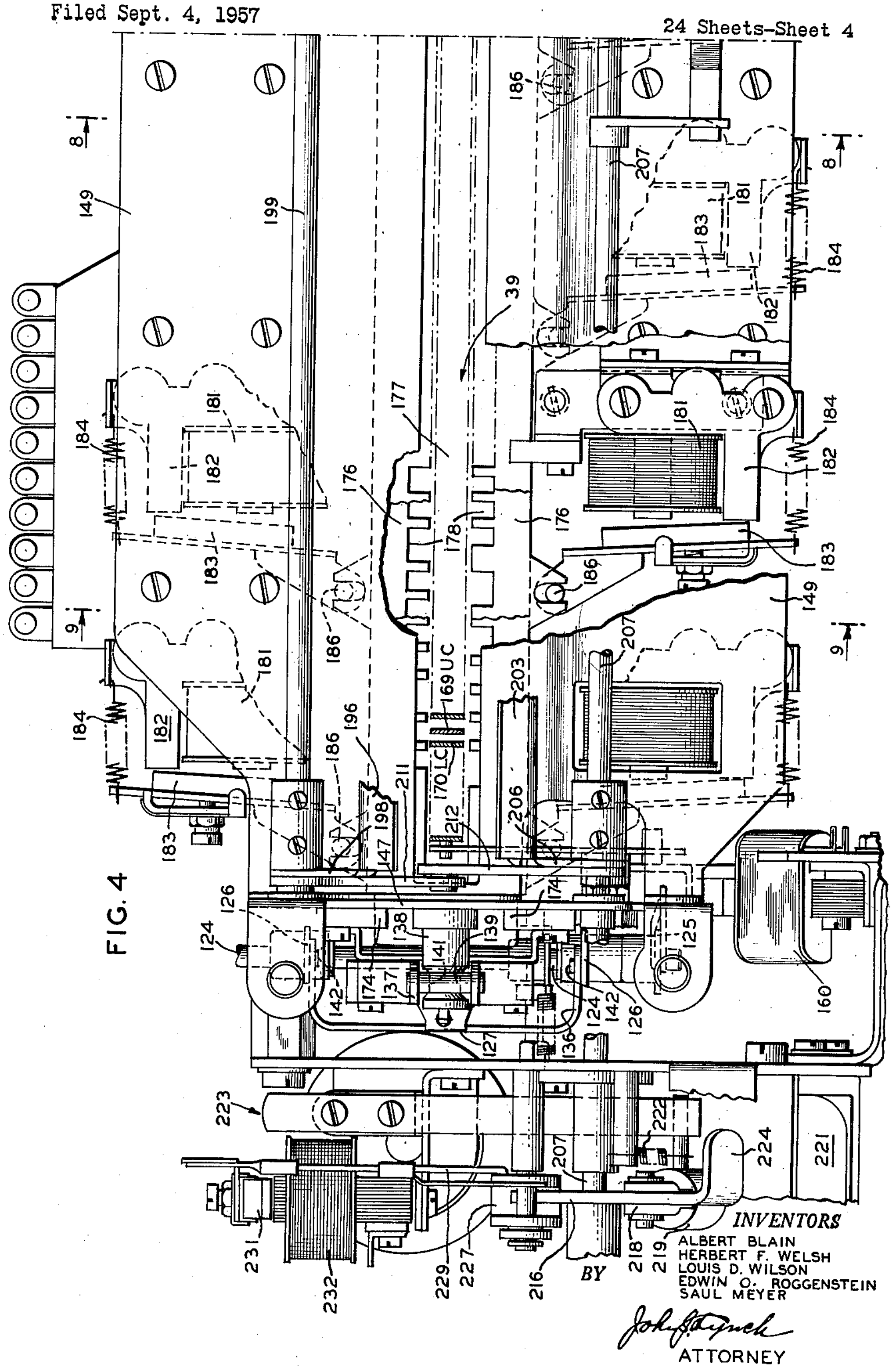
Figures 4A, 6:
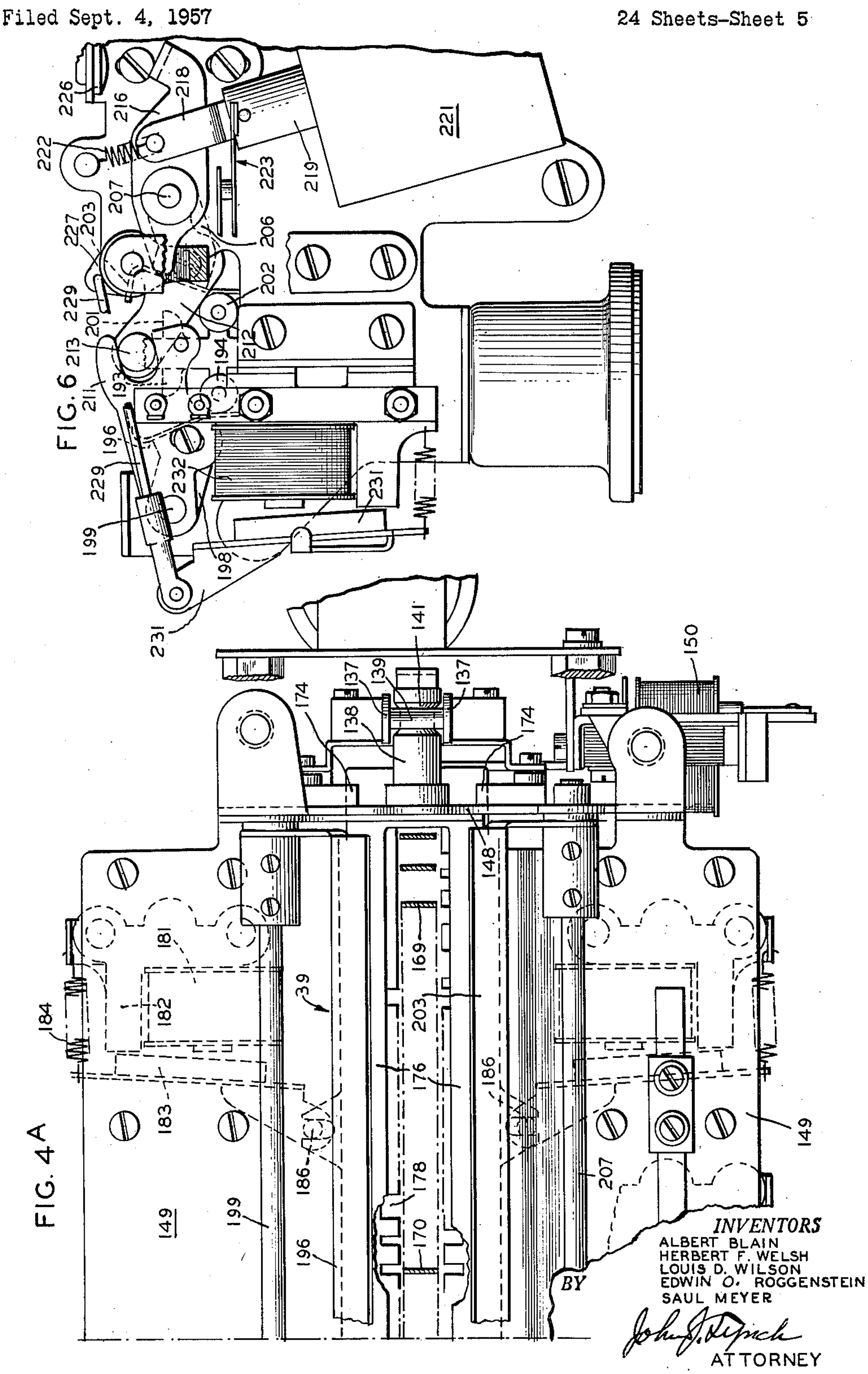
Figure 5:
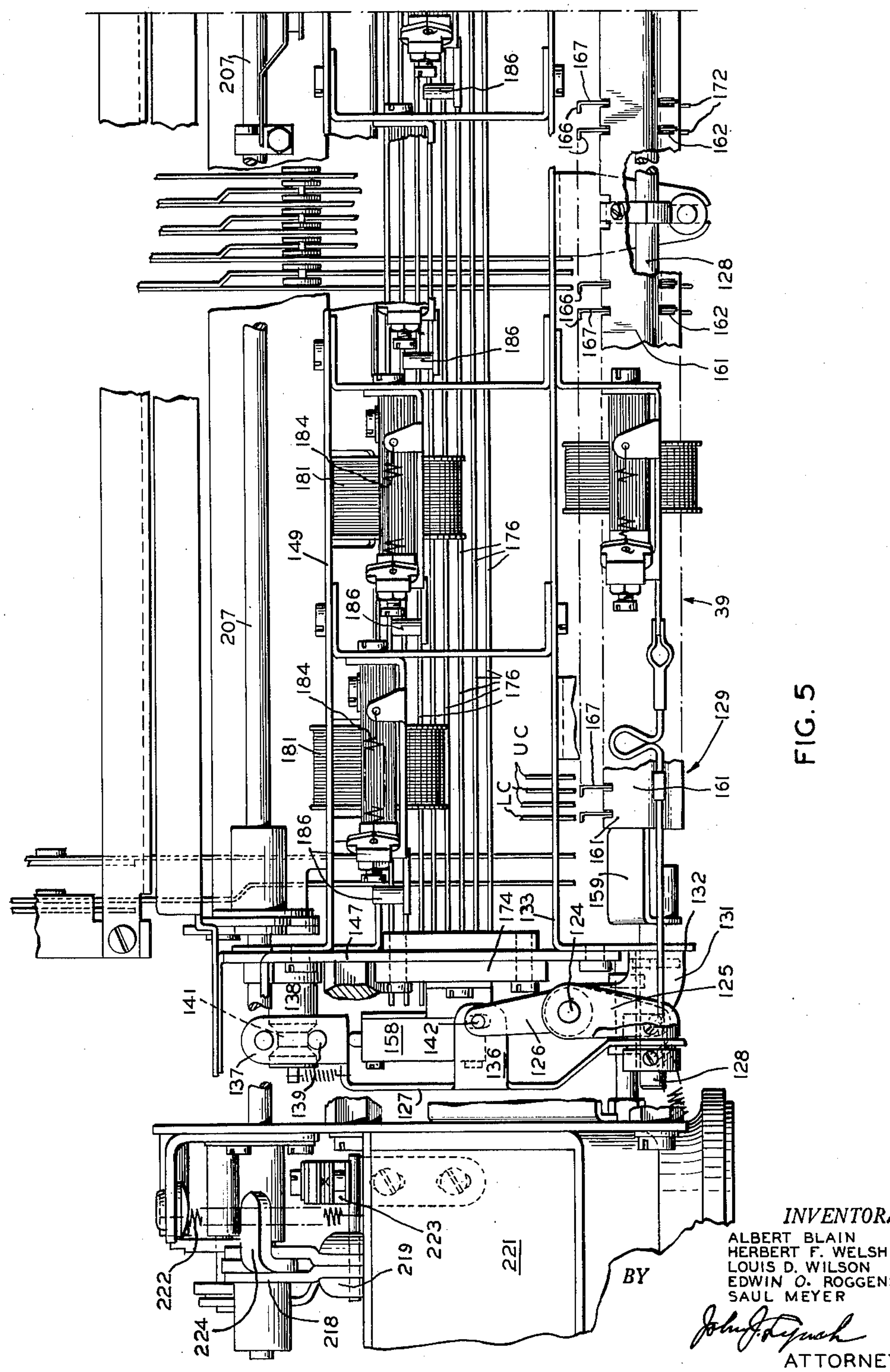
Figures 5A, 7:
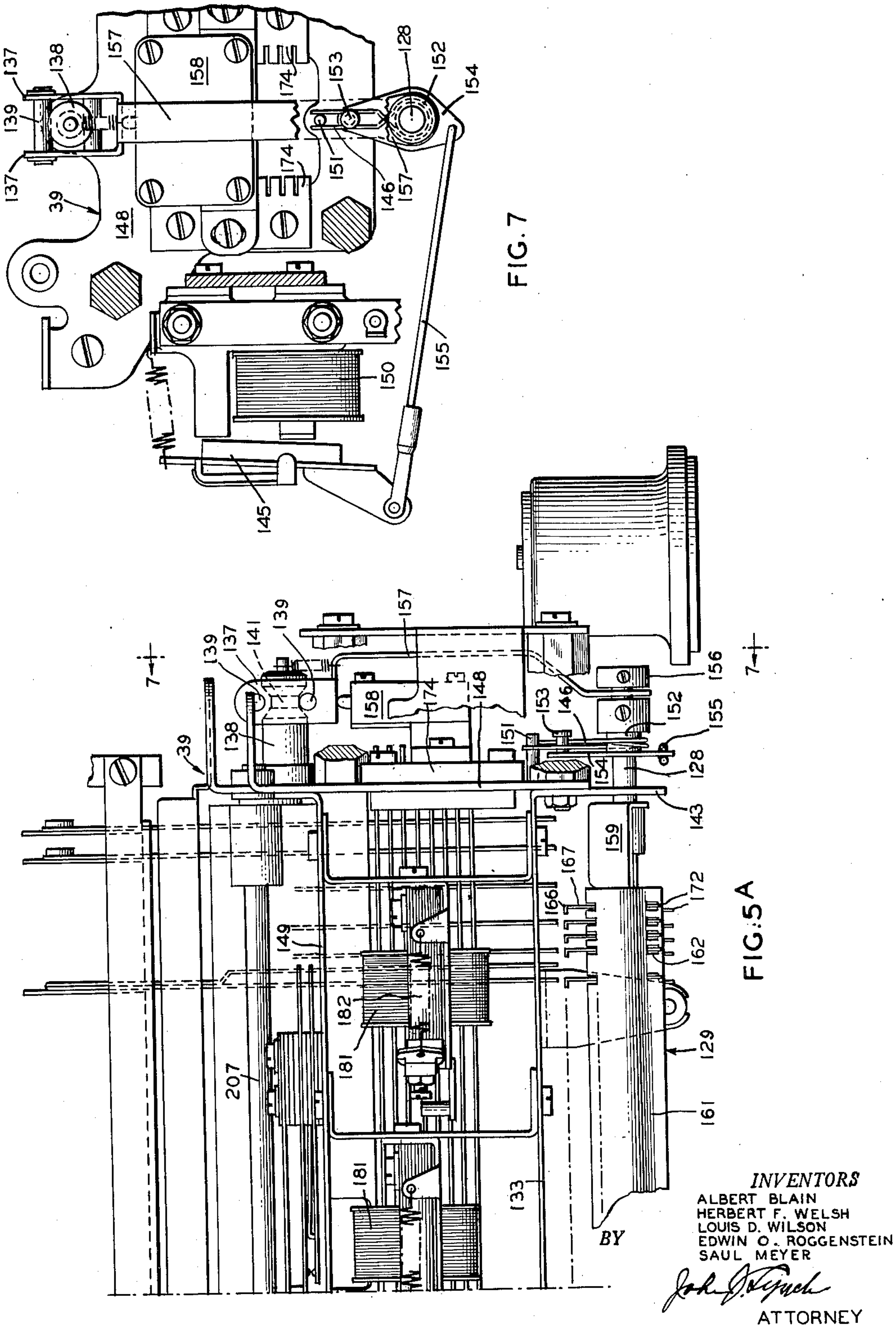
Figures 8, 9:
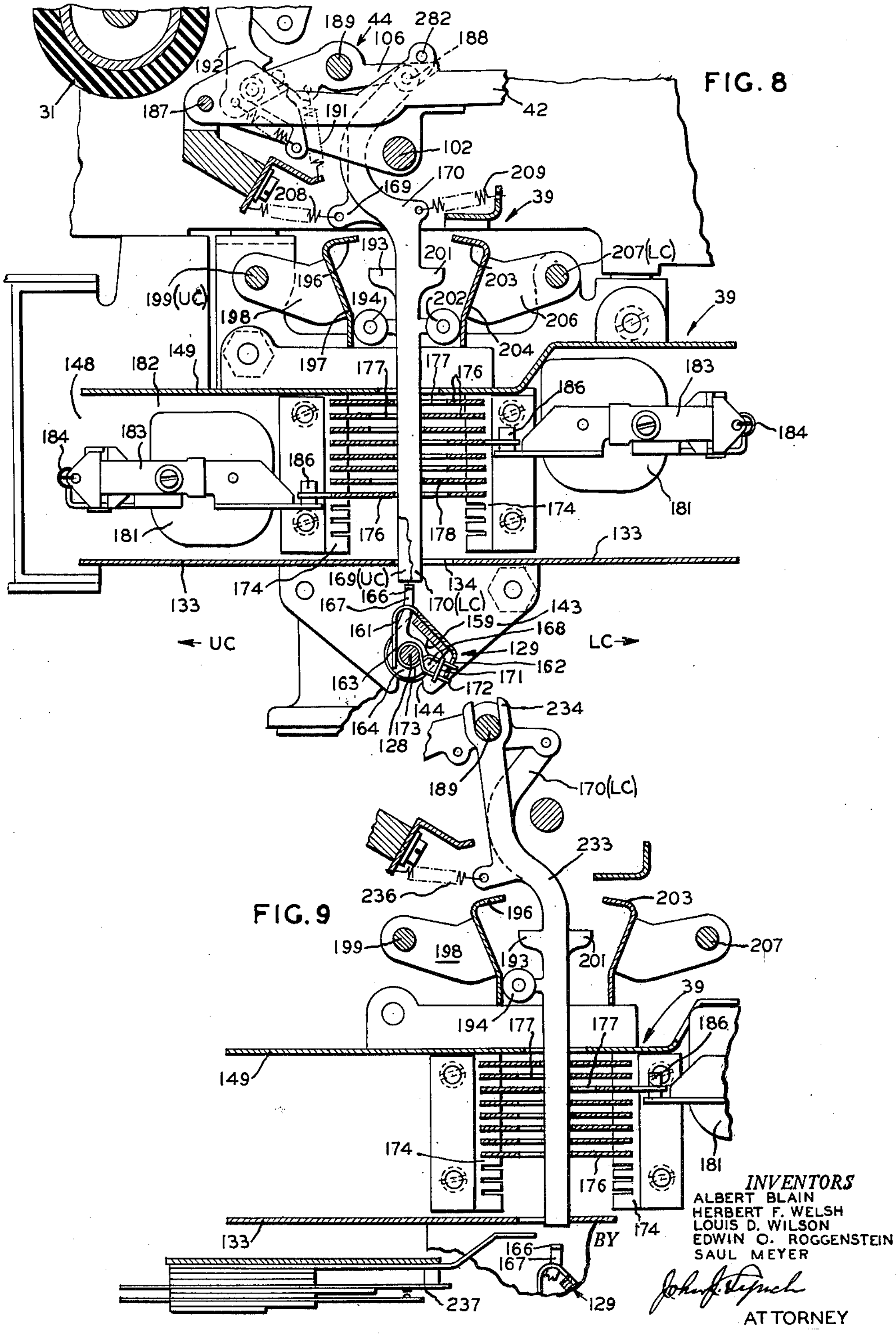
Figures 10, 11:
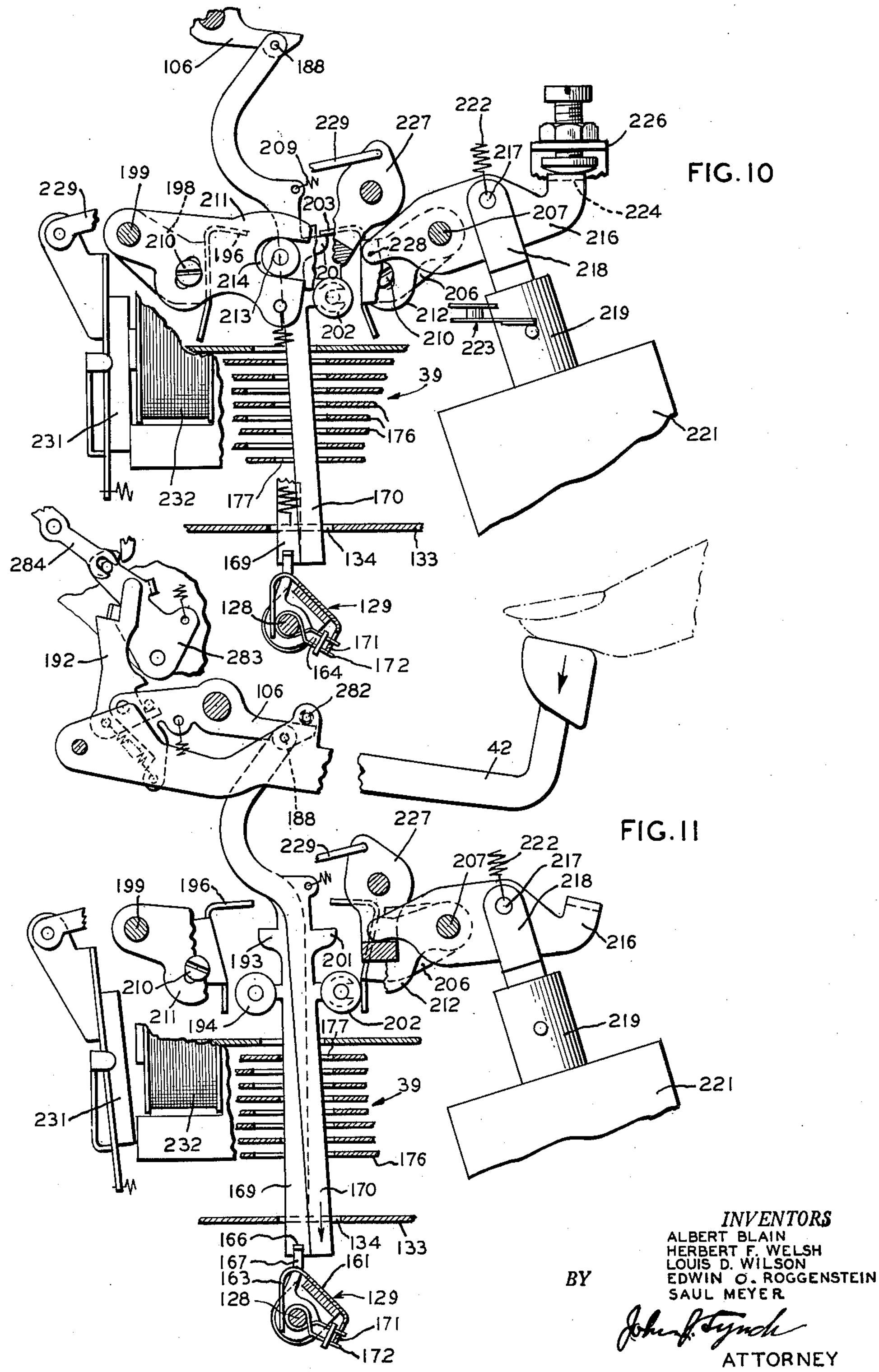
Figure 12:
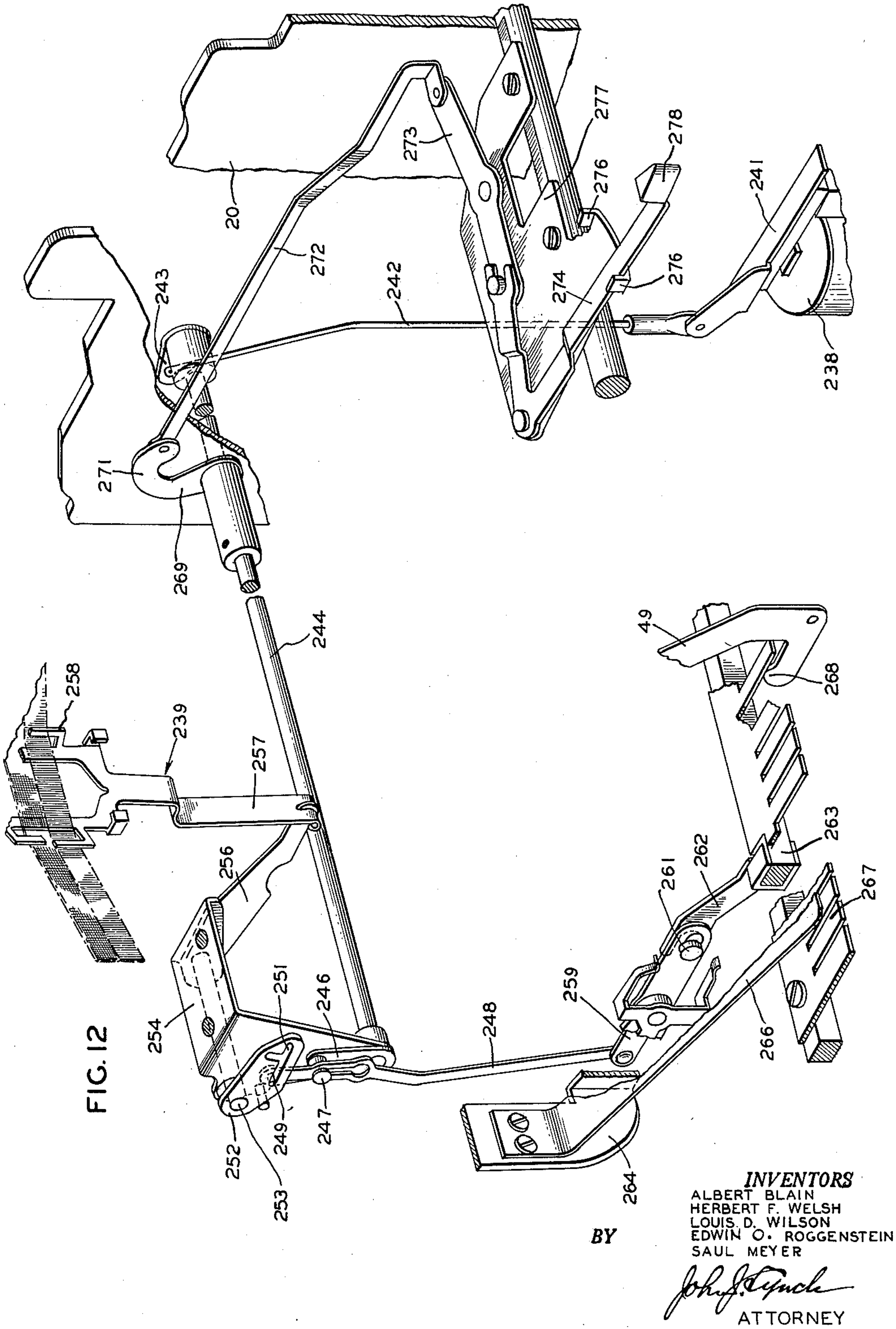
Figures 13, 14, 15:
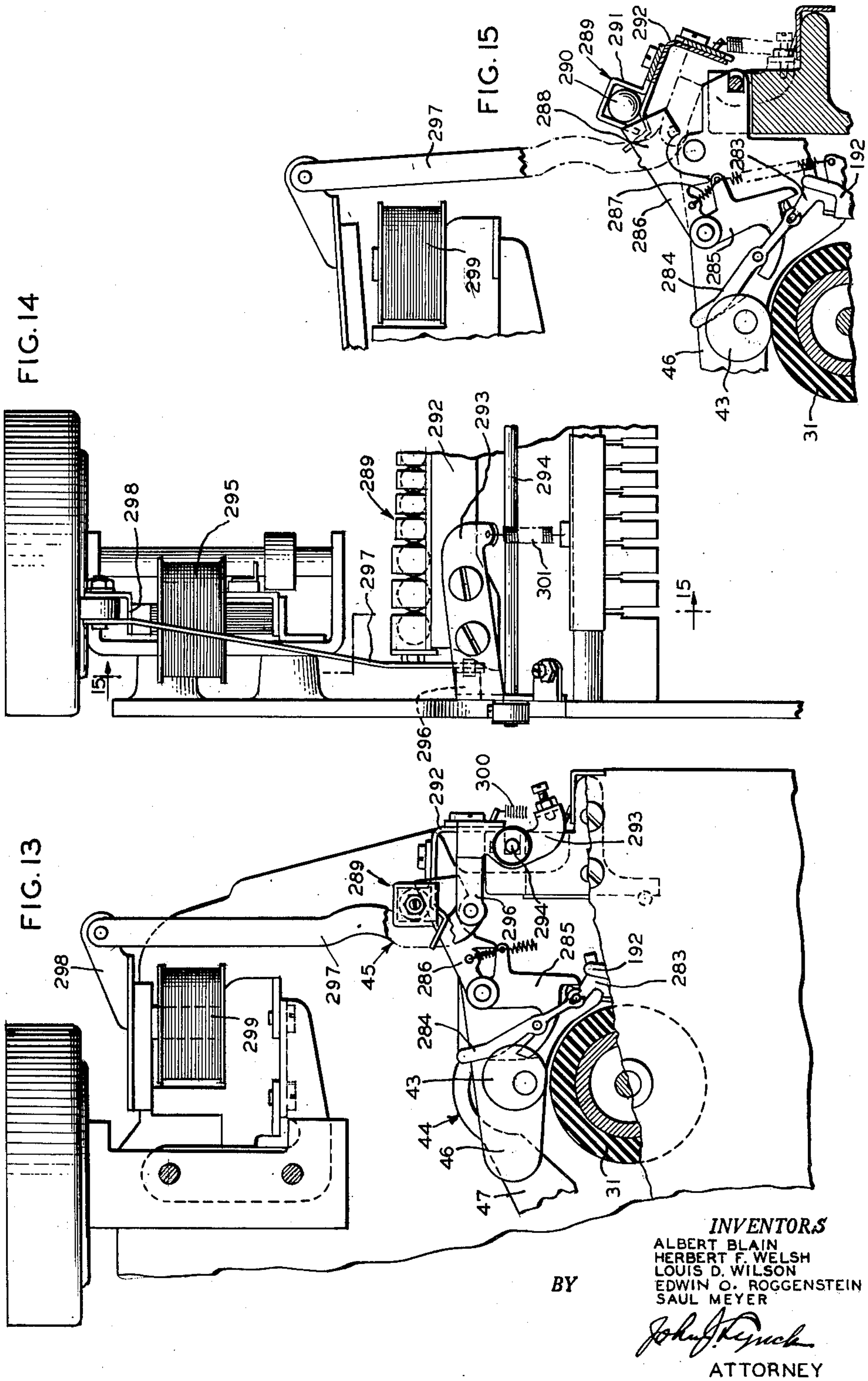
Figure 16:
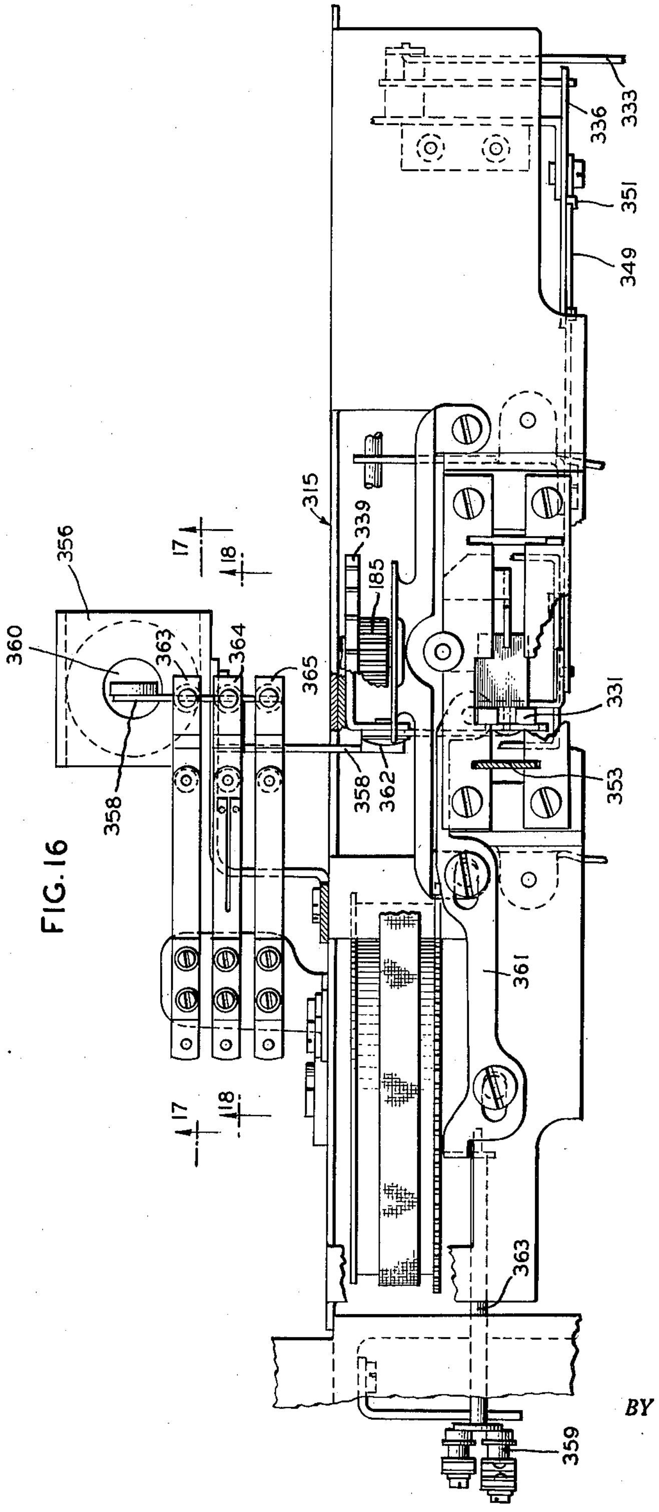
Figure 18:
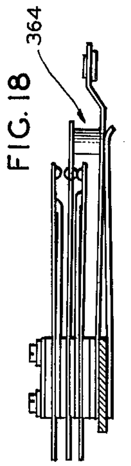
Figure 17:
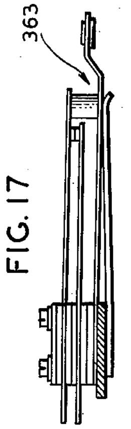
Figures 19, 19A:
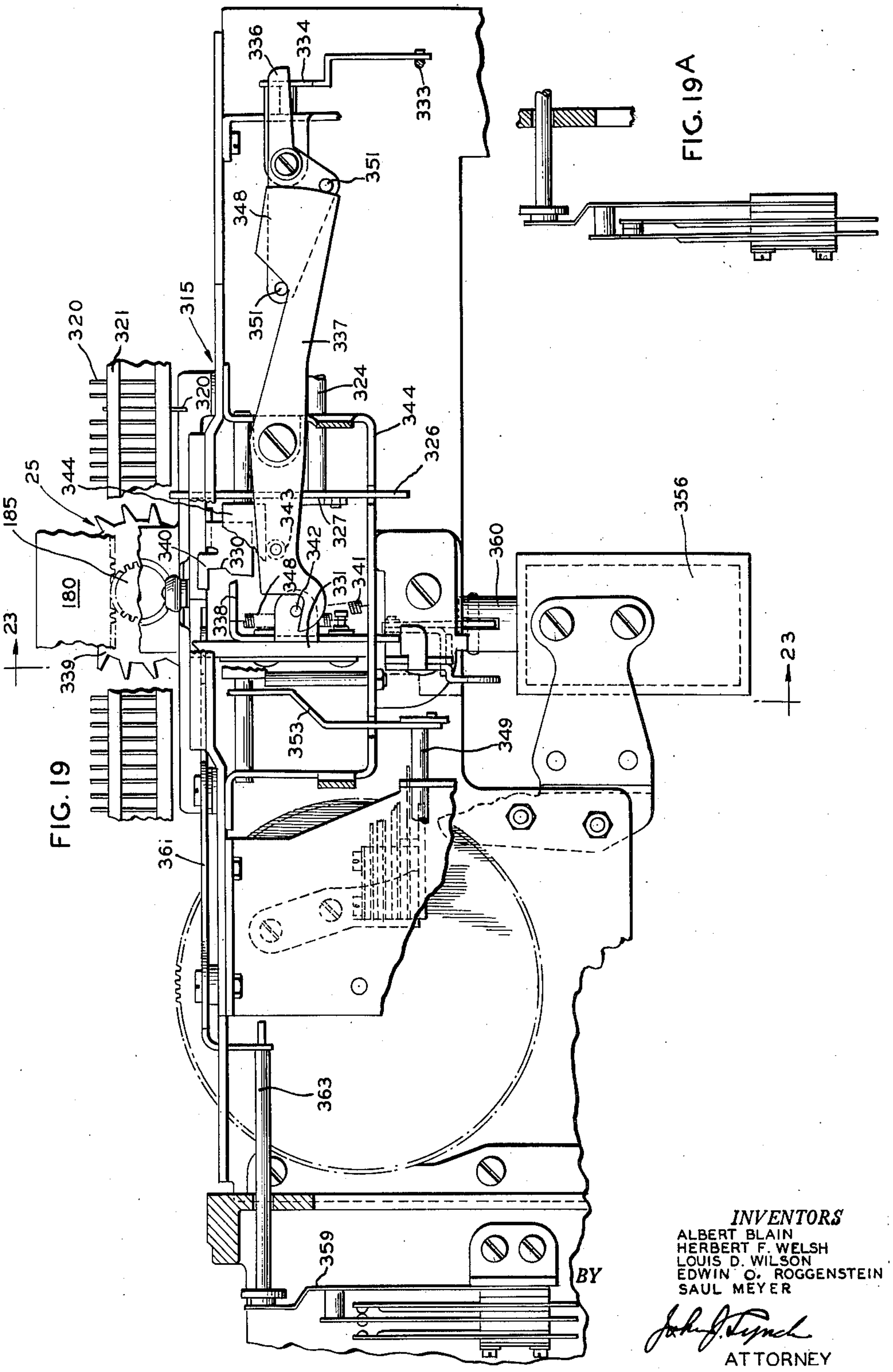
Figure 20:
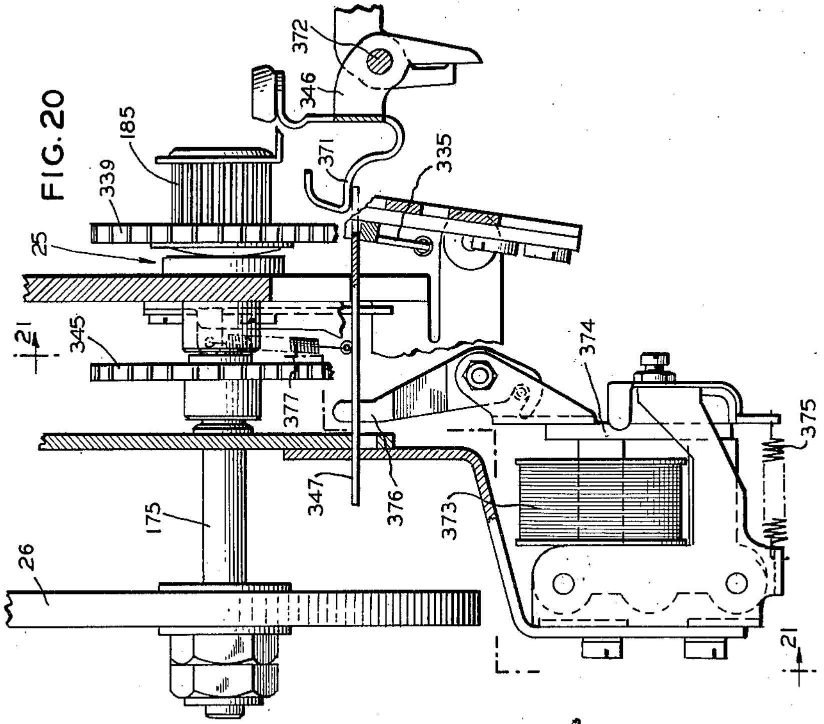
Figures 21, 22:
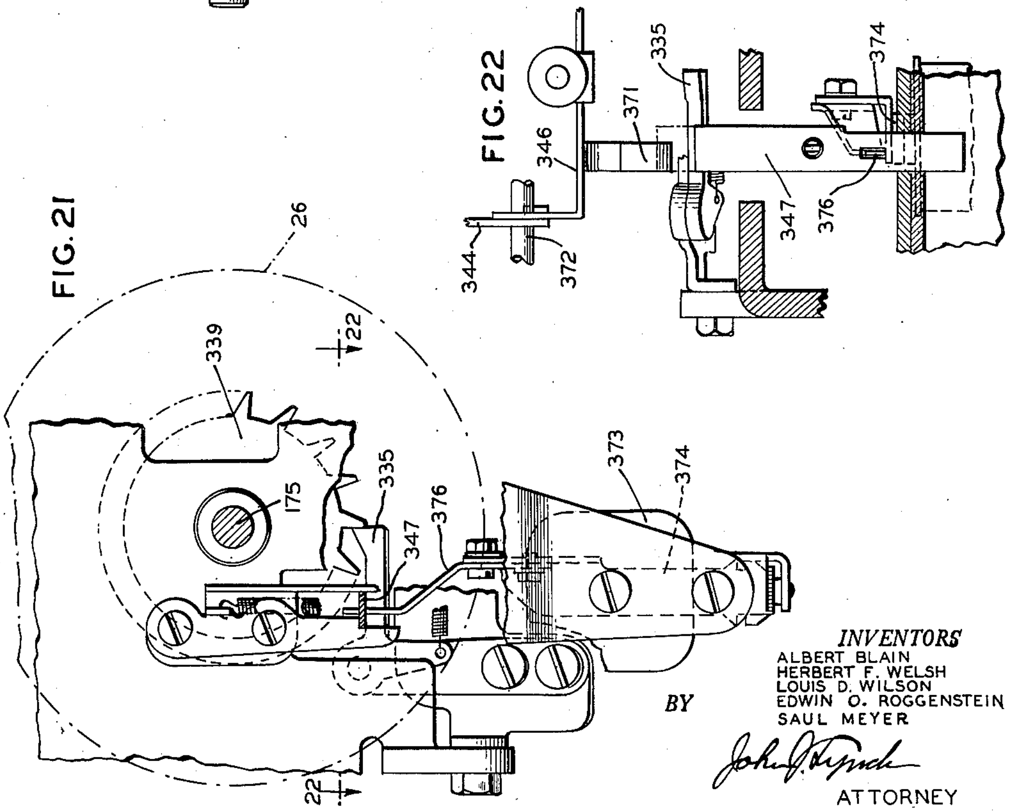
Figure 23:
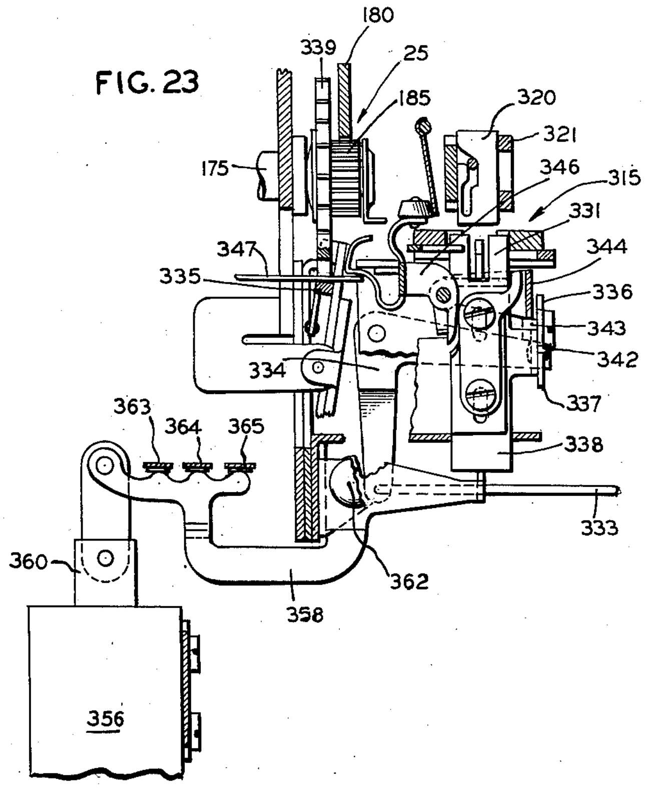
Figures 24, 25A:
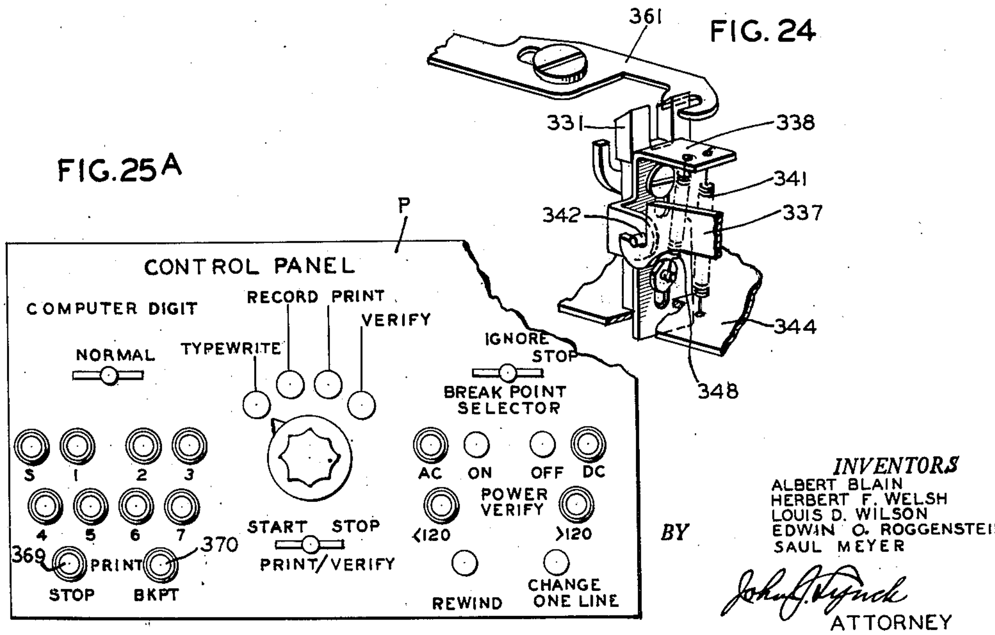
Figure 25:
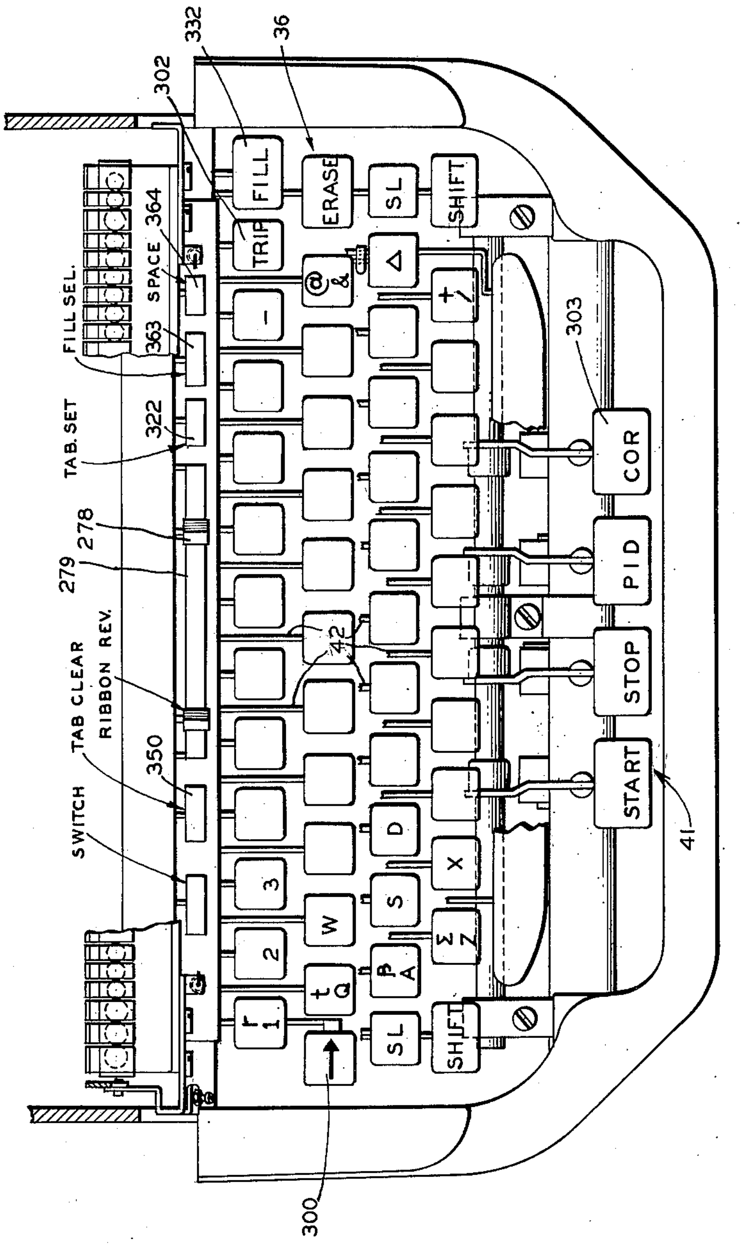
Figures 26, 27, 28:
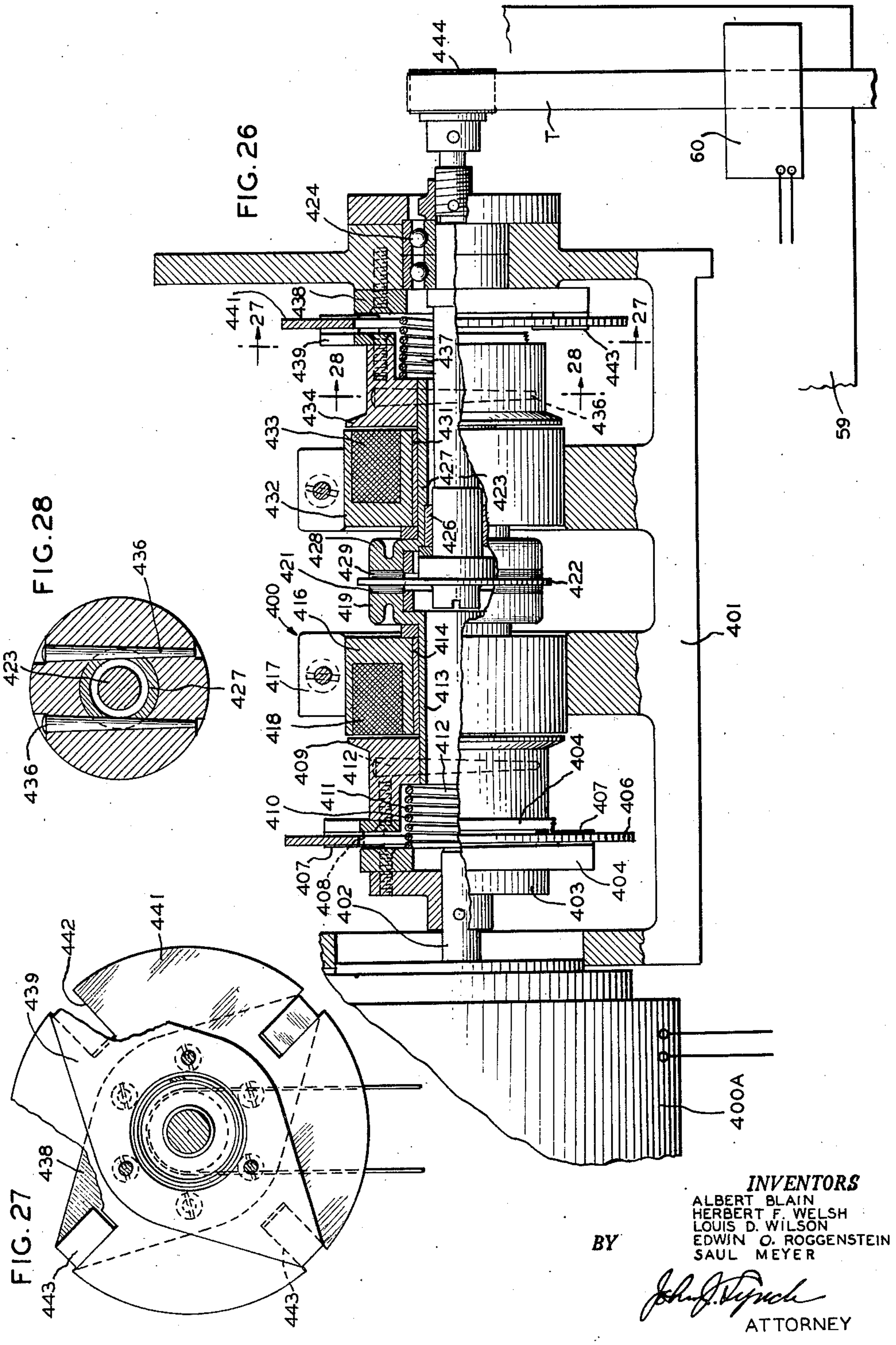
Figure 29:
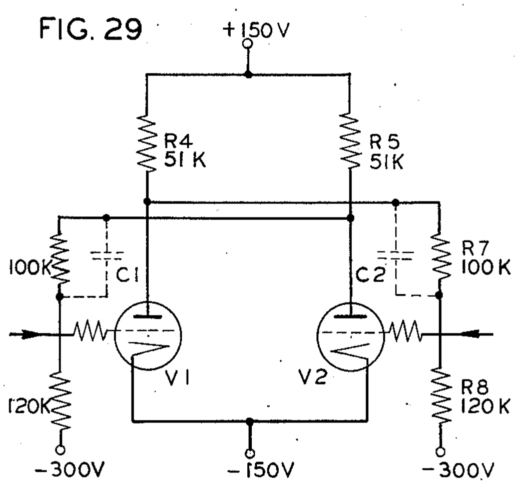
Figure 30:
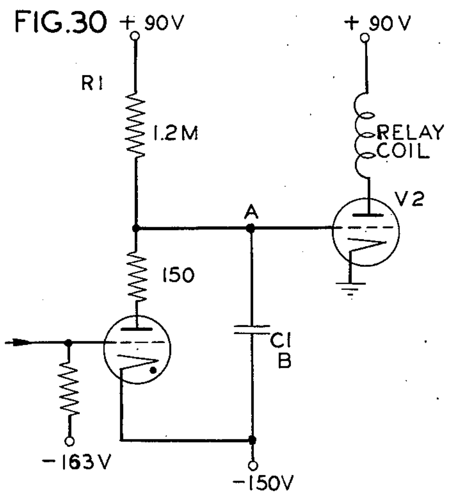
Figures 31, 32:
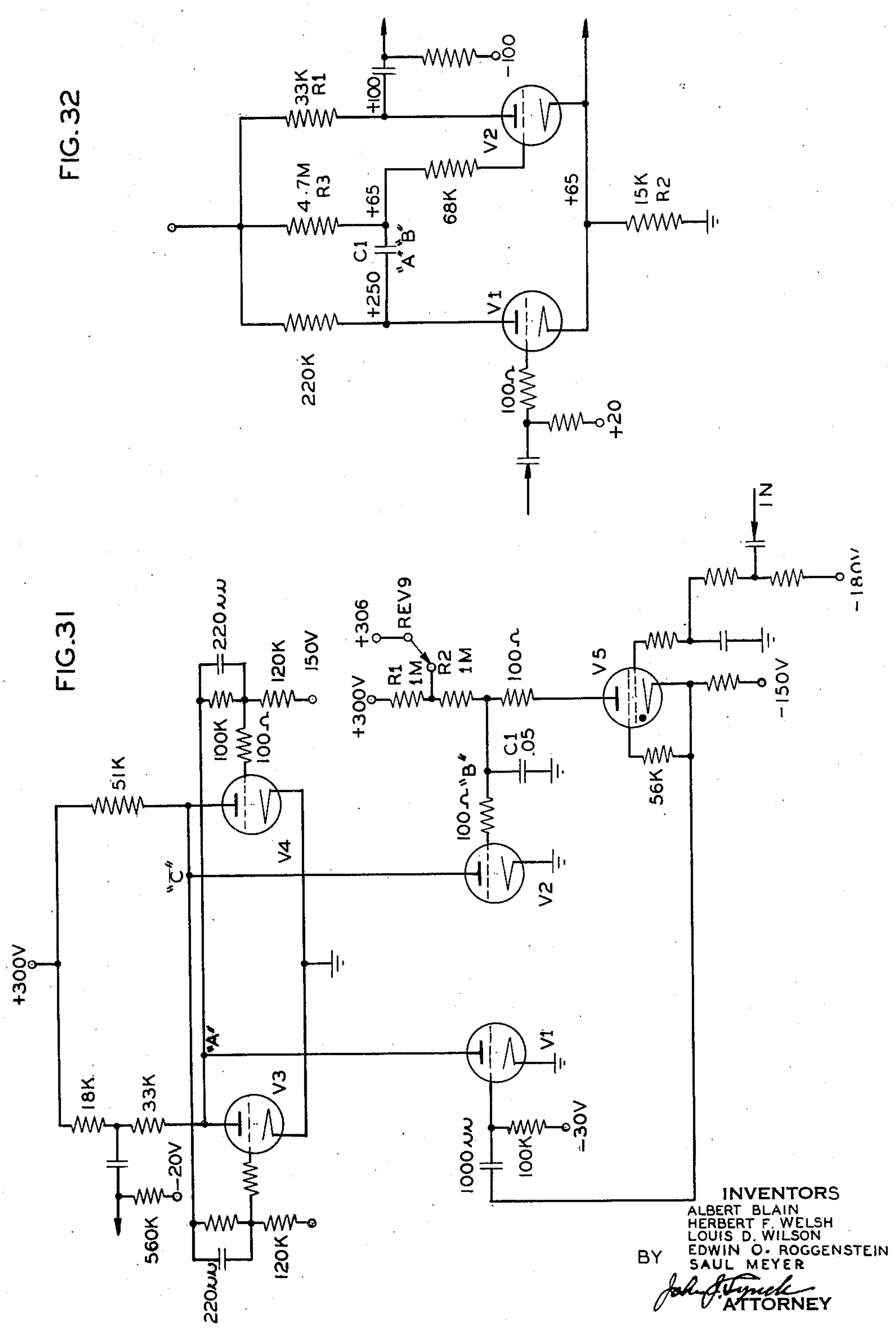

FIGS. 4 and 4A combine to form a plan view of the decoding unit;

FIGS. 5 and 5A combine to form a view in front elevation of the decoding unit shown in FIGS. 4 and 4A;

FIG. 6 is a view in elevation looking toward the left end of FIG. 5;

FIG. 7 is a view in vertical section taken on the line 7—7 of FIG. 5A;

FIG. 8 is a view in vertical section taken substantially on the line 8—8 of FIG. 4 showing the upper and lower case sensing arms;

FIG. 9 is a view in vertical section taken on the line 9—9 of FIG. 4 showing other sensing arms employed in the decoding mechanism;

FIG. 10 is a diagrammatic view of the decoding mechanism showing some of the parts in the position assumed during a printing operation;

FIG. 11 is a view similar to FIG. 10 showing a key in depressed position during a verifying operation;

FIG. 12 is a view in perspective of the ribbon vibrator and color-shift mechanism, adjusted to cause typing to be done in red when the machine is performing a verifying operation;

FIG. 13 is a fragmentary view in sectional elevation showing a key lock means in operative position;

FIG. 14 is a front view in elevation of the mechanism shown in FIG. 13;

FIG. 15 is a fragmentary view of the mechanism shown in FIG. 13 adjusted to non-operating position;

FIG. 16 is a plan view of the tabulating mechanism of the machine and circuit control means associated therewith;

FIG. 17 is a section taken on the line 17—17 of FIG. 16 showing one of a group of control switches;

FIG. 18 is a section taken on the line 18—18 of FIG. 16 showing another one of the control switches;

FIG. 19 is a view in front sectional elevation of the tabulating mechanism of FIG. 16, for controlling the movement of the carriage;

FIG. 19A is a side view of one of the switches shown in FIG. 16;

FIG. 20 is a view in sectional elevation of a part of the carriage letter space control mechanism and auxiliary control means therefor;

FIG. 21 is a section taken on the line 21—21 of FIG. 20;

FIG. 22 is a section taken on the line 22—22 of FIG. 21;

FIG. 23 is a vertical section through FIG. 19 taken on the line 23—23 showing the relative location of the control mechanism;

FIG. 24 is a detail view in perspective of a portion of the tabulating control mechanism shown in FIGS. 16 and 19;

FIG. 25 is a plan view of the keyboard of the machine showing the circuit control keys;

FIG. 25A is a face view of a control panel;

FIG. 26 is a view in sectional elevation taken through a clutch used for precise control of the movements of a tape used in the machine;

FIG. 27 is a section taken on the line 27—27 of FIG. 26 showing the arrangement of the interfitting drive plates used in the clutch;

FIG. 28 is a section taken on the line 28—28 of FIG. 26 showing the means for fastening the drive parts together;

FIG. 29 is a schematic showing of a flip-flop type circuit component utilized in the machine;

FIG. 30 is a schematic diagram of a circuit utilized in the machine and conveniently referred to as a resettable delay-flop;

FIG. 31 is a diagram of another form of delay flop which provides a sharp, well defined output;

FIG. 32 shows a univibrator utilized in the machine and conveniently referred to as a delay flop;

FIGS. 33A–36 show typical gate circuits utilized in the machine; and

Figure 38:
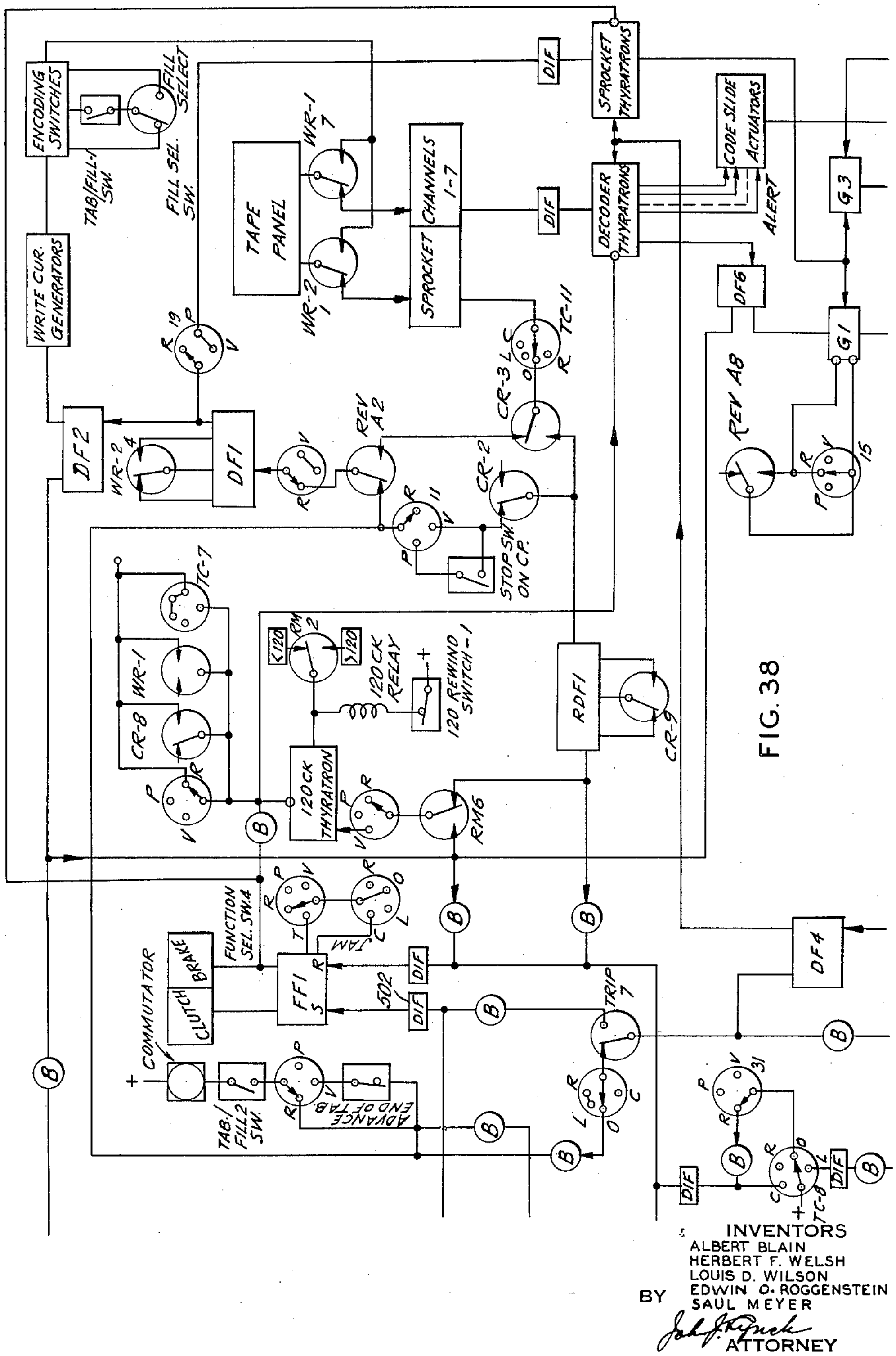
Figure 39:
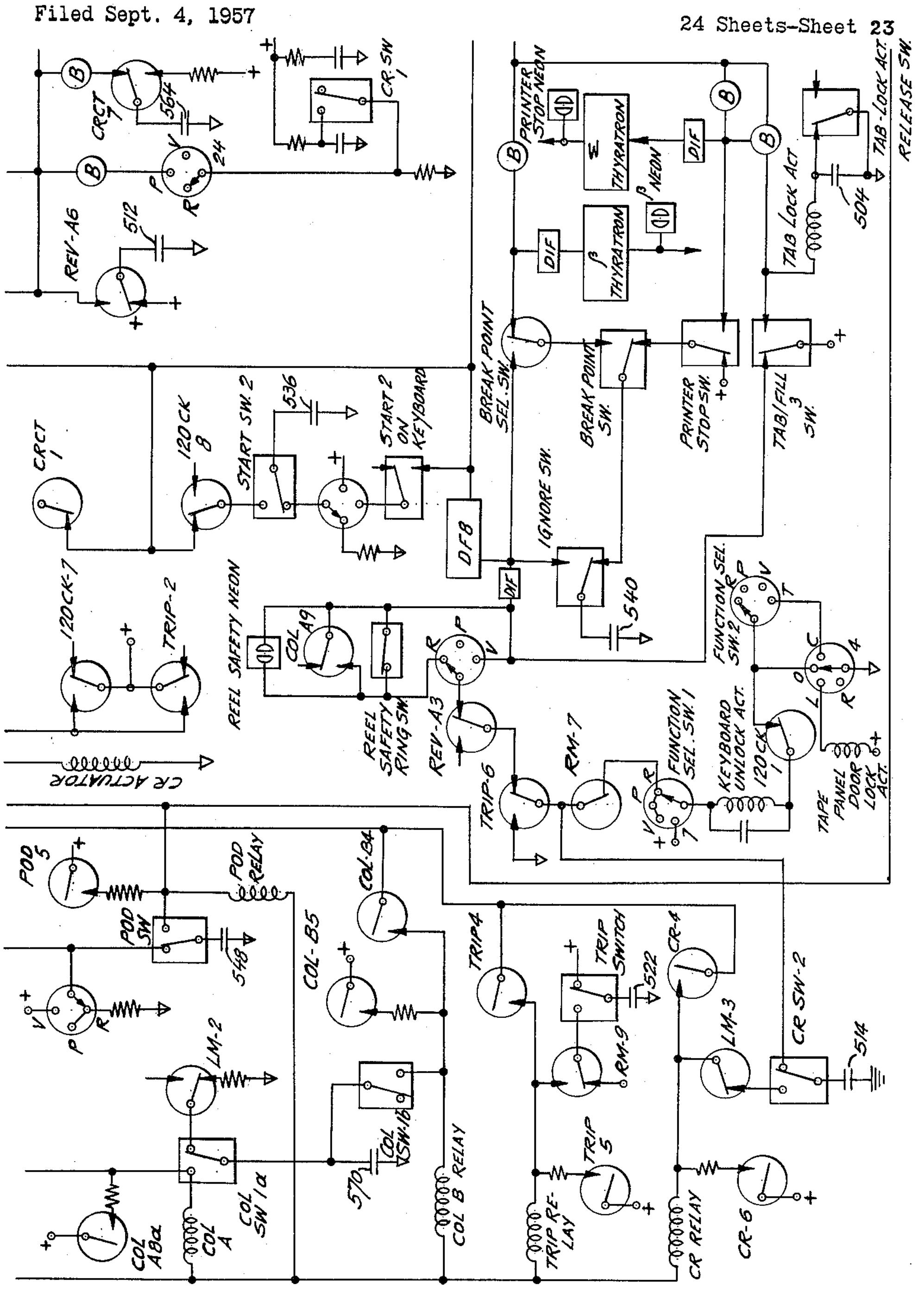
Figures 40, 41:
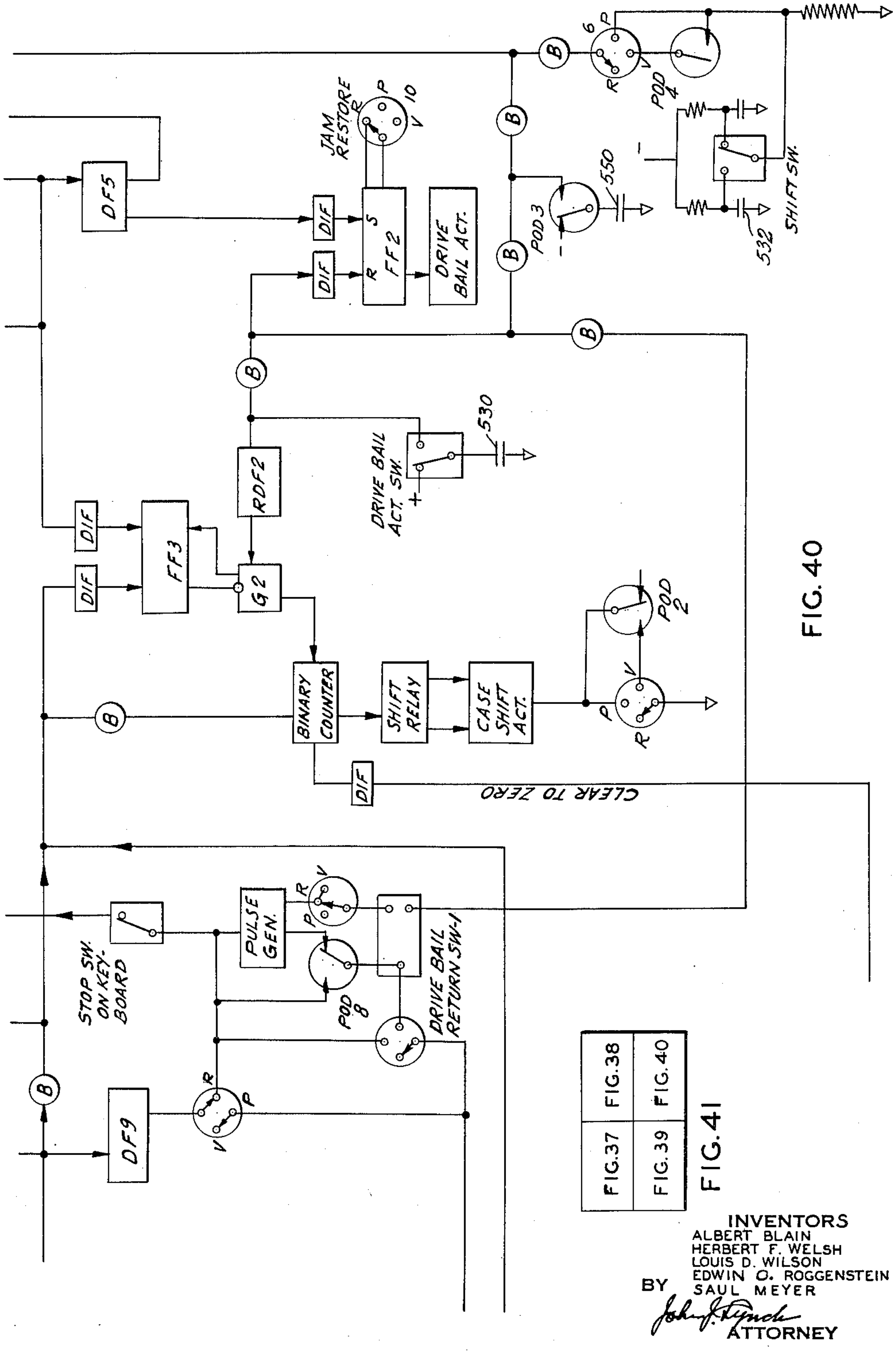

FIGS. 37–40 taken together, as shown in FIG. 41, form a general schematic of the electrical system utilized in the machine.

In the copending Patent No. 2,874,369 granted February 17, 1959, above referred to, there is disclosed a machine for typing data and simultaneously encoding the data and recording it on a control tape from which it can be taken for processing in a high speed automatic electronic computer. Before the data is used in the computer it must be verified. After it has passed through the computer it is recorded, in code form, on a result tape from which it is decoded and printed.

The invention disclosed herein contemplates a machine in which decoding of the original data of the control tape is performed automatically to permit operation of the machine only if the data of the control tape is verified by the key action of the machine under manual control of an operator; to encode the correct data and substitute the same for errors found in the control tape and to simultaneously print the correct data on a record; to print the verified data in one color and the corrected matter in a contrasting color and to adjust the machine for automatic decoding and recording of the data taken from a result tape.

Figure 1:
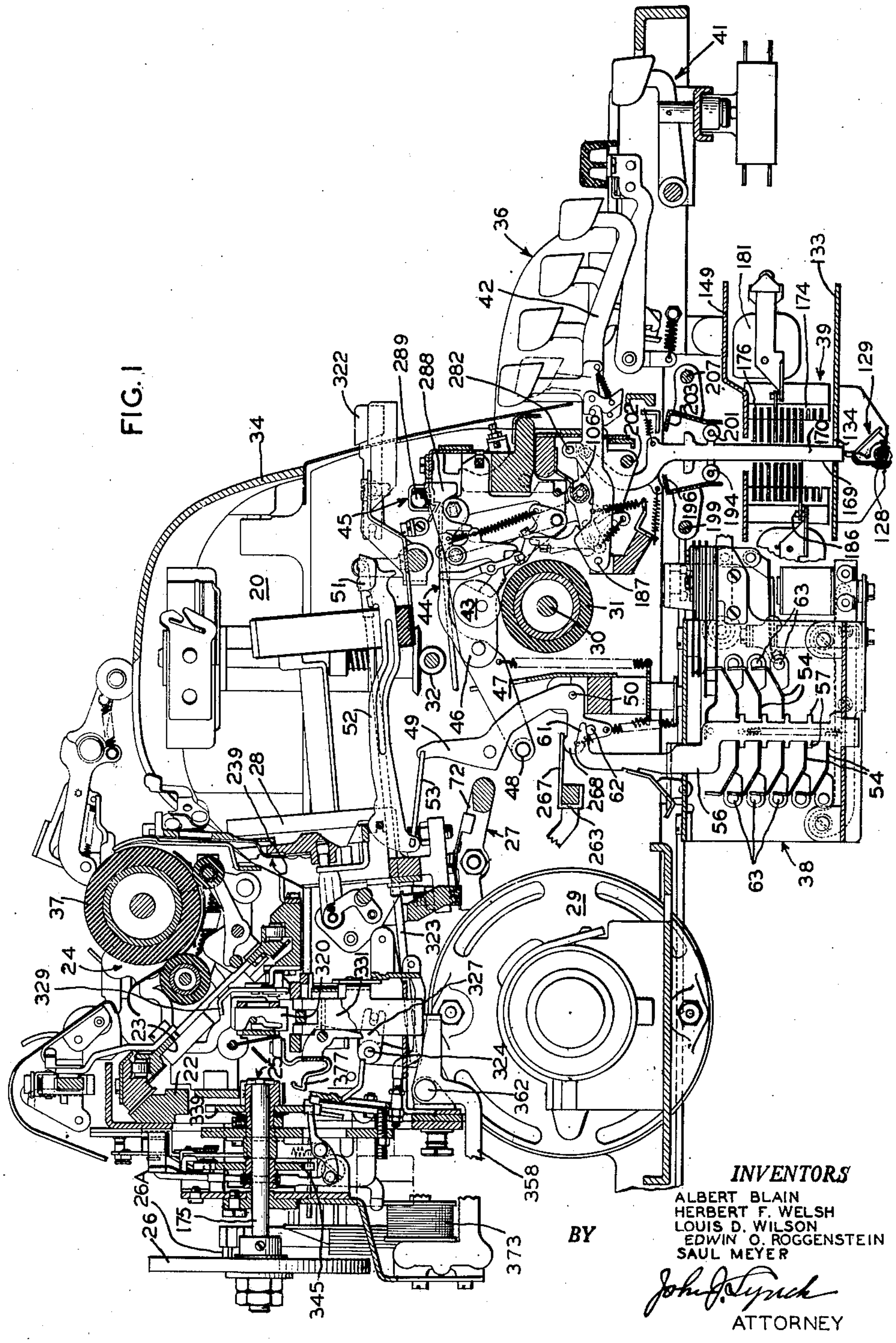
FIG. 1 is a view in sectional elevation, from front to back, of a machine constructed in accordance with the invention and showing the encoding and decoding units in association with the keyboard.
Figure 2:
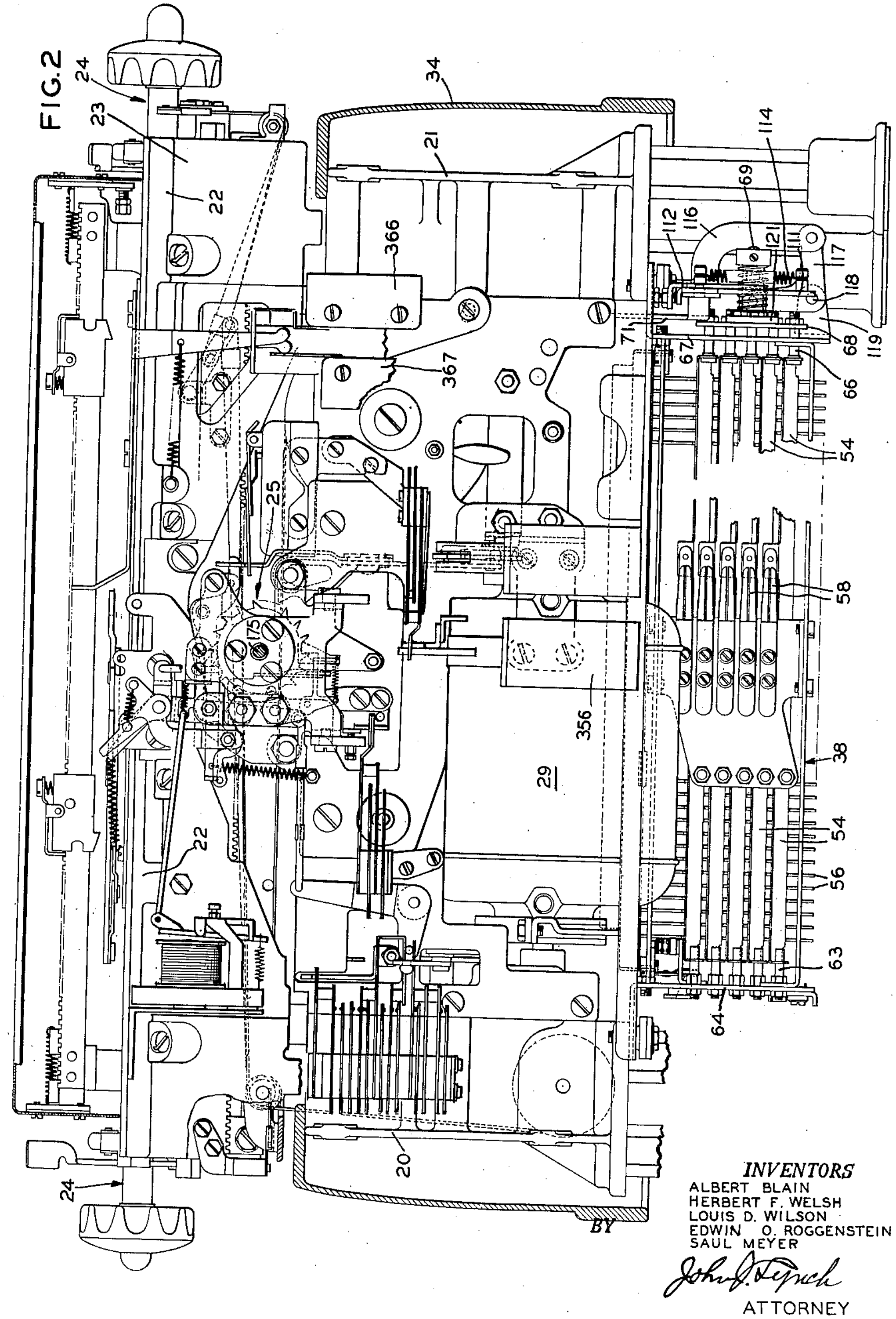
FIG. 2 is a view in rear elevation of substantially the full machine shown in section in FIG. 1.

In the drawings, FIGS. 1 and 2 illustrate a power operated typewriter including side frames 20 and 21 connected by a carriage runway 22 supporting a movable platen carriage 23; a work sheet roll assembly 24; an escapement assembly 25 for controlling the feed of the carriage in letter space direction including circuit make and break means 26; a shift mechanism 27 for raising and lowering a type segment 28 for upper and lower case printing, respectively; a motor 29 having suitable driving connection with a power roll shaft 30 and a power roll 31 on said shaft; a ribbon feed 32 and suitable cross bars and rods for supporting the operating parts of the structure which is enclosed in a panelled housing 34. The keys of a keyboard are operated to cause characters to be printed on a record or work sheet held about a platen 37 and to control the operation of the typewriter.

In cooperation with an encoding unit 38 and a decoding unit 39 suspended beneath the machine, the keys may be manually operated to type, on a record sheet, the data of a control tape as it is being verified and to record the verified and corrected matter in a control tape. Through suitable keyboard control means 41 the machine may be further adjusted to automatically record the data taken from a result tape. One form of circuit including tape recording and tape reading means is shown in the Patent No. 2,938,952 above referred to and may serve as a disclosure for one type of circuit control used for the recording of encoded data and for the reading of data from the tape to be decoded.

Operation manually or automatically, of any of the key levers 42 of the keyboard, will turn an eccentric cam roller 43 into engagement with the constantly operating power roll 31, through a key lever power mechanism 44, to raise a power arm 46 and a power arm extension 47 so that a roller 48 on the free end of the latter will cause a type bar bell crank 49, pivoted as at 50, to swing the type head 51, of a type bar 52, against the platen 37 through a pull link 53.

A set of the key lever controlled mechanisms 44 is provided not only for each type bar but for each of the function controlling keys of the keyboard. The type bars 52 are pivoted in the shiftable type segment 28 and each of the key controlled power mechanisms 44 is associated with the encoding unit 38 which converts, into code, the various characters and machine function designations shown on the keyboard 36. The latter, as shown in FIG. 25, contains the conventionally arranged upper case alphabetic character keys, numeral and symbol keys and machine function control keys. Every letter, numeral, symbol and function designation of the keyboard has a code representation that is induced on a magnetic tape and for the purpose of accommodating all of these designations the upper and lower parts of the type heads 51 are used for printing thereof.

Reference is made herein to upper and lower case for the purpose of designating the upper and lower parts of the type head as no lower case alphabet type is used except for symbol purposes. All alphabetic writing is done in upper case or capital letters, but these are actually in the lower case positions on the keyboard and in the lower portions of the type heads of the corresponding keys. The use of "upper and lower case" herein, indicates the position of the character on the type head rather than the meaning ordinarily implied of capital and small type. Where the upper case position on the key button is blank, the type will be identical in the upper and lower case positions on the type head.

Figures 3, 3A:
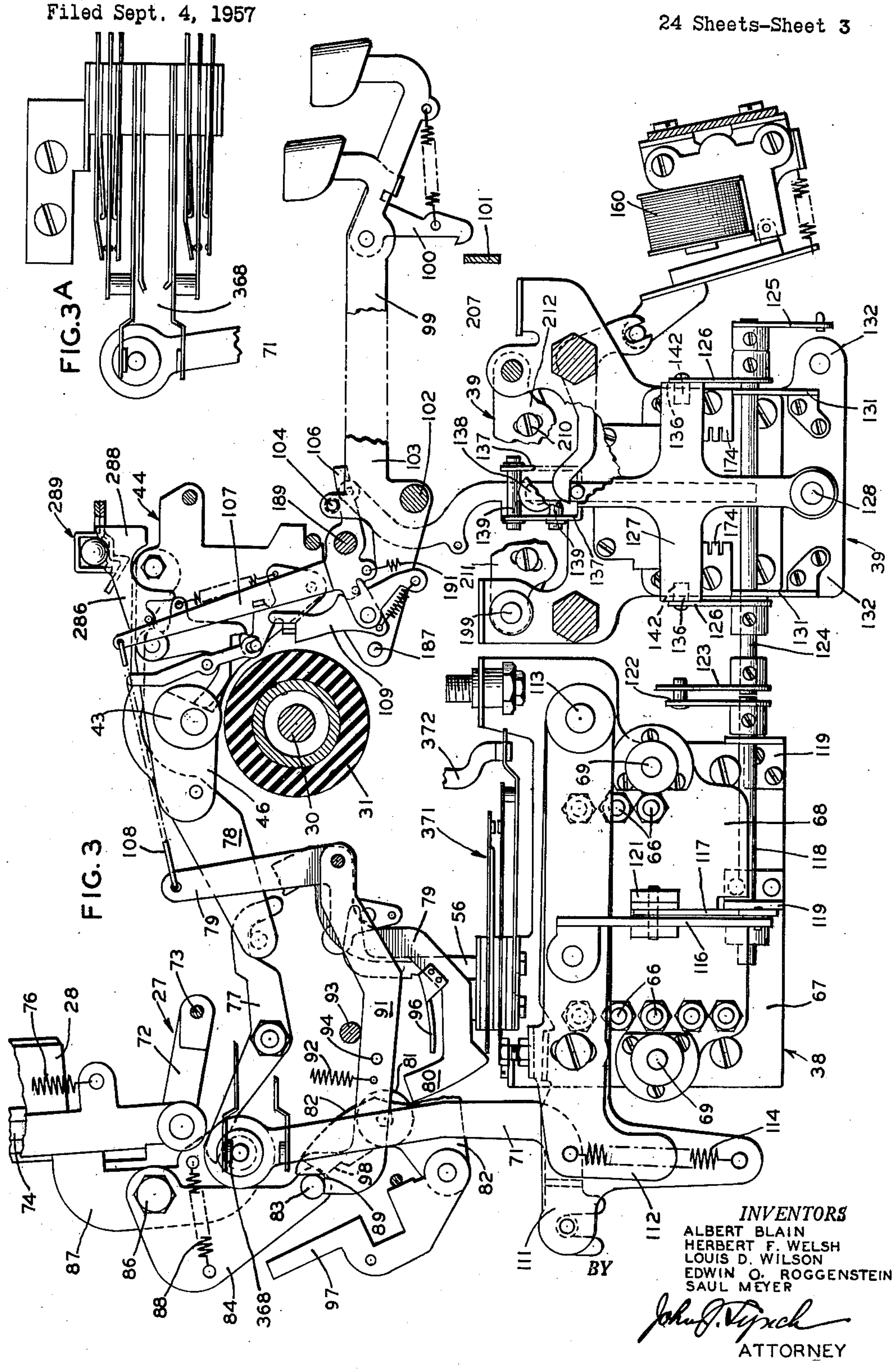
FIG. 3 is an enlarged view in end elevation of the encoding and decoding units showing the operating connections thereof with the key action and case shift mechanisms of a record producing means.
FIG. 3A is a side view of the case shift switch, a portion of which is shown in FIG. 3.

The encoding unit 38 shown in FIGS. 1, 2 and 3, and also disclosed in Patent No. 2,874,369 granted February 17, 1959, above referred to, contains code strips 54 arranged in flanking relation to code keys 56 and adapted to be rocked by lift projections 57 on the opposite edges of said keys, in accordance with the coded serriform edges of said strips, to operate switches 58. The latter control the coil circuits of a combination recording and reproducing head 60 (FIG. 26) of the type shown in the above mentioned patent and also in Patents Nos. 2,618,709 and 2,625,607 which forms a part of a tape unit 59.

The upper ends 61 of the code keys 56 overlie studs 62 on the lower ends of the type bar bell cranks 49 so that operation of the keys, in typing action, will encode each character or symbol type for recording on the tape. At one end, the code strips 54 are slidably pivoted on studs 63 secured in a wall 64 on the encoding unit and at the opposite end carry studs 66 which are slidably pivoted in another wall 67 and are secured to a plate 68 movably mounted on stud 69 fixed in the end wall 67. Movement of the plate 68 adjusts the code strips 54 longitudinally to bring the serrations thereof into upper or lower case position with respect to the keys 56, and is accomplished by the operation of a shift link 71 which connects the encoding mechanism 38 with the shift mechanism 27.

The shift mechanism, FIG. 3, includes the type bar segment 28 which is pivoted to a segment shift rocker 72 pivoted as at 73 to provide for vertical sliding movement of the segment in the usual segment mounting 74 which is secured to and extends between the side frames 20 and 21. The segment is supported in raised position by side lift springs 76 and is pushed down by the rocking action of a shift lever 77. Before the latter is actuated by its associated power arm extension 78, the free end 80 of a shift bell crank 79 pushes against a roller 81 carried on a pivoted shift latch 82 to swing the latter counter-clockwise against a pin 83 carried on the lower free end of a shift catch plate 84 pivoted as at 86 to a bracket 87 attached to the type segment 28.

The pin 83 is maintained, by a spring 88, in the shoulder 89 of a detent lift arm 91 which latter is urged by a spring 92 to raised position against a stud 93 and from the shoulder of which detent arm, the pin 83 is pushed by the counter-clockwise movement of the shift latch 82. The spring 92 augments the action of the springs 76 in supporting the segment 28 in raised position through the catch plate 84 and when the pin 83 is pushed off the shoulder, the shift lever 77 does not have to operate against the resistance of spring 92.

The detent arm 91 has a pin 94 which is engaged by a crank supported buffer leaf spring 96 when the crank 79 is operated to dislodge the pin 83 and cause the latter to descend between the opposing edges of the detent arm 91 and a pivoted, spring biased guide 97 as the segment 28 moves down under influence of the shift lever 77. The continued swinging movement of the shift latch 82 will cause a notch 98 therein to hook over the pin 83 and hold the segment down so that characters in the upper case position can be typed and encoded through the unit 38 as long as either of the shift key levers 99, at opposite sides of the keyboard, is latched down by engagement of its shift lock 100 with a latch bar 101.

The shift key levers are connected by a cross rod 102. The extension 103 of the shift key lever, at the left of the keyboard, carries a stud 104 for rocking a bell crank 106 whose arm 107 is connected by a pull wire 108 with the upper end of the shift bell crank 79. Operation of the power mechanism 44 for case shift is from the lever 99 through pin 104, crank 106, a lift pawl 109 and its associated linkage to turn the eccentric roller 43 into operating engagement with the power roll 31 to actuate the power arm extension 78 through the power arm 46.

When the shift link 71 is pushed down it swings an auxiliary lever 111 and a lever arm 112 about a common pivot 113 against the tension of a spring 114 so that a link 116 depending from the lever arm 112 will rock a bell-crank 117 clockwise (FIG. 2). The latter is fixed to a rock shaft 118, mounted in brackets 119 spaced on the left end wall 67 of the encoding unit 38, and pulls on a bracket 121, secured to the movable plate 68, so that the code strips 54 are shifted to upper case position simultaneously. The rock shaft 118 carries a tappet 122 for operating engagement with a finger 123, secured adjacent said tappet, on the end of a cross shaft 124 which is axially aligned with the shaft 118. The shaft 124 (FIG. 5) forming a part of the decoding unit 39, carries a depending arm 125 and upwardly extending spaced rock arms 126 between the latter of which is pivotally supported a cruciform shift rocker 127 whose lower end engages a stop shaft 128 to which is secured a stop bar assembly 129. The cross shaft 124 is journalled in spaced brackets 131 which are carried by a flange 132 depending from the left end of a bottom plate 133 having an opening 134 lengthwise of the center thereof.

The shift rocker 127 is provided with side ears 136 and top ears 137 the latter of which flank a stud 138 and carry spaced pins 139 chordally disposed in an annular bevelled groove 141 in said stud. The pin and groove combination provides a floating fulcrum for the rocker 127 which is in effect a lever of the third class with the power applied, through a pin and slot connection 142 of the rock arms 126 with the ears 136, to move the stop shaft 128 and stop bar 129 endwise. The bottom plate 133 has a depending flange 143 also at its right end (FIGS. 5A, 7 and 8) and both flanges 132 and 143 are slotted as at 144 at their lower edges to provide a guide in which the shaft 128 can have axial, vertical and rocking movements, the latter against the yieldable resistance of a centering spring 146. The flanges 132 and 143 carry end plates 147 and 148 respectively, from which is supported a top plate 149.

The end plate 148 (FIGS. 5A and 7) carries a pin 151 disposed between the free ends of the legs of the spring 146 which is coiled about the sleeve of a thimble 152 with the legs flanking a stud 153 in the end of a stop rocker 154 secured to said sleeve. The rocker 154 is operated from the armature 145 of a magnet 150, through link 155, to swing the shaft 128 counterclockwise when the magnet is energized, as will be later described. The thimble and adjacent collar 156 are secured to the shaft at opposite sides of a shift rocker 157 which, with the exception of the pin and slot connection 142, is a counterpart of the rocker 127. Each shift rocker 127 and 157 overlies a microswitch 158 for control of a circuit including a case shift magnet 160 (FIG. 3) when the rockers respond to an axial or vertical movement of the shaft 128.

The shaft 128 has fixed thereto, between the end plates, the stop bar 129 (FIG. 8) which includes a bail bar 159 to which is secured an obliquely disposed comb strip 161 extending parallel to the shaft and perforated along one edge to provide elongated holes 162 and serrated along the opposite edge to provide slots 163 into which stops 164 extend. The latter are pivoted on the shaft 128 and are held in proper spaced relation to each other in the slots of the comb strip so that the upper turned ends 166 of the vertical arms 167 thereof underlie decoding pendants or arms 169, 170 depending from the key lever mechanism 44.

Each stop 164 is shaped to provide a tail 168 terminating in a T end 171 which holds the legs 172 of a shaft carried spring 173 in spread tension for engagement with the lower limit of a hole 162 and the adjacent lower edge of the comb strip whereby each arm 167 is yieldably held in vertical alignment with its associated code arms 169, 170. The latter are arranged in pairs hanging from each part of the key lever mechanism 44 to control the latter, and the code arms 169, 170 of each pair correspond respectively to the upper and lower case condition of the machine.

The opposite end plates 147 and 148 of the unit 39 have secured thereto slotted guides 174 in which the ends of decoding slides 176 are mounted. The latter each have a central opening 177 extending lengthwise thereof with one or both opposing edges of the opening varyingly notched as at 178 to provide recesses which, when vertically aligned, permit but one of any pair of code arms 169, 170 to be swung out of its vertical position as shown in FIG. 10, all of the other code arms being held in vertical position by engagement of their edges with the unslotted portions of the opposing edges of the openings 177. Inasmuch as each slide is notched in accordance with a desired code, the various slides can be adjusted longitudinally to accomplish decoding of the information sensed from a tape by a combination recording and reproducing head 60 (FIG. 26) which, through a circuit, controls the operation of decording magnets 181.

Each of the magnets 181, mounted on a bracket 182 supported between the top and bottom plates 149 and 133 respectively, has an armature 183 biased by a spring 184 to hold, through a pin and slot connection 186, an associated slide 176 at the limit of its movement in one direction. It is evident that, when the selected magnets are energized, the plates will be horizontally adjusted to vertically align slots thereof so that only one of the code arms can be swung out of the vertical position in which all of the arms are confined laterally, when the plates are at their initial or unadjusted positions, as illustrated in FIGURE 8.

The power mechanism 44 includes for each of the character and symbol key levers 42, which are pivoted on a fulcrum rod 187, a bell crank 106 to which is pivoted as at 188 the upper ends of a pair of decoding arms 169, 170. The bell cranks 106 each swing on a common shaft 189 against the tension of a spring 191 to actuate a lift pawl 192 to cause operation of the associated power arm extension 78 as fully explained in Patent No. 2,874,369 granted February 17, 1959, above referred to. The decoding unit 39, in addition to the end and top plates mentioned, includes various brackets and strips which need not be specifically referred to except as frame parts to support the mechanism associated with the unit.

Referring to FIGS. 8 to 11, each upper case decoding arm 169 has a leftwardly extending shoulder 193 and a roller 194 for respective engagement with a horizontal lip 196 and a cam portion 197 formed on an upper case flipper bail 198 secured to an upper case rock shaft 199, journalled in the frame of the unit. Each lower case arm 170 has a rightwardly extending shoulder 201 and a roller cam 202 for respective engagement with the horizontal lip 203 and the cam portion 204 of a lower case flipper bail 206 secured to a lower case rock shaft 207 journalled in the frame of the unit. The rollers 194 and 202 are yieldably maintained in contact with the flipper bails by springs 208 and 209 which connect the arms 169 and 170 respectively, with suitable frame supported brackets.

Adjacent each end plate 147 and 148, the shafts 199 and 207 carry bail actuator arms 211 and 212 respectively, which have bolt-in-a-slot adjustable connection as at 210 with the companion flipper bails 198 and 206. An extension on one of the actuator arms carries a roller 213 for operating engagement with an open ended slot 214 in the other actuator arm so that the bails can be rocked in unison by a rock lever 216 secured to an end of the lower case rock shaft 207 that projects from the left end of the unit 39. The lever 216 is pivoted on the pin 217 of a clevis 218 fixed in the upper end of the core 219 of a solenoid or actuator 221.

The pin 217 is urged upwardly by a spring 222 which is connected to an extended portion of said pin that underlies a switch 223 (FIGS. 5 and 10) so that when the actuator is deenergized, the flipper bails 198 and 206 are swung downwardly by counterclockwise movement of the rock lever 216 until a bent end 224 of the latter engages an adjustable stop 226. When the actuator 221 is energized it will rock the lever 216 clockwise against the resistance of the spring unless the lower end of a blocking lever 227 overlies a nose 228 formed on the end of lever 216. The lever 227 is rocked through a connection 229 with the armature 231 of an electromagnet 232 when the latter is energized, as will be later explained.

When the actuator 221 is deenergized, the spring 222 will pull up on clevis 218 and the flipper bails 198 and 206 will be yieldably forced downwardly and the rollers 194 and 202 will follow the contour of the cam portions 197 and 204 under pressure of the springs 208 and 209 (FIGS. 8 and 10) so that one of the decoding arms 169 or 170 will enter the notches that have been vertically aligned by the code slide adjusting action of the decoding magnets 181 controlled, as above noted, from the sensing or reading head 60. As only one of the arms will swing leftward, indicating an upper case condition, or as only one of the arms will swing rightward, indicating a lower case condition, the shoulder of the respective arm that swings will be moved under the descending lip of one of the flipper bails and the arm thus selected by the code slides will be pushed down to cause the key lever power mechanism to operate. When the magnet 221 is energized the bails 211, 212 are swung upwardly and the dwell portions at the lower edges thereof engage the rollers of the decoding arms and hold the latter in vertical position so that the code plates or slides can be adjusted as shown in FIG. 8.

For control functions, the decoding unit is provided with a number of special decoding arms 233, FIG. 9, each forked at the upper end as at 234, to embrace and be guided by shaft 189, and yieldably urged to the left by a spring 236 so that when the upper case flipper bail 198 lowers, one of the arms 233, that may be admitted to the vertically aligned notches of the code slides 176, will be forced down to operate, for example, a switch 237 for controlling a circuit including a magnet 238, FIG. 12, to automatically adjust a ribbon mechanism 239, to be later referred to. These ten special decoding arms 233 are only operative when an upper case code symbol is sensed and they are located at key lever positions where characters or symbols are employed that do not require shift to upper case as in the instance of the letters W, S, X, E, D, C, R, F, V and T which may be printed when the platen is in either upper or lower case position.

Each of the symbol keys of the keyboard, except the ten mentioned above and the delta key, are for recording an upper case character and a lower case character. An upper case decoding arm 169 and a lower case decoding arm 170 are connected to the bell crank 166 of the power mechanism 44 that is operated by each key lever 42, so that, when the device is operated as a printer (FIG. 10) from the tape, the character representation sensed from the latter will set the code slides 176 whereby either the upper case or the lower case decoding arm will be selected for operation by its respective flipper bail.

For control of the functions of the machine certain character designations, in the upper case code, are used which permit selective operation of the special decoding arms 233. The ten capital characters above referred to are represented on the tape in lower case code and only a lower case decoding arm 170 is necessary for operation of their power mechanism. This leaves room for a special decoding arm 233 at each of these ten key positions. These arms (FIG. 9) are movable toward the left when the upper case decoding slides 176 have been set as the result of the sensing of an upper case character in the tape. For example, the "r" character, which is in the upper case code, is used as a "carriage return" symbol, but the decoding arm 233 that is actuated when the decoding slides 176 are set, in response to a sensing of the "r" character in the tape, is positioned adjacent the lower case decoding arm 170 that is associated with one of the keys bearing one of the ten capital characters above referred to. Hence, one of these special decoding arms 233 can be located at each of the ten key positions for operations of switches in the control of machine functions through suitable circuits in which said switches are embodied.

The machine through manual adjustment of the control means 41 can be used as a typer, that is a typist copying from original matter can type the material on a sheet carried on the platen, and each character and symbol so typewritten will be encoded through the operation of the encoding mechanism 38 to cause recording of the data in a tape through impulses controlled by circuit make-and-break means 26 operating in synchronism with the letter spacing movements of the carriage 23. The movement of the carriage in either direction revolves the escapement shaft 175 through rack 180 and pinion 185 to cause revolving movement of the circuit make-and-break disk 26. This aspect of the machine is fully disclosed in the Patent No. 2,874,369 granted February 17, 1959, above referred to. The tape so prepared is then to be verified and further manual adjustment of the machine, through the control means 41, makes it possible for the data on the tape to be read back for comparison with the simultaneous typing of the same data by an operator. As the operator types the data from an original correct copy she may cause the characters to be printed on a sheet on the platen only if she presses the correct key for each character or symbol that corresponds with the one being decoded as received from the tape.

When the machine is used as a typer, the decoding mechanism 39 is disabled and the encoding mechanism 38 is enabled. When the machine is used as a verifier, the encoding mechanism is disabled and the decoding mechanism is enabled. During the verifying operation however, when an error is detected, the machine is temporarily converted to a typer so that the operator can correct the error on the tape. The verified copy of the matter on the tape is preferably typewritten in red and the ribbon shift is adjusted, by the action of the operator in converting the machine to a typer, to print the corrected matter in black. This latter action automatically restores the machine to verifying condition.

When the machine is used as a typer, that is when data is being recorded on the tape at the same time that it is being typewritten, the data is printed in black. When the record is being verified it is typewritten in red, with the corrections typed in black, so that the original and verified typed copies can be readily distinguished. The adjustment of the ribbon is automatic depending upon the operation being carried out by the machine and, as illustrated in FIG. 12, the ribbon mechanism is shown adjusted to the verifying operation of the machine to print in red when the magnet 238 is energized to hold a link 242 at the downward limit of its vertical movement. The link, through a rock arm 243 fixed to a ribbon throw adjusting shaft 244, turns the latter counterclockwise to cause an adjusting arm 246, through its pin-in-a-slot connection 247 with a lift link 248, to move the upper end of the latter rearwardly.

The link 248 at its upper end carries a pin 249 for riding engagement with a slot 251 in a ribbon actuator arm 252 fixed to one end of an arbor 253 which is journalled in the sides of an adjusting shaft support bracket 254 and carries at its opposite end a lift arm 256, in the free end of which is pivoted a carrier 257 or vibrator for a multi-color ribbon threaded through the upper guide portion 258 thereof. The link 248 at its lower end is pivoted to one end of a lift lever 259 whose opposite end has a pin and slot connection 261 with the forked rearwardly extending end of a bar arm 262 secured to a bar shaft 263 which is supported in the side frames for rocking motion. The lift lever is pivoted in a bracket 264 which supports a leaf spring 266 whose free end engages a slotted ribbon universal bar 267, mounted on said shaft, to bias the bar downwardly against the heel 268 of each of the type bar bell cranks 49. With the pin 249 in the inner end of the slot 251, the operation of a bell crank will raise the ribbon the maximum distance to bring the red zone thereof to the printing point.

When the pin is moved to the outer end of the slot by deenergization of the magnet 238 and operation of the shaft 244 and arm 246, the ribbon when vibrated, will be raised the minimum amount to bring the black zone thereof to the printing point. In order that the operator may be made aware of the condition of the ribbon mechanism at a glance, the shaft 244 has fixed thereto a sleeve 269 whose crank portion 271 operates a forwardly extending link 272 to swing a lever 273 to move an indicator bell crank 274 between limit ears 276, formed on a plate 277, to which said lever is pivoted. A pointer end 278 on the free end of the bell crank 274 coacts with an indicating plate 279 shown in FIG. 25.

When data is typed by the operator and simultaneously encoded for recording on the tape, the printing is done in black. For the purpose of preventing any jamming of the lever power mechanisms 44, by reason of the operator striking more than one key at a time, use is made of a key lock means 45 (FIGS. 1, 13, 14 and 15). When a key lever 42 is operated, a stud 282 thereof rocks the bell crank 106 to raise the lift pawl 192 to swing a power trip lever 283 clockwise. The latter, at its upper end, swings a roller trip arm 284 and a detent 285 in counterclockwise direction to free the eccentric cam roller 43 and rotate it sufficiently to engage the power roll 31. The detent 285 has pivoted thereto a ball lock arm 286 yieldably held in contact therewith by a spring 287 and adapted to be swung about its pivot in counterclockwise direction to cause an outer splayed end 288 to engage between the balls of a ball lock 289.

The thickness of said splayed end 288 is equal to the total space that can be accumulated, in a horizontal plane, diametrically between any two balls in a row of aligned balls 290 held for free longitudinal movement in a hollow transversely slotted box-shaped ball retainer 291. When the operator is typing, the moment a key is struck the cycle of operation of the key lever power mechanism is inaugurated and is completed independently of further key action. Thus, while the key lock prevents jamming, it also enables the operator to type up to the speed permitted by the successive action of each power mechanism and hence increases the speed at which typing can be done.

When the machine however, is converted for use as a printer, that is when typing is automatically controlled from the tape, the action of the power mechanisms 44 is controlled by the downward movement of one of the decoding arms 169, 170 under influence of the flipper bail 193 or 206. The latter pulls down the arm that, upon being allowed to swing laterally into code slide serrations, positions its shoulder beneath the descending lip of the respective bail. The decoding arm, moving downwardly, will pull down the bell crank 106, to which it is pivoted by pin 188, and thus cause the printing of the corresponding character, as above explained.

The mechanical action of the code plates and associated parts, in controlling printing at the highest speed possible for the machine, renders the use of the ball lock unnecessary and when the machine is converted to a printer by the keyboard control means 41, an electromagnet 295 (FIGS. 13 and 14) is deenergized so that the ball lock is rendered inoperative. The ball retainer 291 is secured to a bracket strip 292 which is attached at its opposite ends to suitable rockers 293 pivoted on a cross-rod 294 so that the ball retainer can be swung out of range of the splayed ends 288 of the ball lock arms 286. One of the rockers 293 is provided with an extension 296 to which the lower end of a vertical link 297 is pivoted, the upper end of the link being pivotally attached to the armature 298 of a ball lock magnet 299.

The free end of the rocker 293 is urged downwardly by a spring 301 so that when the magnet 299 is deenergized the parts will assume the positions shown in FIG. 15 with the ball lock 289 out of the path of the spatulate ends of the ball lock arms 286. When the magnet is energized by operation of one of the keyboard control means 41 the link 297 is pulled down and swings the ball lock 289 into position to be engaged by the ball lock arms when the machine is being used in typing or verifying operations for the purpose of allowing maximum typing action of the keys without jamming of the key lever power mechanisms 44.

In the tabulating mechanism (FIGS. 16–24) the carriage position stops 320 are mounted in a stop bar 321 fixed to the carriage and overlying the stop setting, stop restoring and carriage arresting stop mechanism indicated generally as at 315 (FIG. 19). Through the operation of a tabulator setting key 322, disposed above the keyboard, a rod 323 (FIG. 1) rocks a shaft 324 to raise a lift bar 326 (FIG. 19) through an arm 327. The upper end of the bar 326 swings a suitable lever to pull down a finger 329 (FIG. 1) which pushes any stop 320, beneath it, down so that it will engage a carriage arresting stop blade 331 when the latter is raised. This occurs when the operator presses the tabulator or "Fill" key 332 on the keyboard and the power mechanism pulls on a rod 333 (FIG. 19) to raise the free end of a bell crank 334 and rock interlocking levers 336 and 337 to lift a bracket 338 to which the carriage arresting stop blade 331 is attached. The bracket extends through a frame plate, is urged at its upper end into contact with a notched keeper 40 by a spring 341 and has an ear bearing pin 342 which is lifted by the end of the interlocking lever 337. As the latter rises, a roller 343 (FIGS. 19, 23) engaging the under edge of a bail 344, lifts the latter to rock a coacting bail 346 down so that an arm 347 thereon frees the loose dog 335 from the escapement wheel 339 and lets the carriage move in letter space or tabulating direction until the next stop 320, that has been lowered, engages the carriage arresting stop 331.

During the tabulating movement of the carriage, the stop 331 has been held in raised position by engagement of bracket 338 with a notch 330 in the keeper 340 and the arm 347 has held the pivoted dog free of the escapement wheel. When a set stop 320 strikes the arresting stop 331 the latter is moved to push the bracket 338 out of the notch in the keeper and the stop 331 is returned to its effective or lowered position by the combined actions of the springs 341 and 348. This action, through pin 342, rocks the lever 337 counterclockwise and the cam end 343 on said lever, coacting with pins 351 on the lever 336, restores the latter for subsequent operation. The set stops 320 are restored to ineffective position by manual manipulation of a restoring or tabulator clearing key 350 (FIG. 25) at the front of the machine which pulls on a suitable rod to rock a shaft 349 and raise a restoring bar 353 whose cam tail wipes the depressed stops as the carriage moves in tabulator stop clearing action.

In order to free the carriage for movement in tabulating operations when typing and printing are being done, a dog 335 (FIGS. 20, 21 and 22) is released from engagement with the escapement wheel 339 by the extension 371 of the escapement bail rocker 346 which pivots at 372 and pushes down the end of the lever slide 347 that extends thereunder as shown in outline when the solenoid 373 is not energized. When verifying operation is being performed, no tabulating movement of the carriage is permitted and in order to prevent this, the solenoid 373 is energized and the armature 374, against the resistance of the spring 375, swings the arm 376 leftward (FIG. 20) to shift the slide 347 to non-blocking position with respect to the bail rocker 346. Any operation of the tabulating keys at this time will not release the dog 335. The slide 347 is held in raised position by a spring 377.

The tabulating mechanism (FIGS. 16–24) has been further modified to meet the requirements of the "Fill" operation of the Verifier. A tab-lock actuator solenoid 356, is used to provide electrical rather than mechanical control of the tabulating mechanism. A switch 365 that energizes the tab-lock actuator 356, is thrown by the action of the tabulator mechanism through lever 358 and the switch 359 that releases the actuator is opened by the movement of a shift trip 361 and a push rod 363, impelled by rocker action of the stop blade 331 when it is struck by a set stop 320.

The tab-lock actuator 356 is operatively connected to the stop blade 331 by means of a tab-lock switch-lever 358 which at one end bears against the bottom of the movable bracket 338 to which the stop blade is secured. The other end of the lever 358 is pinned to the plunger 360 of the solenoid 356 and pivots on a stud 362 on the escapement frame. When the tab bell-crank 334 elevates the stop blade 331, the free end of switch lever 358 rises due to the gravitational pull on said lever by the core of the solenoid. Three leaf-switches, fill switch 363, tab commutator switch 364, and tab-lock-actuator switch 365, are mounted so that the spring leaves thereof rest on the tab-lock switch-lever 358.

When the fill key 332 is struck, the tabulator mechanism causes the bell-crank 334 to elevate the stop blade 331 and the switch-operating-lever 358 is permitted to pivot, impelled by the spring action of the three leaf-switches and by gravity. As the lever pivots, the plunger 360 of the tab-lock actuator moves into the coil 356; when the tab-lock-actuator switch 365 closes, the actuator is energized, and the plunger is bottomed in the actuator. The functions of the fill switch 363 and the tab commutator switch 364 are discussed hereafter in the explanation of the tabulation operations during the record and verify cycles.

The free end of the switch-operating lever 358 is forced against the lower edge of the stop blade 331. As long as the actuator 356 is energized the blade remains latched up. The typewriter escapement is released as in the standard electric typewriter and the function of the stops 320 is also identical. When a tab stop 320, moving with the carriage from right to left as seen in FIG. 19, strikes the elevated blade 331, the latter is rocked to the left. In the standard typewriter this movement of the stop blade serves to disengage it from the tab latch 340. In the verifier, the latter is a secondary stop and the blade 331 transmits its motion through the tab slide 361 to the push rod 363. The latter opens the normally closed release-switch 359 which is wired in series with the tab-lock actuator 356 and when struck by the push rod, breaks the circuit. The blade remains elevated an additional 50 milliseconds (until the capacitors in parallel with the release-switch 359 become charged) and this delay permits the carriage to come to rest before the blade is released. When the capacitors are charged, the actuator 356 is deenergized and the spring 341 retracts the tab blade, as in normal typewriter operation. The escapement is engaged as in the standard typewriter.

Behind the reverse escapement or detent wheel 345, the shaft 175 (FIG. 20) carries the commutator 26. The latter has 18 segments, to correspond to the number of teeth of the forward escapement wheel 339. Each single movement of the forward escapement wheel is accompanied by a one-segment rotation of the commutator. The latter serves to time the tabulation operation in the record and verify cycles. The purpose of the second escapement is to prevent manual movement of the carriage to the right. The teeth of the reverse escapement face in the opposite direction to those of the forward escapement and a suitable reverse pawl, not shown, engages the reverse escapement wheel 345, serving similarly to the forward pawl, or loose dog 335, of the forward escapement.

In order to control the movement of the tape T precisely, a clutch structure 400 as shown in FIGS. 26, 27 and 28, is used which is driven by a motor 440A suitably mounted in association with a clutch frame 401 so that its shaft 402 extends into the frame. The shaft has secured thereto a driving face plate 403 to which is attached one of a pair of spanner plates 404 arranged in flanking relation to a floating drive transfer disk 406. Each plate 404 is provided with laterally projecting lugs 407 fitting into radial openings 408 in the periphery of the transfer disk 406. The other spanner plate of the pair is secured against one end of an armature sleeve 409 which has an end recess 410 in which a helical compression spring 411 is housed so that its ends abut the inner face of the outer spanner plate 404 and the sleeve 409. The latter is secured by chordal pins 412 to a tubular shaft 413 concentric with the motor shaft 402 and journalled in a bearing liner 414 secured in the axial bore of a coil housing 416. The latter is secured in a clamp extension 417 of the frame and contains an electromagnetic coil winding 418 which when energized attracts the armature 409 toward it.

The tubular shaft 413 is shaped to provide, at one end, a clutch ring 419 having a facing of laminae 421 compressible under action of the armature, when the coil is energized, to engage the driving face of a clutch disk 422. When the laminae are fully compressed to make a solid driving connection the face of the armature does not touch the electromagnet. The spring 411 keeps the laminae in close engagement but not sufficient to provide a driving connection, so that the energization of the coil causes an instant start of the driving action of the clutch.

The clutch disk or plate 422 is secured concentrically to one end of a solid clutch shaft 423. The latter is journalled at one of its ends in bearings 424 supported in the frame 401 and at the other or disk supporting end is journalled in a bushing 426 fixed concentrically in a clutch stop shaft 427. The latter is hollow and shaped at one end to provide a stop ring 428. The stop ring has a facing of laminae 429 for engagement with the opposite face of the clutch disk 422 and the shaft 427 is mounted for sliding movement in a liner 431 secured in the bore of a coil housing 432. The latter contains an electromagnet coil 433 for attracting an armature 434 secured by chordal pins 436 to the shaft 427.

The braking armature 434 is recessed to provide a housing for a compression spring 437 which abuts the armature and the inner face of a spanner plate 438 which is fixed to the frame 401. The latter plate is one of a pair 438, 439 arranged at opposite sides of a floating disk 441 whose peripheral recesses 442 are engaged by lugs 443 extending from each disk. The disk 439 is fixed to the end of the armature 434. The spring 437 maintains a slight pressure on the laminae 429 but not enough to provide braking action. When the coil 433 is energized, it pulls on the armature 434 and causes the stop ring 428 to exert a braking force on the clutch plate 422 to stop the operation of the shaft 423.

When the coil 433 is energized the coil 418 is deenergized and it is evident that the clutch structure is adapted for very close and precise control of the movement and stopping of the tape in order to provide for the proper recording and spacing operations. While this clutch shows only forward drive and stopping movements, a reversing clutch of like character is fully shown in a copending application of common assignee, Serial No. 515,064 filed June 13, 1955, in the name of Louis D. Wilson et al., now Patent No. 2,868,340 of January 13, 1959.

As is well known, magnetic recording is based upon the principle that electric current passing through a coil will induce permanent magnetism in certain permeable substances. A change in the direction of current flow causes a reversal of magnetic polarity. Conversely, reading from a magnetic recording is based upon the principle that a permanent magnet will induce an electric current in a coil provided that there is a relative motion between the magnet and the coil. Reversal of magnetic polarity will cause reversal of the direction of current flow in the coil.

In the invention described herein, letters, numbers, and symbols are each given a respective code representation consisting of a convenient amount of pulses such for example as eight. For illustration, to record a number 1 in a particular code position, current is passed through the head coil controlling that position. This current causes the coil to saturate magnetically the portion of the tape being recorded. Except when a 1 is being recorded, for example, a continuous current in the opposite direction is passed through the head coils, saturating the tape in the opposite direction of polarity. Recording of the tape may be done through well known read-record heads, which contain a given amount of head coils in two staggered rows. When these coils read, they detect changes in magnetic polarity which is interpretable by a computer or a device to which the information is applied.

In this invention, a pulse conveniently designated as a sprocket pulse is present in every code combination but never appears alone. The sprocket pulse is utilized to signal the input circuits of a data processing apparatus that a code combination is present. Upon receiving this signal, the input circuits of the data processing apparatus read the given character for each pulse position where there is a change in magnetic polarity and a zero in each pulse position where no change has taken place.

As previously set forth, this invention functions as a primary data-input device which records on magnetic tape, the information supplied to a typewriter keyboard, as an output device that automatically prepares typewritten copy from previously prepared magnetic tapes, and as a verifier of previously prepared tapes, the verifier comparing the information recorded on the tape with the information typed on the keyboard from original source mtaerial thus permitting the operator to correct detected errors.

To prepare original tapes, the instant invention provides a pulse density of 50 pulses per inch arranged in 120-digit blockettes. Each blockette is chosen to occupy 2.4 inches of tape and separate blockettes are spaced by an unrecorded portion of tape which conveniently may be approximately 2 inches long. When the invention is used for output purposes or for verification, it will accommodate tapes such as those on six inch reels recorded in blockette form with a pulse density up to 50 pulses per inch.

In order to position the tape, a tape leader may be loaded by use of a rewind button provided on control panel P (FIG. 25A) for operation of the tape-transport mechanism. The amount of leader loaded depends upon the operation, e.g., a 15-foot leader may be loaded when the invention is utilized to prepare tapes and a shorter leader may be used when the invention is utilized to print or to verify since a search operation positions the tape during the latter functions. In either case, load operation is automatically halted when the proper length of leader has been loaded.

When the operation has been completed, use of a load-rewind button initiates a rewinding operation. When the tape is completely rewound, the process stops automatically. To prevent the operation of two keys simultaneously, the mechanical interlock system above described is used which also limits the typing rate to a maximum of 12 characters per second. To permit 120 digits to be placed on one line, a suitable carriage travel limit such as 12-inches is provided and the usual character position guide with 120 numbered divisions is used to indicate to the operator the digit position at any point in the line. As explained before, 120 digits is referred to as a blockette and occupies about 2.4 inches of tape. When the carriage reaches the 121st digit position, the operator may then operate a trip key provided on the keyboard which will cause the printing of an underscore and automatic return of the carriage. As the carriage is returned, simultaneously additional tape passes the head to provide for space between blockettes.

A "Fill" key 332 is provided on the keyboard, the function of which is to cause the carriage to move to the next tabulation stop. Such tabulation stops are set manually and function in a manner similar to those found on conventional typewriters. As the carriage moves, the tape is also moved a corresponding distance and fill-in characters are recorded upon the tape. A fill selector switch is provided which selects either zeros or space symbols to be automatically recorded in a fill operation.

A backspace key 300 is provided on the keyboard for moving the carriage and tape backward one digit-space at a time to permit correction of the information on the tape. A carriage return key or trip key is provided, which upon being struck returns the carriage to the beginning of the line, advances the paper feed, and moves the tape backward to the beginning of the blockette.

The trip key 302 on the keyboard is utilized to be depressed at the 121st digit position. At this location, it will print and underscore, return the carriage, advance the paper feed, and move the tape forward to allow for space between blockettes and blocks. No information is recorded on the tape during this operation. A block of information consists of a group of blockettes, say six (720 digits), and occupies approximately twenty-six inches of tape including the space between blockettes. The space between blocks is of a length similar to the length between blockettes.

A print-mode switch is provided to permit the selection of two modes of printing viz., normal and computer digit-check. In normal printing the invention performs the operations indicated by program instructions; tabulate, carriage return, ignore, space, and printer stop. A break-point instruction may stop the machine or be ignored independently of the normal computer-digit-check switch. No symbols are printed upon the paper in the spaces corresponding to the tape positions of the instructions.

In the computer-digit-check, special symbols are printed when the instructions appear upon the tape; lower case *t* (tabulate), lower case *r* (carriage return), small *i* (igore), caret (space), and $\beta$ (break-point). Mechanically, these symbols are treated as normal characters. When a recorded printer-stop symbol is used, the printing stops regardless of the print-mode switch. Carriage return in this case is automatic at the right margin. Printing occurs at the rate of 10 characters per second.

Verification consists of comparing digit-by-digit the information on the tape with the text used in preparation of the tape. When verifying, only the key corresponding to the code combination read from the tape is permitted to be operated. Thus, if the operator strikes the key indicated by the original programmer's text, and the key struck is the one selected by the code combination in the memory, the character is printed in red and the carriage and tape are spaced. However, if the operator strikes the wrong key, or an erroneous character is recorded on the tape, no printing occurs. If coincidence between the tape and the text cannot be established, the character in the memory may be printed out without verification in the print-one-digit operation. Characters so printed appear in black. Corrections may be made singly by the use of a correct-one digit key on the keyboard or may cover an entire blockette through the operation of a change-one-line key on the keyboard. Both of these correction keys switch the device from verification to recording and characters typed when corrections are entered appear in black.

The fill key in conjunction with previously set tab stops may be utilized to permit a skipping past of insignificant material without printing or verifying. For efficiency of operation, the maximum rate of verification is chosen for a given period, a convenient amount being ten characters per second. Similarly, the skipping of insignificant information takes place at a rate several times the verification rate, a convenient rate being eighty characters per second. During the verification cycle, the back space and trip keys initiate the same function as they do during the record cycle. Thus, the carriage-return key returns the carriage and the tape to the beginning of the blockette but does not erase the information on the tape.

Before proceeding with a description of the structure and function of the electrical mechanism, one component circuitry utilized herein will now be described. The flip-flop circuits utilized are typically illustrated in FIG. 29. In the circuit of FIG. 29, there are shown left and right triodes, V1 and V2. In the set condition, V1 is conducting and V2 is at cutoff. In the restore condition, V2 is conducting and V1 is at cutoff. The flip-flop may be set or restored by placing a positive pulse on the grid of the non-conducting tube or a negative pulse on the grid of the conducting tube.

It will be noted in the circuit of FIG. 29 that the cathodes are connected to minus 150 volts and the plates are connected to plus 150 volts. The load resistance in each tube is the same, the grid circuits are identical and each grid is tied to the plate of the opposite tube through a 100K resistor. They are also connected to the minus 300 volt supply through a 120K resistor. The grid voltage of V2 is determined by the divider circuit 300 volt supply to plus 150 volt supply through resistors R8, R7 and R4. The voltage at the grid of V2 is minus 150 volts or zero bias relative to the cathode, thereby permitting V2 to conduct. This divider circuit also causes the plate of V1 to be at 60 volts. The plate of V2 is at minus 120 volts. The grid voltage on V1 is determined by the divider circuit minus 120 volts (plate voltage of V2) to the minus 300 volt supply through resistors R2 and R1. The grid of V1 is minus 175 volts or minus 25 volts relative to the cathode which is sufficient to maintain triode V1 at cutoff. These conditions establish a restore condition.

To set the flip-flop, a positive trigger pulse of sufficient amplitude to overcome the grid bias of triode V1 is applied to the grid of V1 causing V1 to conduct. As a consequence thereof, the plate voltage of V1 will drop to minus 120 volts and this 180 volt drop at the plate of triode V1 will lower the voltage at the grid of triode V2 sufficiently to render triode V2 at cutoff. The presence of capacitors C1 and C2 enable the transfer time of the flip-flop to be more rapid since the voltage drop on the plate of one tube is capacity coupled to the grid of the other tube thus accomplishing a more rapid cutoff of the conducting tube. For convenience in this description, a flip-flop will hereafter be referred to as an FF.

In FIG. 30 there is shown a resettable delay flop which is a circuit that utilizes a thyratron and at least one other tube. Essentially, such a circuit is set by being pulsed one or more times. It will recover (restore) at a given time after it receives the last set pulse.

As is shown in FIG. 30, the circuit comprises a thyratron V1 and a triode V2. The function of this circuit is to open a relay as soon as a positive pulse is applied to the grid of thyratron V1 and to hold it open a given period after the last set positive pulse is received on the grid of V1. In the restored state, thyratron V1 is held cut off by the minus 13 volt bias on the grid. In this state, triode V2 is conducting whereby the relay coil is maintained in an energized state by the plate current passing therethrough. The voltage at the grid of triode V2 and the plate of thyratron V1 is zero and the capacitor C1 is charged to 150 volts, point A being positive with respect to point B.

To set this circuit, a positive pulse is applied to the grid of thyratron V1. This fires a thyratron with a consequent drop in voltage at point A to minus 142 volts thereby causing triode V2 to cut off and thereby deenergize the relay. Simultaneously, capacitor C1 is immediately discharged to about plus 8 volts. Due to the high resistance of resistor R1, there will be insufficient current flow to maintain ionization in the thyratron and it will cease to conduct. Accordingly, capacitor C1 will begin to charge through resistor R1, the voltage at point A increasing in a positive direction. After 10 milliseconds (the time constant with the circuit constants shown), the voltage at point A will reach a sufficiently positive level to permit triode V2 to conduct. When the latter conducts, it will provide current for the relay coil energizing it. The time that V2 is cut off is determined by the values of capacitor C1 and resistor R1.

In a situation where a positive pulse has been applied to the grid of thyratron V1 prior to triode V2's commencing to conduct, i.e., within or less than 10 milliseconds, the capacitor C1 would have been discharged again and the relay time would have started again with this pulse. Thus, as long as pulses are received on the grid of thyratron V1, less than 10 milliseconds apart, the circuit will not recover. However, it will recover 10 milliseconds after the last pulse is applied to the grid of thyratron V1. For convenience in this description, a resettable delay flop will hereafter be referred to as an RDF.

FIG. 31 shows a circuit which provides a sharp, well defined output of an RDF. This circuit essentially comprises an RDF which drives a flip-flop. The circuit consists of an RDF, viz., triode V2 and thyratron V5 coupled to a driver tube triode V1 and a flip-flop comprising triodes V3 and V4. In the restore condition, tubes V1, V3 and V5 are in the non-conducting state and V2 and V4 are conducting.

When a positive pulse is applied to the grid of thyratron V5 causing it to fire, two outputs are developed. The negative output at the plate serves to render tube V2 non-conductive and, due to the low current flow in the thyratron, it ceases to conduct. The positive pulse developed at the cathode of the thyratron during the instant that it is fired is coupled to the grid of triode V1 driving it to conduction, tube V1 conducting only for the duration of this positive pulse. When triode V1 conducts, its plate potential drops (point A), this drop in plate potential being coupled to the grid of triode V4 whereby triode V4 is rendered non-conductive. As a consequence, the plate potential of triode V4 rises and the rise is coupled to the grid of triode V3 rendering triode V3 conductive and thus the flip-flop is now in the set state. To change the flip-flop to the restore state, triode V2 has to be rendered conductive.

Triode V2 will remain cut off until the voltage at point B rises sufficiently in a positive direction to permit V2 to again conduct. This time is determined by the charge time of capacitor C1 through resistors R1 and R2. Should thyratron V5 be fired prior to the rendering conductive of triode V2, capacitor C1 will be discharged and the timing cycle will start over again, the flip-flop remaining in the set state. With the circuit constants shown, the delay time is 40 milliseconds. The grid of triode V2 will be sufficiently positive to render it conductive 40 milliseconds after the last positive pulse input thereto. When triode V2 conducts, its plate voltage will drop (point C) and this drop is coupled to the grid of triode V3 thereby rendering triode V3 non-conductive. The rise in voltage in the plate of triode V3 is coupled to the grid of triode V4 causing triode V4 to conduct and the RDF is placed in the restore state.

In FIG. 32 there is shown a one shot multivibrator as used in the present invention. This is a circuit usually consisting of two triodes and its purpose is to deliver a pulse at a given time after it is initially triggered. The circuit is set by placing a positive pulse on the grid of the tube which is normally cut off and the output may be taken from either plate or from the common cathode.

In the quiescent state, assuming the triode V1 is at cutoff and triode V2 is conducting, current is flowing through the 33K plate low resistor and 15K cathode resistor. This current flow causes the plate voltage of triode V2 to drop to plus 100 volts and sets the cathode voltage at plus 65 volts. Since the cathodes of triodes V1 and V2 are common connected, the cathode of triode V1 is also at plus 65 volts. The grid potential of triode V1 is plus 20 volts which effectively places a minus 45 volt bias thereon maintaining V1 at cutoff. The grid of triode V2 is at a potential of approximately plus 65 volts (V2 is drawing grid current). In this situation, the capacitor C1 assumes the voltage of plus 250 volts at point A and plus 65 volts at point B placing effectively a charge of 185 volts thereon, point B being negative with respect to point A. This establishes the restored state of the delay flop.

To set the delay flop, a positive pulse is coupled to the grid triode V1 rendering it conductive whereby its plate voltage drops to approximately plus 40 volts. Since the plate load resistance of triode V1 is much higher than that of triode V2, triode V1 will draw less current through resistor R2 and thus the cathode will be at plus 10 volts while triode V1 is conducting. By this arrangement, triode V1 is permitted to conduct as long as its cathode remains at plus 10 volts. At the instant that the triode V1 plate voltage dropped, capacitor C1 immediately began to discharge through resistor R3 toward the power supply causing the minus 185 volts to appear at the grid of triode V2 thereby rendering triode V2 non-conductive. The discharge path of capacitor C1 is from point B through resistor R3, the power supply, resistor R2, triode V1 to point A. The plate voltage of triode V2 will rise to plus 250 volts and the grid of triode V2 will start to rise toward a positive value as the capacitor continues to discharge. Finally, it will rise to a sufficiently positive voltage to permit triode V2 to start to conduct, V2 attaining a fully conductive state very rapidly. Due to the additional current being drawn by triode V2 through the cathode resistor, the cathode potential of triodes V1 and V2 will rise in a positive direction and will reach plus 65 volts very rapidly again cutting off triode V1. Thus, the delay flop is placed back in the restored state.

Figure 33C:
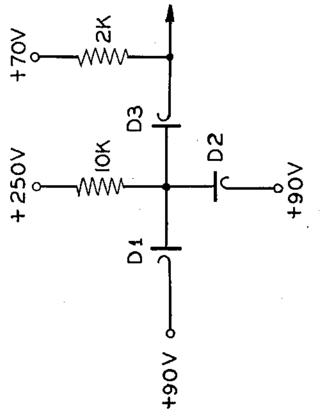
Figure 34C:
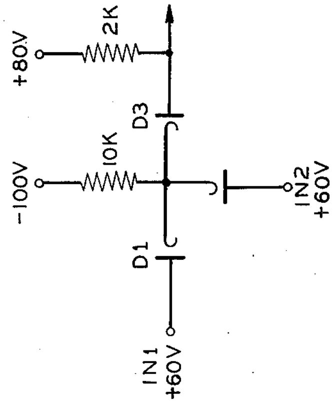
Figure 33B:
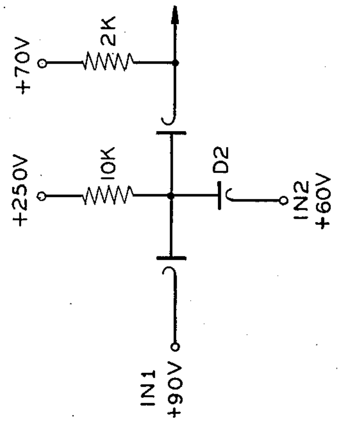
Figure 34B:
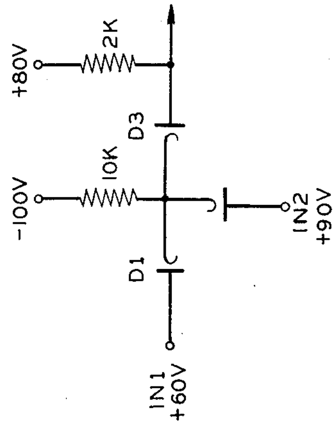
Figure 33A:
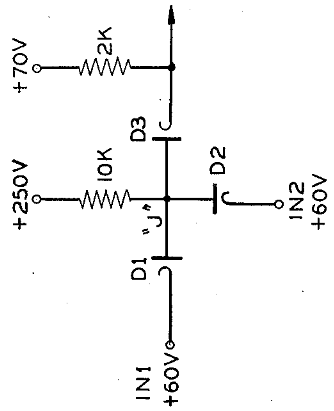

FIGS. 33A and B depict a typical AND gate in the quiescent state utilized in the system being described. With the circuit constants shown, the static input level is plus 60 volts and the signal input is plus 90 volts. The static output level is 70 volts. Diodes D1 and D2 are both conductive whereby the voltage at point J is 60 volts. Diode D3 is at cutoff since its plate is at 60 volts and its cathode is at 70 volts. Thus, the output level is 70 volts. If a 90 volt signal is applied to the input IN–1, diode D2 will continue to conduct causing point J to remain at 60 volts. Diode D1 will be cut off since its plate is at 60 volts and its cathode is at 90 volts. Diode D3 will remain cut off since its plate is at 60 volts and the cathode is at 70 volts. The output level will remain at 70 volts. With an input to both diodes D1 and D2, they are both conducting at a reduced current causing point J to rise to 90 volts. This places 90 volts on the plate of diode D3 causing the latter to conduct and said conduction will raise the output level from 70 volts to 90 volts. Thus the gate is now permitting an output. This gate is a positive type gate. While a positive gate is allowing an output, the output voltage level will be the same as the most negative input voltage.

Figure 34A:
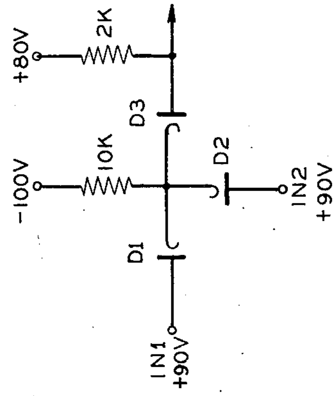

In FIGS. 34A and B there is shown basically the same gate as that shown in FIG. 33A with the exception that it is a negative instead of a positive gate. It can be seen from FIG. 34A that the same conditions are fulfilled when an input is applied to both diodes D1 and D2. Of course, in this situation the input signal level is at plus 60 volts and the static is at plus 90 volts whereby the output is a signal in a negative going direction.

Figure 35:
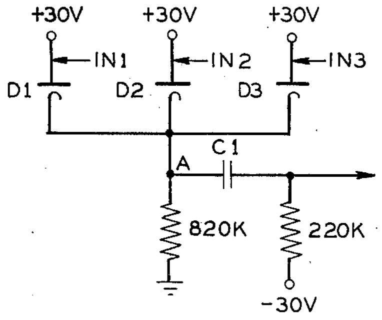
Figure 36:
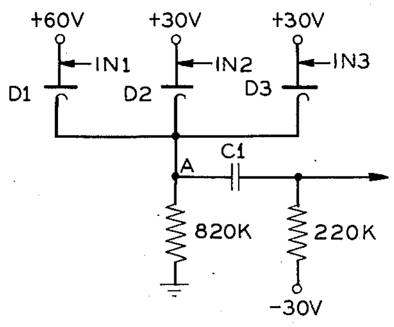

FIGS. 35 and 36 are circuit schematics of a typical OR gate as utilized in the circuitry of the present invention. With the circuit constants as shown, the static level at the inputs is 30 volts. The signal level is suitably plus 60 volts. Since the common connected cathodes of the diodes go to ground through an 820K resistor, diodes D1, D2 and D3 will all conduct placing point A at a 30 volt level. Since the output of the gate is capacity coupled through capacitor C1, only a change in the level at point A will be applied to the associated circuit. When a signal pulse or level of 60 volts is applied to IN–3, diode D3 will conduct causing point A to rise to plus 60 volts. This will cut off diodes D1 and D2. A 30 volt increase at point A will be coupled to the output circuit. A 60 volt signal at any of the inputs would have the same resultant output.

A gate may be inhibited if the signal level (60 volts) is constantly present on any one of the inputs. For example, in FIG. 36, a constant 60 volt level on IN–1 will cause diode D1 to conduct and cut off diodes D2 and D3. If a 60 volt signal is placed at either of the other inputs, it will cause the diode at that input to conduct but this will not change the level at point A, the latter remaining at 60 volts. Since a change in point A is required to produce an output, the level will remain the same.

*Record Cycle—Normal Typing*

The operation of the electrical system as depicted in FIGS. 37–40 will now be described. When the operator strikes any typewriter key, the normal electric typewriter action takes place. The power arm 46 through its extension 47, rotates the type-bar bell crank 49 throwing the type bar 52 against the platen 37. The bell crank 49 is coupled to the encoder lift arm 56 and when the bell crank 49 is rotated its associated lift arm is raised, thereby causing the closing of a combination of encoder switches corresponding to the code for the letter typed. As type bar 52 reaches the paper, the escapement universal switch, hereafter referred to as EUS, which is coupled to the escapement release mechanism, is closed.

When EUS is closed, positive potential as a pulse is applied through the closed contacts thereof through a differentiating circuit 502 to the set input of a flip-flop circuit FFI and simultaneously the positive pulse is applied through the normally closed contacts of REV–A2 to the input of a delay flop DF1. DF1 may suitably be a monostable multivibrator as described in FIG. 32. The set output of FF1 causes the tape-drive clutch to engage for forward tape movement. The set output of DF1, timed by a suitable RC circuit therein to have a given duration, assumes its stable state thereafter, the period of the set output permitting the tape to reach full operating speed. The recovery pulse of DF1 sets DF2 which may be a monostable multivibrator similar to DF1. The set output of DF2 energizes a write-current generator for a given duration, a suitable time being 2 milliseconds (the time required to record a character). Write-current passes through the closed encoding switches to energize record heads 60 which record the desired code combinations on the tape. The recovery pulse of DF2 is applied to the restore input of flip-flop FF1 causing disengagement of the clutch 400 and the engagement of the brake. The flux build-up-time in the brake coil and tape deceleration time provide additional space after the character.

*Fill Operation*

Upon the operator's striking the fill key on the keyboard, a normal tabulation is initiated with respect to the carriage. The carriage arresting tabulator stop blade 331 is coupled to the plunger 360, so that when the tab bellcrank 334 elevates the tab blade 331, the plunger is permitted to drop into the barrel of the actuator 356. The three switches, the tab-lock actuator 365, the tab-commutator 364, and the fill 363, rest on the plunger 360. When the blade 331 is at rest, the switches are in the normally open position. As the plunger drops, the switches are closed. The tab-lock actuator switch 365 completes the circuit of the actuator which, when energized, causes the plunger to bottom elevating the tab blade to the top of its travel. The tab Fill–2 commutator switch connects the commutator 26, fixed to the escapement shaft 175 to the set (S) side of flip-flop circuit FF1 and to the input of delay flop DF1.

One commutator segment passes under each brush for each letter-space of carriage movement. Each time a segment passes under the brush 26A, the commutator provides a pulse to set flip-flop FF1 thereby causing forward tape movement. Simultaneously the commutator output sets delay flop DF1, whose recovery pulse, after the delay period of its unstable condition, sets delay flop DF2 thereby permitting the tape to reach operating speed and to provide proper spacing between pulses. The set output of DF2 energizes the write-current generator, the current passing through the fill selector to switch the encoding switches, thereby producing either the code for space or for zero, according to the setting of the fill-selector switch. The encoder output energizes the proper coils in the read-record head to record the fill material. The recovery pulse of delay flop DF2 restores flip-flop FF1 to engage the brake and stop the tape movement.

When a stop 320 strikes the blade 331, the latter is rocked to shift the strip 361 and move the push rod 363 to open the tab-lock-actuator release switch 359 which is in series circuit arrangement with the tab-lock actuator 356. After such opening, current continues to flow through the actuator for the period required to charge the capacitor 504 connected across the end-of-tab switch 359 (a suitable period for such charging being about 60 milliseconds). When the tab-lock actuator drops out, the tab-lock-actuator switch 365, the tab-commutator switch 364, and the fill switch 363 return to the normal position.

*Backspace Operation*

To correct a single character, the operator strikes the backspace key 300 on the keyboard thereby actuating the backspace power-arm and closing the backspace switch as shown in FIGS. 13 and 14 of 2,874,369 granted February 17, 1959 above referred to which switch may suitably be a double-pole, double-throw switch. The closing of the backspace switch FIG. 37, causes the disconnection of positive voltage from the capacitor 506 associated with contacts B51. Capacitor 506 consequently discharges through normally closed contacts LM–1 of the lift margin relay thereby energizing the reverse relays A and B for a time sufficient to close normally open contacts REV A5, B2 and REV A7 thereof. With contacts REV A5 and B2 closed, the reverse relays are connected to the positive potential supply thereby supplying holding current thereto. With the reverse relays now in a steady state of energization, the following series of events takes place through the switch contacts of these relays. Contacts REV A7 transfer to connect the reverse relays to the relay reset thyratron. The switching of contacts REV A3 deenergizes the keyboard unlock actuator, FIG. 39. Other contacts of the reverse relay open to deenergize the write relays and a broad erase head whereby the read-record heads are changed from writing to reading (not shown but explained herein below). The switching of certain of the contacts of reverse relay B causes the reversal of the direction of the center drive motor (not shown). The switching of contacts REV–A6 disconnects a capacitor 512 from the positive potential source thereby permitting it to discharge providing a pulse as an input to a delay flop DF9 which may suitably be a monostable multivibrator. The time constant circuit of delay flop DF9 may be such as to provide an astable period of about 250 milliseconds before DF9 reassumes its stable state. This period is sufficient time to permit the motor to reverse. The recovery pulse of DF9 is applied as an input to a delay flop DF4 which may also be a monostable multivibrator as shown in FIG. 32 and which may have an astable period of about 5 milliseconds duration. The recovery pulse of delay flop DF4 is applied to the set input of flip-flop FF1 which causes engagement of the clutch so that the tape moves in the reverse direction. The sprocket head reads the sprocket pulse of the digit last recorded and this pulse is applied through now closed contacts REV–A2 as an input to delay flop DF1. The recovery pulse of delay flop DF1 is applied as an input to delay flop DF2 which may suitably have an astable period of about 2 milliseconds. The recovery pulse of delay flop DF2 restores flip-flop FF1 thereby causing a disengaging of the clutch and an engaging of the brake. The total delay time of the delay flops is the same as the duration of the reverse tape movement. This period is selected to be the same as the time expended in recording the previous character, resulting in a situation wherein the tape has been returned to the position it occupied prior to the writing of the corrected character.

The restore output of flip-flop FF1 fires the relay reset thyratron, the current output therefrom shunting the reverse relays causing their deenergization and the consequent respective opening and switching of their contacts. The operator may now resume typing, and insert the correct character.

*Full Carriage-Return Operation*

At any point in a blockette before a trip operation has taken place, the operator may return the tape and the carriage to the beginning of the blockette by striking the carriage return key 302 which causes the carriage to return to the left margin as in the standard typewriter. In this operation the carriage return power-arm closes the carriage return switch. As a consequence thereof, contacts CR2 of the carriage return relay are transferred whereby a capacitor 514 is disconnected from the positive potential supply and the capacitor is permitted to discharge. The latter discharge is applied through normally closed contacts LM–3 of the left margin relay to the carriage return relay thereby energizing the latter substantially for the duration of such discharge. This duration is long enough to permit the closing of normally open contacts CR6 of the carriage return relay whereby the latter is connected to the positive potential supply and holding current provided for the carriage return relay. Thus the carriage is caused to return.

As the carriage reaches the left margin, the left margin switch is caused to close, opening contacts LM–3 and thereby breaking any circuit which may exist between the carriage return relay and contacts CR2 thereof. Thus, a carriage return operation cannot be initiated at the left margin.

The sequence of events which occurs with the closing of the carriage return relay is as follows. Closed contacts CR4 connect the carriage return relay to the plate of relay set thyratron. The switching of the contacts CR7 disconnects a capacitor 518, FIG. 37, from the positive potential supply and the capacitor discharges through reverse relays A and B, the discharge being of a long enough duration for the contacts of these relays to be switched whereby the relays are connected to the plate of the relay reset thyratron through contacts REV A7 and to the positive potential supply source through contacts REV A5. Contacts REV A3 open as a consequence of the energization of the reverse relays whereby the keyboard unlock actuator relay is deenergized. Certain contacts of the reverse relays (not shown) open to cause the deenergization of write relays and the broad erase head, whereby the sprocket head is converted to reading.

The switching of certain reverse relay B contacts reverse the direction of the center drive motor. The switching of contacts REV A6 disconnects the capacitor 512 from the positive potential source permitting the latter to discharge, the discharge being applied as an input to delay flop DF9. The delay period of 250 milliseconds of delay flop DF9 permits the center drive motor to reverse direction and at the end of this period the recovery pulse of delay flop DF9 is applied as an input to delay DF4. After a delay of about 5 milliseconds which is of suitable duration for the astable period of delay flop DF4, its recovery pulse is applied as a set input to flip-flop FF1, whereby the clutch is engaged to permit the reverse tape movement.

The normally closed contacts CR3 permit the pulses read by the sprocket head to be applied to a delay flop RDF1 which is a circuit of the type shown in FIG. 30. RDF1 flop may suitably have an astable period of about 15 milliseconds which is approximately the time required for about 2 pulses to pass the head. RDF1 remains set as long as pulses applied as inputs thereto are at intervals which are shorter than its astable period, i.e. 15 milliseconds. Since, at the beginning of the blockette, the sprocket head reads no pulses during the astable period of RDF1, the latter is permitted to recover, its recovery output being applied as a restore input to flip-flop FF1, with a consequent switching of conductivity in the clutch. Simultaneously, the relay reset thyratron is fired with a consequent deenergization of the reverse and carriage return relays.

*Trip Operation*

When the carriage reaches the 120th carriage position, the right margin switch 366 (FIG. 2) is caused to close. The closing of the escapement universal switch EUS (FIG. 37) with the recording of the 120th character permits the flow of current from the positive potential source through the closed contacts of the escapement universal switch and the transferred contacts of the right margin switch. The energization of the right margin relay and the switching and closing of its respective contacts causes the following sequence of events to take place.

The right margin relay receives holding current from the positive potential supply through closed contacts RM–5 and is connected to the plate of the relay reset thyratron through closed contacts RM–4. With the right margin relay energized, operation of the trip key 302 actuates the trip power-arm. The power-arm prints an underscore (without stopping the escapement) and closes the trip switch. The closing of the latter disconnects the capacitor 522 from the positive potential source and the capacitor 522 discharges through closed contacts RM–9 and trip relay to ground thereby energizing the trip relay for a period long enough to switch its contacts.

It is thus seen that the trip relay cannot be energized unless the right margin relay is simultaneously energized since capacitor 522 could not discharge with contacts RM–9 in their normal position.

With the energization of the trip relay, holding current is applied thereto from the positive potential supply through now closed contacts trip 5. Also, the trip relay is connected to the plate of relay reset thyratron through now closed trip relay contacts trip 4. The closing of the carriage return actuator relay is energized by current which flows from the positive potential source through closed contacts trip 2, and the carriage return actuator relay to ground. The energization of the carriage-return actuator relay causes the engagement of the carriage-return power arm which moves the carriage back to the first character position. The switching of the contacts of trip 3 disconnects a capacitor 524 from the positive potential source and permits it to discharge, the discharge being applied as a set input to flip-flop FF1, the set output thereof operating the clutch to move the tape forward. Simultaneously, the discharge from capacitor 524 is applied as an input to delay flop DF7. The latter preferably has a relatively long astable period such as about 800 milliseconds to permit approximately 2 inches of tape to pass the read-record head for proper spacing between blockettes thereon. The opening of contacts trip 6 causes the deenergization of the keyboard unlock actuator relay. The recovery pulse of DF7 is applied both as a restore input to flip-flop FF1 thereby causing the disengaging of the clutch and engaging of the brake and as an input to the relay reset thyratron the firing of the latter causing the deenergization of the trip relay and the right margin relay.

*Print Cycle—Normal Printing*

After an initial start signal the tape passes the read-record head until the first character is read. The resulting sprocket pulse from the sprocket head is applied as a set input to delay flop DF1 which recovers in 0.5 millisecond. The recovery output pulse of delay flop DF1 is applied simultaneously as a set input to delay flop DF2 and as an input to delay flop DF2 and as an input to fire one sprocket thyratron, the recovery pulse of delay flop DF1 being applied as a restore input for the flip-flop FF1 causing engagement of the brake and the halting of tape movement. The recovery output pulse of delay flop DF2 also extinguishes the plates of any unfired thyratron in the decoder thyratrons.

Pulses from channels in the device fire associated memory thyratrons among the decoder thyratrons, the outputs therefrom being respectively applied to energize corresponding code slide actuator relays. Simultaneously, the output resulting from the firing of one or more decoder thyratrons is applied as a set input to delay flop DF6. After a delay of about 1.5 milliseconds which is a suitable length for the astable period of this delay flop, the recovery output pulse therefrom is applied as a restore input to flip-flop FF1, which causes disengagement of the clutch and engagement of the brake. Thus tape movement will cease when one of the decoder thyratrons fires or if a code combination is read without a sprocket pulse.

The output of the sprocket thyratron which has been fired by the restore output of delay flop DF1 and the set output of delay flop DF6 (the astable state output) are applied to a gate G1. Gate G1 may suitably be an "and" gate as depicted in FIG. 33. If both signals are present, gate G1 opens and the output pulse therefrom is applied as a set input to delay flop DF5 and as a set input to flip-flop circuit FF3. The set output of delay flop DF5 energizes the code slide actuator relays after a suitable delay (20 milliseconds for the astable state of DF5) and its recovery pulse is applied as a set input to a flip-flop circuit FF2, the set output pulse of which deenergizes the drive bail return actuator relay.

The drive or flipper bail return actuator 221 then permits a spring 222 (FIG. 10) to pivot the drive bail which contacts a sensing or decoding arm 169—170 if one has been selected, driving it downward and operating its associated power arm. This power arm causes the type bar associated with the sensing arm to print. The action of the type bar closes the escapement universal switch EUS, the closing of the latter causing a positive pulse to be applied as an input to delay flop DF4. The set output of DF4 is applied as an input to the plates of the thyratrons in the decoder thyratron circuit and to the plate of the sprocket thyratron extinguishing the latter. The recovery pulse output of delay flop DF4, after a suitable period for its set or astable output (about 5 milliseconds), is applied as a set input to flip-flop FF1 and as a restore input to flip-flop FF3. The set output of flip-flop FF1 causes engagement of the clutch to start the cycle for the next character. If the code for space has been read, no type bar is activated but the escapement is tripped and the escapement universal switch closes initiating the same cycle.

If the drive bail does not contact a sensing arm, the drive bail reaches the bottom of its travel without causing the closing of the escapement universal switch, but does close the drive-bail-action switch. Without the closing of EUS, no positive pulse is provided to restore flip-flop FF3. With the closing of the drive bail action switch, a capacitor 530 is discharged, the discharge being applied as a restore input to flip-flop FF2 and as an input to the resettable delay flop RDF2. The restore output of flip-flop FF2 energizes the drive-bail-return actuator. The restore output of flip-flop FF3, and the recovery output of resettable delay flop RDF2 (after a suitable delay, its astable state being about 200 milliseconds) both being applied to the gate G2, the latter opens. The output of gate G2 steps a binary counter BC1 and also is applied as a restore input to flip-flop FF3, the restore output of which closes gate G2 thereby preventing a repetition of the operation. The stepping of binary counter BC1 causes the shifting of the type basket from one case position to the other by energizing the shift actuator relay and solenoid 160 or deenergizing it if it already has been energized. The stepping of binary counter BC1 also reverses the condition of the upper case and lower case shift actuators.

When the type basket seats in its new position, the contacts of the case shift switch 368 (FIGS. 3 and 3A) are transferred. The latter switching results in the disconnection of capacitors 532 from ground and the connection thereof to a source of negative potential. The capacitor 532 consequentially discharges through the switched contacts of the shift switch to provide an input to a gate G3 which also has applied as an input thereto, the output of sprocket thyratron. If both signals are simultaneously present, gate G3 opens and the output therefrom is applied as an input to delay flop DFS. The set or astable period output of delay flop DF5 energizes the code slide actuator relays. After a suitable interval, about 20 milliseconds, delay flop DF5 recovers and its recovery output is applied as a set input to flip-flop FF2. The output of flip-flop FF2 deenergizes the drive bail return actuator relay which permits the drive bail to operate. Now, if the drive bail encounters a selected sensing arm in the new position, printing occurs in the same manner as previously described. If no sensing arm has been selected, the operation stops, because no further signals can pass through gate G2. If there is no indication of a printer stop or breakpoint stop, it may be assumed that an erroneous character has been read from the tape.

Each time the drive bail is triggered, a set input is applied to resettable delay flop RDF2. However, since the astable or delay time of delay flop RDF2 is chosen to be about 200 milliseconds, any signal provided by the closing of the escapement universal switch via delay flop DF4 and flip-flop FF3 will inhibit gate G2 before the recovery of resettable delay flop RDF2. After any stop, whether caused by a programmed symbol or by an erroneous character, the printing action may be reinitiated by closing the start switch, the discharge of capacitor 536 providing a clear and start signal.

*Programmed Non-Printing Functions—Computer Digit Check*

When in normal printing, a code combination other than a normally printed symbol is decoded, corresponding machine functions are performed such as tabulate, carriage return, space and stop. Two other instructions, breakpoint and ignore, are included in the possible code combinations. According to the setting of the breakpoint switch, the breakpoint instruction symbol may be ignored, or may cause the print operation to stop. The ignore symbol causes the tape to move to the next character, but does not operate a key or space the carriage.

In normal operation, tabulate, carriage return, and space symbols are decoded in the normal fashion, and the selected sensing arms operate the power arms associated with the programmed operation. When the tab sensing-arm is selected, the tab power-arm is activated. The consequent switching of the tab fill–3 switch energizes the tab-lock actuator relay. When the tab blade is struck by the tab stop with a consequent opening of the tab fill–3 switch, the tab lock actuator is deenergized after a delay of about 50 milliseconds, such delay being due to the presence of capacitor 504. When the tab blade drops out, the tab fill–3 switch returns to the normally closed position. This provides a positive pulse as a set input to delay flop DF8. Delay flop DF8 may suitably have an astable or delay period of about 1.5 milliseconds at which point its recovery output is applied as a set input to delay flop DF4. The set output of delay flop DF4 is applied as an input to the plates of the decoder thyratrons thereby clearing, i.e., extinguishing them. The recovery output of delay flop DF4 is applied as a set input to flip-flop FF1, the set output thereof causing the engagement of the clutch to initiate tape movement.

When the carriage-return instruction is read from the tape, the selected sensing-arm operates the carriage-return power-arm. The carriage-return switch, operated by the carriage, closes to provide a restore input from a pulse generator to flip-flop FF3, the restore output of which inhibits gate G2. Thus no signal passes gate G2 and the shift mechanism cannot function. The return of the carriage-return switch to its normally closed position once again places the pulse generator in circuit with delay flop DF9 and a set input is applied thereto. After the astable or delay period of delay flop DF9 which may suitably be about 250 milliseconds (such time is convenient to cover any carriage bouncing time) delay flop DF9 recovers, the recovery output thereof being applied as a set input to delay flop DF4. The set output of delay flop DF4 clears the decoder thyratrons and the recovery output of delay flop DF4 sets flip-flop FF1, the output thereof causing the engagement of the clutch to initiate tape movement.

The coded symbol for "space" is selected to be one which alerts a sensing arm that activates the space power-arm. When the latter is activated, the carriage is moved one character space without printing a character. Simultaneously, the escapement universal switch EUS is closed to provide a positive pulse input to delay flop DF4 through the normally closed contacts of the right margin switch 366. The set output of delay flop DF4 clears the decoder thyratrons and the recovery output of delay flop DF4 is applied as a set input to flip-flop FF1 causing a consequent engagement of the tape drive clutch. The sensing arm, alerted by the "ignore" symbol during normal printing, causes the closing of the ignore switch to permit a capacitor 540 to discharge, the latter discharge providing a set input to delay flop DF8. The recovery output of delay flop DF8 is applied as a set input to delay flop DF4, the set output of which clears the decoder thyratrons, the recovery output of delay flop DF4 being applied as a set input to flip-flop FF1. The set output of flip-flop FF1 of course causes the engagement of the clutch to initiate tape movement.

The printer-stop symbol alerts one of the special sensing arms 233 to close an associated switch such as 237 (FIG. 9). When the latter switches, capacitor 540 is disconnected from the positive potential supply and is permitted to discharge, the discharge being applied as a restore input to flip-flop FF3, the restore output of flip-flop FF3 inhibiting gate G2. It is seen that the printing action in this situation is inhibited since no element is actuated to shift the carriage or print and generate a pulse from the escapement universal switch. With the closing of the switch, the discharge from capacitor 540 is also applied to the grid of the Σ thyratron to fire the latter resulting in the lighting of a print stop neon indicating tube 369 on the control panel P (FIG. 25A).

The breakpoint symbol, depending upon the setting of the selector switch, causes either a "stop" or "ignore" operation. The beta selector switch routes the pulse provided through the discharge of capacitor 540 to the path followed by either the ignore pulse or the stop pulse. If the pulse is routed through the normally closed "ignore" contacts, it fires the beta thyratron resulting in the lighting of a breakpoint stop neon tube 370 on the control panel.

The second mode of print operation is the computer-digit check, which causes the printing of a special symbol for each of the machine function instructions, with carriage return occurring automatically at the end of the blockette. The computer-digit check is initiated by a normal computer-digit switch. In the computer digit position, one contact of the switch energizes a computer-digit slide actuator, so that the printing sensing-arms of the instruction symbols will be alerted. The symbols "*t*" for tab, "caret" for space, "*i*" for ignore, "*r*" for carriage return, and "beta" for breakpoint are printed where the instructions occur. The printer-stop symbol "sigma" causes the print operation to stop so that the printing does not occur automatically. The second contact of the computer digit switch connects the carriage-return actuator to the right-margin switch, so that the movement of the carriage into the 121st position automatically initiates a carriage return operation.

*Verify Cycle—Verification of Normal Characters*

As described previously in connection with the Print Cycle, Normal Printing, after the initial start signal, the tape moves past the read-record head until a pulse is read in one of the information channels, or in the sprocket channel. A pulse read by one of the information channels fires the decoder thyratron associated with that channel. When one or more of the decoder thyratrons are fired, a pulse is generated therefrom which is applied as a set input to delay flop DF6 (FIG. 38). After its astable period of 1.5 milliseconds, delay flop DF6 recovers, the recovery output being applied as a restore input to flip-flop FF1, the restore output of which causes the engagement of the brake. The pulse from the sprocket head is applied as an input to delay flop DF1 which recovers after 0.5 millisecond, its recovery output being applied as a firing input to the sprocket thyratron and as an input to delay flop DF2. The latter recovers after 2 milliseconds, its recovery output being applied as a restore input to flip-flop FF1 (if flip-flop FF1 has not been restored by the output of delay flop DF6). The restore output of flip-flop FF1 both causes engagement of the brake to stop tape movement and also inhibits any unfired decoder thyratron.

The set or astable output of delay flop DF6 and the output of one sprocket thyratron are both applied as inputs to gate G1. If both signals are present, signifying that the code combination contains both a sprocket pulse and a pulse from at least one of the other channels, gate G1 passes a signal which is applied as an input to delay flop DF5 (FIG. 40). Each decoder thyratron, when fired, alerts a code-slide actuator in its associated channel and the set output of delay flop DF5 energizes the alerted actuators. Now, when the code slide actuators have been energized, one sensing arm will be selected provided that (*a*) a proper code combination has been read from the tape, and (*b*) the type basket and the verify lock-bar are in the proper case position. In either situation, the recovery pulse output of delay flop DF5 is applied as a set input to flip-flop FF2, the set output of which energizes the drive bail return actuator relay. Spring tension forces the drive bail down, moving the selected sensing arm part of the distance required to actuate the power arm and as all other sensing arms are inhibited by the verify lock-bar, only the key associated with the selected sensing-arm may be operated. Operation of the proper key causes the escapement universal switch EUS (FIG. 37) to generate a pulse that is applied as a restore input to flip-flop FF2 (FIG. 40). The restore output of flip-flop FF2 energizes the drive-bail-return actuator. The returning drive-bail closes the drive-bail-return switch 1, which causes the pulse generator to discharge a pulse that is applied as a set input to delay flop DF4 (FIG. 38). The set output of delay flop DF4 clears the memory thyratrons. The recovery output of delay flop DF4 is applied as a set input to flip-flop FF1, the set output of flip-flop FF1 resulting in the engagement of the clutch and the initiation of tape movement. The cycle repeats with the reading and decoding of the next character. If the operation stalls on a non-verifiable character, the operator may choose to go on to the next character. The start switch on the control panel P is switched permitting the discharge of the capacitor 530 (FIG. 40) through the normally closed contacts of the drive-bail-return switch, the discharge being applied as a restore input to flip-flop FF2 which energizes the drive-bail-return actuator. The resulting transfer of the drive-bail-return switch energizes the pulse generator, the output of the latter being applied as a set input to delay flop DF4. The restore output of delay flop DF4 (FIG. 38) is applied as a set input to flip-flop FF1, the set output of which causes the engagement of the clutch to initiate tape movement.

*Tab Operation*

During the verify cycle, as described above, the operator, by utilizing the Tab/Fill key and preset tab 1 stops, may skid past sections of the tape without verifying.

The striking of the Tab/Fill key 332 actuates the tab power-arm resulting in a mechanical action similar to that which takes place in the record cycle. The switching of the contacts in the Tab/Fill–3 switch (FIG. 39) causes the application of positive potential to the tab lock actuator relay and the closing of the Tab/Fill–2 switch (FIG. 38) connects the escapement commutator 26 through the normally closed contacts of the advance end-of-tab switch to the set input of flip-flop FF1. As the carriage moves to the left through one digit space, the output of the commutator is applied as a set input to flip-flop FF1 causing the engaging of the clutch 400 to initiate tape movement and drive the tape past the read head.

As the sprocket head reads the first sprocket pulse, the output therefrom is applied as an input to delay flop DF1, which recovers after 0.5 millisecond, the recovery output therefrom being applied as an input to delay flop DF2. Delay flop DF2 recovers after two milliseconds at which time its recovery output is applied as a restore input to flip-flop FF1, the restore output of which causes the engagement of the brake and disengagement of the clutch whereby tape motion is arrested. As the carriage advances another letter space, the commutator brush contacts the next segment, the resulting output being applied as a set input to flip-flop FF1 and the process is repeated.

When the carriage arrives at the character position adjacent the tab stop, the advance end-of-tab switch (FIG. 38) is caused to open, so that the sprocket pulse of the final character to be skipped stops tape movement and one commutator does not set flip-flop FF1 to reinitiate tape movement. The carriage moves on until the tab stop disengages the tabulation mechanism consequently releasing the tab switches. The switching of the Tab/Fill–3 switch to its normal position results in the application of a pulse as an input to delay flop DF8 (FIG. 39). Delay flop DF8 recovers after 15 milliseconds, the recovery pulse output therefrom being applied as a restore input to flip-flop FF2 (FIG. 40) through the normally closed contacts of the drive bail return switch (provided, of course, that the drive bail return actuator is in a deenergized state). The restore output of flip-flop FF2 energizes the drive-bail-return actuator, which returns the drive bail to the rest position. This causes the drive-bail-return switch to transfer and the output of delay flop DF8 is applied to one pulse generator. The output of the pulse generator is applied as a set-input to delay flop DF4 (FIG. 38) provided that the drive-bail-return actuator is energized, the set output of delay flop DF4 clears the sprocket and decoder thyratron, the recovery output of delay flop DF4 being applied as a set input to flip-flop FF1. The set output of flip-flop FF1 (FIG. 38) causes the engagement of the clutch to initiate tape movement and the tape moves forward until the read head encounters the next pulse combination, whereupon the movement stops. The operation of one Tab/Fill–3 switch deenergizes the keyboard-unlock actuator relay preventing the operation of any key during tabulation.

*Print-One-Digit-Operation*

At any point to the left of the right margin, the operator may elect to print out, without verification, the digit held in the memory, i.e., to print a character to see what it is. This operation is accomplished with the use of a print-one-digit key PID on the typewriter keyboard. The striking of this key switches the contacts of the print-one-digit switch (hereafter referred to as the POD switch (FIG. 39)) to permit a capacitor 548 to discharge. The discharge of capacitor 548 energizes the print-one-digit relay and also is applied to binary counter BC1 to step the latter. BC1 is preferably a circuit having one or a plurality of bi-stable devices with a single input. The stepping of BC1 clears to zero and locates the type basket in the lower position.

The energization of the print-one-digit relay results in the following series of events. The closing of contacts POD–5 (FIG. 39) connects the relay to the positive potential source whereby holding current is supplied thereto and the switching of contacts POD–9 (FIG. 37) connects the POD relay to the relay reset thyratron and prevents the reset of the right-margin relay if the 120th digit is printed in a print-one-digit operation.

The contact POD–6 deenergizes the drive bail actuator, thereby permitting full travel by the drive bail, and the ribbon color-change actuator 238 so that the character printed will appear in black (FIG. 12). Likewise contact POD–6 also energizes a verify-bar actuator (not shown) for causing retraction of the verify-lock bar. The latter retraction permits the printing of the character corresponding to the code set up by the code slide actuators.

The switching of contacts POD–3 (FIG. 40) disconnects a capacitor 550 from negative potential, to ground, one consequent discharge providing a restore input to flip-flop FF2, the restore output of the latter energizing the drive bail return actuator to return the drive bail. The discharge from capacitor 550 is also applied as an input to gate G–3 (FIG. 38). The input of gate G–3 is also coupled to the output of sprocket thyratrons so that if the thyratron signal is present, it indicates that the code combination in the memory was accompanied by a sprocket pulse. No signal is at this time supplied from gate G1 since there is no longer any set output from delay flop DF6. In addition, the set output from delay flop DF5 (FIG. 40) is also no longer present so that the code slide actuators are not energized although they remain alerted.

Gate G–3 now passes a pulse which is applied as an input to delay flop DF5. The set output of delay flop DF5 causes the energization of code slide actuators which have been alerted by the decoder thyratron. The recovery output of delay flop DF5 is applied as a set input to flip-flop FF2 which causes the deenergization of the drive-bail-return actuator permitting the drive bail to move. If a character has been selected by the decoding mechanism, and the type basket is in the proper case, the drive bail will contact the selected sensing arm and cause it to operate its associated power-arm. The action of the print bar will close the escapement universal switch EUS and a positive pulse will be applied from the positive potential supply through the closed contacts of EUS and switched contacts POD–7 to the control grid of the relay reset thyratron, firing the latter. A positive pulse will also be applied as a restore input to flip-flop FF2 through the closed contacts of EUS and the drive-bail return switch. The restore output of flip-flop FF2 energizes the drive-bail-return actuator, which returns the drive bail and transfers the drive-bail return switch. The transferring of the latter actuates the pulse generator, the output of which is applied as an input to delay flop DF4. The set output of delay flop DF4 clears the sprocket and decoder thyratron and the recovery output of delay flop DF4 is applied as a set input to flip-flop FF1, the set output of flip-flop FF1 initiating tape movement. The set output of delay flop DF4 (FIG. 38) is also applied as a restore input to flip-flop FF3, the output of which inhibits gate G2.

If the character recorded is in a case opposite to that indicated by the position of the type basket, no sensing arm will be struck by the drive bail when it is driven down. Instead, the drive bail will move to the limit of its travel, thereby closing the drive-bail action switch. When this switch is closed, capacitor 530 (FIG. 40) discharges, the discharge being applied as a restore input to flip-flop FF2, whose restore output energizes the drive-bail return actuator. The discharge from capacitor 530 is also applied to resettable delay flop RDF2. Since there is no signal from delay flop DF4, applied to the restore input of flip-flop FF3, this flip-flop originally set by the output signal from gate G1 remains set, and gate G2 is alerted. The recovery pulse of delay flop RDF2 is applied to gate G2 which opens and the pulse output therefrom steps the binary counter BC1, the output of which energizes the shift actuator and reverses the shift code-slides 176. The output of gate G2 also is applied as a restore input to flip-flop FF3, the restore output of which is applied as an inhibit input to gate G2. In this manner, the series of events occurring to close the drive bail action switch cannot be repeated. The shift actuator shifts the type basket, resulting in the transferring of the shift switch. This transferral permits a capacitor 532 to discharge, the discharge being applied through contacts POD4 as an input to gate G3. Now, if the code combination in the memory was accompanied by a sprocket pulse, the output of the sprocket thyratron would have alerted gate G3. With the application of the discharge capacitor 532 through the shift switch and closed contacts POD4 to gate 3, this gate opens, and the pulse output therefrom is applied as an input to delay flop DF5. The set output of delay flop DF5 energizes the code slide actuators which have been alerted by the memory thyratron. The recovery output of delay flop DF5 is applied as a set input to flip-flop FF2, the output of which deenergizes the drive-bail-return actuator. As a consequence thereof, the drive bail is actuated to print any character in the shift operation and at the limit of its travel, it causes the closing of the drive-bail-action switch (FIG. 40). The closing of this switch permits the discharge of capacitor 530 to be applied to delay flop RDF2, the recovery output of which is applied as an input to gate G2. However, since gate G2 is at this time inhibited by the restore output from flip-flop FF3, gate G2 does not pass a pulse and so there is no further automatic shift-action. If no character is printed after the automatic shift, it may be assumed that a non-existent code combination has been read from the tape.

*Backspace and Correct Operations*

When an erroneous character is found recorded on the tape, the operator may correct it by use of the correct key on the keyboard. If the erroneous character has been detected by a completed print-one-digit operation, it is necessary to backspace before making the correction.

Figure 37:
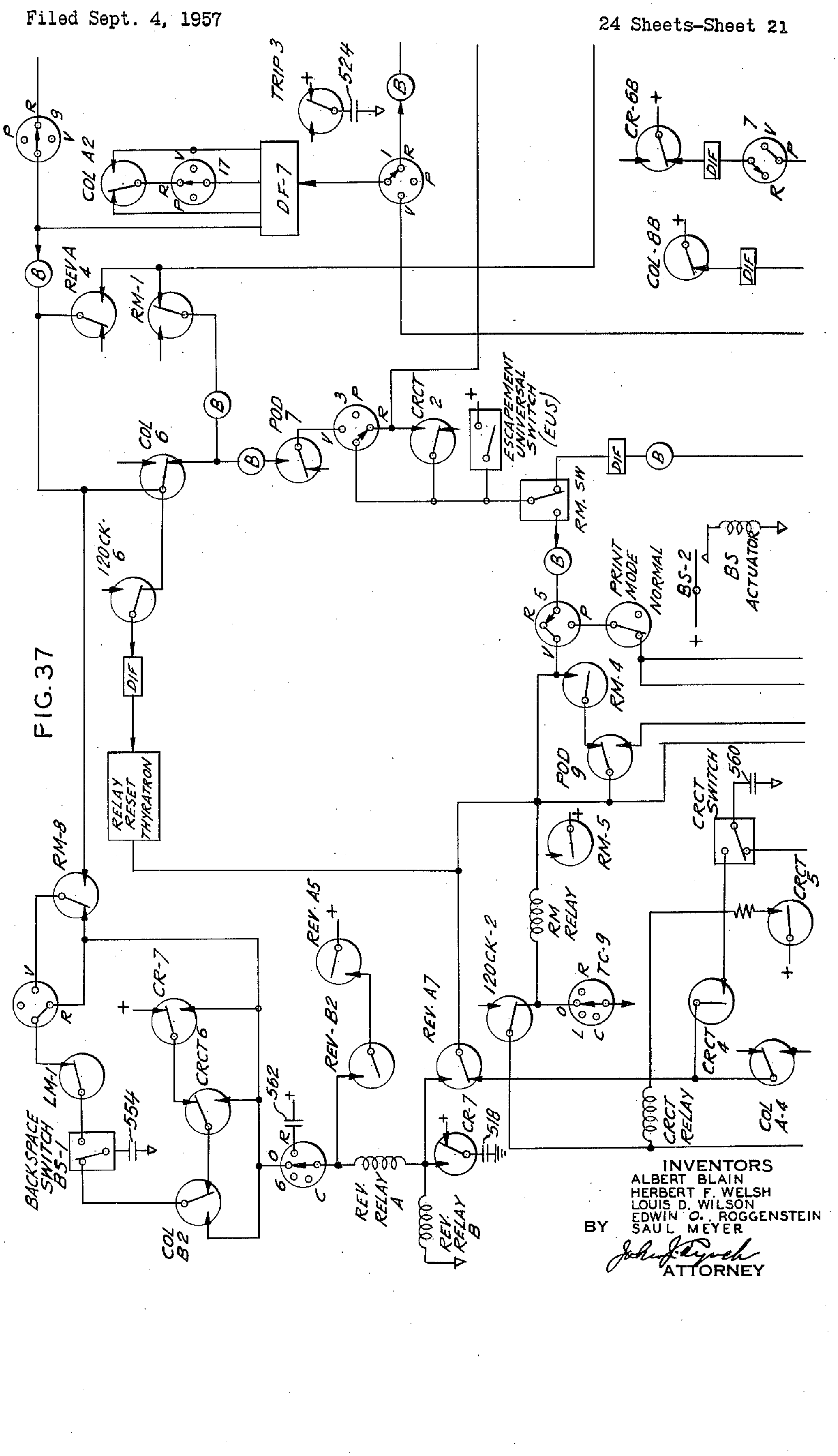

To accomplish the backspace operation, the backspace key 300 is struck to actuate the usual backspace power arm which operates a pendant link 372 that engages backspace switch 371 (FIG. 3) and results in the transfer of backspace switch contacts BS–1 and BS–2 (FIG. 37). With the transferring of switch BS–1 and consequent disconnection of a capacitor 554 from the positive potential supply, capacitor 554 discharges, the discharge being applied through the switched contacts of backspace switch BS–1 and the normally closed contacts of the left margin-relay pole LM–1 to the reverse relays A and B. Although the power arm is in operation, backspace operation cannot occur at the left margin and the margin stop inhibits the mechanical action because the left-margin relay is in an energized state at this time.

With the energization of the reverse relays, contacts REV–A7 (FIG. 37) thereof connect the relays to the relay reset thyratron, contacts REV–A5 and B2 close to connect the relays to the positive potential supply thereby supplying holding current thereto. Switching of certain reverse relay contacts (not shown) reverses the direction of the center drive motor. The switching of contacts REV–A4 (FIG. 37) permits the restore output of flip-flop FF1 to be applied to the relay reset thyratron to fire the latter (even at the right margin position).

The switching of contacts REV–A6 (FIG. 39) disconnects capacitor 512 from the positive potential supply whereby it discharges, the discharge being applied as an input to delay flop DF9 (FIG. 40). After the astable or delay period of DF9 for 250 milliseconds, DF9 recovers, its recovery output being applied as a restore input to flip-flop FF2 through the normally closed contacts of drive bail return switch 1. The restore output of flip-flop FF2 energizes the drive-bail-return actuator to return the drive bail. This movement causes the transferring of drive bail return switch 1 so that the recovery output of delay flop DF9 is applied as an input to the pulse generator. The output of the pulse generator produced in response to this input is applied as an input to delay flop DF4 (FIG. 38). The set output of delay flop DF4 is applied to the plate of the decoder thyratrons to clear them and the recovery output of delay flop DF4, after a delay period of 5 milliseconds, is applied as a set input to flip-flop FF1, the output of which causes the engagement of the clutch to initiate tape movement. Since the motor has been reversed due to the transferring of the contacts of the reverse relays, the tape moves past the head in the reverse direction and the sprocket head reads the pulse in the sprocket channel in the reverse direction. The output from the read-write sprocket channel is applied as an input to delay flop DF1 (FIG. 38) which recovers after 0.5 millisecond, the recovery output of which is applied to delay flop DF2. The recovery output of delay flop DF2, after a delay period of 2 milliseconds, is applied as a restore input to flip-flop FF1, the output of which causes disengagement of the clutch and engagement of the brake to stop tape movement. The restore output of flip-flop FF1 is also applied through contacts REA–A–4 to the relay reset thyratron to fire it whereby this thyratron shunts out the reverse relays and they are deenergized with a consequent switching of the reverse relays to their respective normal positions.

The backspace operation may be used after a print-one-digit operation (or a normal verification, if a change is required). After either print-one-digit or normal verification, the read circuitry reads the next character into the memory. The backspace operation returns the tape to the position following the character to be corrected. No tape-start signal is generated at the end of the backspace operation since the purpose of the operation is to reposition the tape before correction.

The correct operation is adapted to move the tape in juxtaposition with the erroneous character and set up the write circuits for a one-character correction. The correct operation is initiated by the striking of the "correct" key 303 on the keyboard to transfer the contacts of the correct switch. A capacitor 560 is consequently disconnected for the positive potential supply, the discharge thereof being applied to and energizing the correct relay to cause a switching of the correct relay contacts. Thus the closing of contacts CRCT–5 (FIG. 37) connects the correct relay to the positive potential supply whereby holding current is supplied to it. The switching of contacts CRCT–6 disconnects a capacitor 562 from the positive potential supply, the discharge of capacitor 562 energizing the reverse relays to switch their contacts. With the switching of the reverse relay contacts a series of events occurs which results in the reading backwards of another character space, in the same manner as described hereinabove in connection with the backspace operation. The closing of contacts CRCT–4 connects the correct relay to the relay reset thyratron. This connection occurs after the reverse relay is deenergized and is made after contacts REV–A7 return to their normal position. The correct relay remains energized until the next restore output from flip-flop FF1 (FIG. 38) fires the relay reset thyratron (FIG. 37) such firing shunting the correct relay so that it is deenergized.

The transferring of other correct-3 contacts connects a verify bar actuator to the positive potential source whereby it is energized to retract the verify bar. The transferring of these other correct contacts also disconnects the ribbon color change actuator from the positive potential supply so that the character entered by the "correct" operation will be printed in black. Also, when the reverse relays are deenergized so that these contacts assume their normally closed position, the switching of contacts of the correct relay energizes a write relay, converting the channels from reading to recording. The closing of certain other contacts of the correct relay connects the inhibit actuators to the positive potential supply whereby the carriage return, tabulation, and backspace operations are prevented.

When the operator strikes the key corresponding to the proper character, the character is printed on the paper. Simultaneously, the escapement universal switch EUS and the combination of encoding switches, corresponding to the code for the character, are closed. The signal applied through the now closed escapement universal switch EUS and contacts CRCT2 (FIG. 37) is applied as a set input to flip-flop FF1, the set output of which causes the engagement of the clutch to initiate tape movement. The sprocket head begins to read, and as the sprocket pulse of the incorrect character is sensed, the output of the sprocket head is applied as an input to delay flop DF1 (FIG. 38). The open contacts of CRCT1 (open due to the energization of the correct relay) prevent the pulse applied through the escapement universal switch EUS from being applied to delay flop DF4. The set period of delay flop DF1 (0.5 millisecond) permits proper spacing following the preceding character at which time delay flop DF1 recovers, the recovery output being applied as an input to delay flop DF2. The set output of delay flop DF2 energizes the write current generator for the period of its astable output, 2 milliseconds, which is a sufficient time to write the new code combination. The recovery output of delay flop DF2 is applied as a restore input to flip-flop FF1, the restore output of which causes disengagement of the clutch and engagement of the brake. The restore output of flip-flop FF1 also fires the relay-reset thyratron (FIG. 37) causing the shunting and deenergization of the correct relay.

With the deenergization of the correct relay, contacts CRCT–7 assume their normal position. A capacitor 564 which had been charged during the period that the correct relay had been energized now discharges, the discharge being applied as an input to delay flop DF9 (FIG. 40). Delay flop DF9 recovers after 250 milliseconds and its recovery output is applied as an input to delay flop DF4 (FIG. 38) through the now transferred drive bail return switch 1. The set output of delay flop DF4 clears the decoder thyratrons and the recovery output of delay flop DF4 is applied as a set input to flip-flop FF1 to cause engagement of the clutch and initiate tape movement. The next character on the tape is read and normal verification is obtained.

Preparatory to reverification or a change-one-line operation, the operator may initiate a carriage-return operation, which can be made to take place at any point in the blockette except at the left margin.

To effect a carriage return, the carriage-return key 300 on the keyboard is struck. This causes engagement of the carriage-return clutch to effect the return of the carriage and close the carriage-return switch CR SW2 (FIG. 39). The switching of contacts of this switch disconnects capacitor 514 from the positive potential supply, permitting the capacitor to discharge. This discharge is applied through the normally closed contacts LM–3 of the left margin relay to the carriage return relay whereby it is energized. With the energization of the latter, it is connected through now closed contacts CR–4 to the plate of one relay reset thyratron and to the positive potential supply whereby holding current is supplied to it through switched contacts CR–6. The transferring of contacts CR–3 connects the sprocket head to the input of the resettable delay flop RDF1. The transferring of contacts CR–7 disconnects capacitor 362 from the positive potential supply, the capacitor discharging to ground through the reverse relays whereby the latter is actuated to switch its contacts. Accordingly, the positive potential supply is connected to the reverse relays whereby they are supplied with holding current through the closed contacts REV–A–5 and B–2 and the relay reset thyratron is connected to the reverse relays through transferred contacts REV–A7.

The transferring of contacts REV–A3 deenergizes the keyboard unlock actuator preventing operation of the keyboard during the carriage return operation. The transferring of contacts REV–A6 disconnects capacitor 512 from the positive potential supply permitting it to discharge, the discharge being applied as an input to delay flop DF9. The energization of the reverse relays, having caused the reversal of direction of the center drive motor, the delay or astable period of delay flop DF9 permits the motor to reverse. The recovery output of delay flop DF9 is applied as a restore input to the flip-flop FF2 through the normally closed contacts of the drive-bail-return switch. The restore output of flip-flop FF2 energizes the drive-bail-return actuator permitting the drive bail to operate the drive-bail-return switch.

With the transferring of the drive-bail-return switch, the recovery output of DF9 is applied to the pulse generator which in response thereto provides an output which is applied as an input to delay flop DF4 (FIG. 38). The set output of delay flop DF4 clears the decoder thyratrons, and its recovery output is applied as a set input to flip-flop FF1, the output of which causes engagement of the clutch to initiate tape movement. Consequently, the tape is driven backward across the head. The head reads the sprocket pulses, the pulses from sprocket being applied as an input to resettable delay flop RDF1. As long as pulses continue to be read from the tape, RDF1 remains set, i.e., in its astable state.

When the beginning of the blockette is reached, the tape continues to move past the head for approximately two digit spaces, at which time resettable delay flop RDF1 recovers. The recovery output of RDF1 is applied as a restore input to flip-flop FF1, the restore output thereof causing the disengagement of the clutch and engagement of the brake, the restore output of flip-flop FF1 also firing the relay reset thyratron. The firing of the latter shunts and consequently causes the deenergization of the reverse relays and the carriage-return relay respectively.

With the deenergization of the carriage-return relay and the resulting return of the contacts thereof to their respective normal positions, voltage from the positive potential supply is applied as an input to delay flop DF9 (FIG. 40). The deenergization of the reversal relay switches the direction of the central drive motor and the delay time of delay flop DF9 permits the motor to return to forward operation. The recovery pulse output of delay flop DF9 is applied through the normally closed contacts of the drive-bail-return switch 1 as a restore input to flip-flop FF2, the restore output of which actuates the drive-bail-return actuator with a consequent operation of the drive-bail-return switch 1. The recovery output is now applied through the transferred drive bail return switch to the pulse generator which in response thereto, provides an input to delay flop DF4. The set output of the delay flop DF4 clears the decoder thyratrons and the recovery output thereof is applied through the normally closed contacts of the change-one-line (COL) switch COL–B1 as a set input to flip-flop FF1 to cause engagement of the clutch and initiate tape movement. The tape now passes the head in the forward direction until the first information pulse of the blockette is read to the memory. When one of the decoder thyratrons is fired, a signal therefrom is applied as an input to delay flop DF6 (FIG 38), the recovery output of which is applied as a restore input to flip-flop FF1, the output of which causes disengagement of the clutch, engagement of the brake and a consequent halt to tape movement. If no information pulse is read, the first sprocket pulse sets delay flop DF1 which recovers after 0.5 millisecond to set delay flop DF2. The latter recovers after 2 milliseconds to provide a restore input to flip-flop FF1, and consequently stops tape movement. At this point, the line may be reverified or it may be changed entirely.

When the carriage is located at the left margin, the change-one-line switches may be closed by the operator, which permits the discharge of a capacitor 570 to energize the change-one-line relays. The consequent switching of the COL contacts results in the following sequence of events. The positive potential supply is connected to ground through COL relays (FIG. 39) so that holding current is applied thereto. With the closing of contacts COL–B5, holding current is supplied to the COL–B relay and COL–A relay is connected to the relay reset thyratron through now closed contacts COL–B4. The switching of the contacts COL–B2 permits the discharge of capacitor 502 through the reverse relays thereby energizing them with a consequent closing of the reverse relay contacts. Thus, now closed contacts REV A5 (FIG. 37) and REV B2 connect the reverse relays to the positive potential supply whereby holding current is provided therefor, and switched contact REV A7 connects the reverse relay A to the reset thyratron whereby the direction of the center drive motor is reversed.

With the switching of contacts REV A6, capacitor 512 discharges, the discharge being applied as an input to delay flop DF9, the recovery output therefrom being applied through the closed contacts of the drive-bail-return switch 1 (FIG. 40) as a restore input to flip-flop FF2.

The recovery output of the latter energizes the drive bail return actuator. During the 250 milliseconds astable period of delay flop DF9, the motor has been given sufficient time to reverse. Energization of the drive-bail-return actuator causes the drive-bail-return switch to transfer, whereby the recovery output of delay flop DF9 is applied as an input to the pulse generator. In response thereto, the pulse generator provides a pulse input to delay flop DF4. The set output of delay flop DF4 clears the decoder thyratrons and its recovery output is applied as a set input to flip-flop FF1, the output of which causes the engagement of the clutch for reverse tape-movement to erase the first character of the blockette.

As the tape passes the head, the sprocket pulse, in response to the first character, is applied through contacts CR3 to delay flop DF1 which recovers after 0.5 millisecond, the recovery output therefrom being applied as an input to delay flop DF2 (FIG. 38) which recovers after 2 milliseconds at which time its recovery output is applied as a restore input to flip-flop FF1 to cause engagement of the brake thereby halting tape movement and to fire the relay-reset thyratron. The firing of the latter causes the dropping out of reverse relays via the now closed contacts REV A4 (COL A6 is open) and the dropping out of COL B relay. The transferring of contacts COL–A3 has energized the function selector-switch stepping actuator and rotated the switch to the record position. The transferring of contacts such as COL A–9 cause the bypassing of the reel-safety-ring switches to permit the recording of the tape despite the safety ring. The opening of other COL relay contacts causes the deenergization of the erase head and the transferring of contacts COL A6 opens the input line of the relay reset thyratron from flip-flop FF1 so that stop signals do not fire the thyratron. In the record position, the operator replaces the erroneous blockette with the proper information.

All of the operations of the record cycle are available in the change-one-line operation. When the newly recorded blockette is satisfactory, the operator strikes the key 302 on the keyboard to initiate the trip operation of the record cycle. The transferring of contacts Trip–3 (FIG. 37) disconnects capacitor 524 from the positive potential supply permitting it to discharge, the latter being applied as an input to delay flop DF7 and also as a set input to flip-flop FF1, the output of which causes engagement of the clutch to initiate tape movement. During the set or delay time of delay flop DF7, erase current passes through the coils of the record head. At the end of this delay period, the recovery pulse of delay flop DF7 is applied as a restore input to flip-flop FF1 and also fires the relay reset thyratron to cause the deenergization of the COL A relay (FIG. 39). Accordingly, the contacts of the COL A relay return to their normal respective positions whereby the function selector is caused to step to the verify position. When COL 8B (FIG. 37) returns to its normally closed position, a pulse is applied as a set input to flip-flop FF1, the set output of which initiates tape movement and the tape passes the head which now reads, searching for the character of the next blockette.

*120 Check; Trip Operation*

After verifying a blockette of information, the operator advances the tape and returns the carriage with the trip operation. When the 120th character of a blockette is verified, and the carriage reaches the right margin, thereby closing the right margin switch and the escapement universal switch EUS (FIG. 37) positive voltage is applied to the right margin relay. The consequent energization of the latter causes the switching of the right margin relay contacts. Thus, holding current is supplied to the right margin relay, through closed contacts RM5, and it is connected to the relay reset thyratron through closed contacts RM4.

When the carriage is stopped at the right margin, the operator advances the tape and repositions the carriage by striking the "Trip" key 302 on the keyboard. This switches the contacts of the trip switch whereby the trip relay is energized by the discharge of capacitor 522 (FIG. 39) through now closed contacts RM–9. As a result thereof, holding current is provided for the trip relay through contacts trip–5 and the relay is connected to the relay reset thyratron through contacts trip–4 and the contacts trip–6 are transferred (the keyboard unlock actuator has already been deenergized due to opening of contacts RM–7). The transferring of contacts trip–2 completes a circuit from the positive potential source through the carriage return actuator to ground, whereby it is energized, the energized carriage return actuator performing the same mechanical function as the carriage-return-power arm, i.e., the engagement of the carriage return clutch. The transferring of contacts trip–3 permits the discharge of capacitor 524, this discharge being applied as a restore input to flip-flop FF2 through the now closed contacts of the drive-bail-return switch and as an input to delay flop DF7. The restore output of flip-flop FF2 energizes the drive bail actuator to return the drive bail whereby the drive-bail-return switch is transferred and an input is applied to the pulse generator. The output of the pulse generator in response to this input is applied to delay flop DF4 (FIG. 38). The set output of delay flop DF4 clears the decoder thyratrons and its necessary output is applied as a set input to flip-flop FF1 through now transferred contacts trip–7. The set output of flip-flop FF1 causes engagement of the tape drive clutch to initiate tape movement and after a delay determined by the period of delay flop DF7 (FIG. 37), the recovery pulse of delay flop DF7 fires the relay reset thyratron with the resulting dropping out of the trip and right-margin relays.

As the tape continues to move until the first character of the next blockette is read into the memory, the read circuits halt tape movement. If the blockette contains fewer than the required 120 digits, the 120 check deactivates the normally operable controls and signals the operator, who must rewind the tape, using the 120-rewind switch on the control panel. Except during a time when the right-margin relay is energized, each recovery pulse of delay flop DF4, in addition to setting flip-flop FF1 to cause engagement of the tape-drive clutch, is also applied as an input to resettable delay flop RDF1 (FIG. 38). The delay time of RDF1 is suitably chosen to be about 40 milliseconds, the time required for the tape to move six digit spaces. If no pulse is read in the sprocket channel before delay flop RDF1 recovers, at the end of its delay period its recovery pulse is applied as a restore input to flip-flop FF1, the restore output of the latter causing disengagement of the tape drive clutch and engagement of the brake to stop tape movement. In addition, simultaneously, the recovery output of resettable delay flop RDF1 fires the 120 check thyratron through normally closed contacts RM–6. The output of the 120-check thyratron energizes the 120-check relay and a 120 check neon on the control panel through normally closed contacts RM–2. The effect of the 120-check relay is to make operation of the normally used keys and controls impossible and to require the operation of 120-rewind switch.

When the 120-check relay is energized, the following events occur. The keyboard unlock actuator is deenergized due to the opening of contacts 120*ck*–1. The transferring of contacts 120*ck*–2 opens the common ground return for, and thereby deenergizes, the right margin, print-one-digit, change-one-line, carriage-return, and the correct and trip relays. The closing of the 120 check relay contacts also completes a circuit from the positive potential supply to ground, energizing the inhibit actuator thereby deenergizing the carriage-return, fill and backspace keys. The transferring of contacts 120–6 open circuits the relay reset thyratron (FIG. 37) and the opening of contacts 120–8 prevents the start signal from being applied to delay flop DF4.

Since a rewind follows discovery of a 120 error on the tape, the carriage must return to the left margin to satisfy the interlock of the tape-cycle switch. The transferring of contacts 120*ck*–7 completes a circuit from the positive potential supply to ground through the carriage return actuator thereby energizing it whereby a carriage return is effected. The transferring of the contacts of the 120-check relay, switches control of a tape cycle switch stepping actuator to the 120-rewind switch so that when the operator closes the 120-rewind switch, the tape cycle switch indexes to the rewind position and a rewind operation begins. The opening of contacts 120 Rewind Switch 1 disconnects the 120 check relay from the positive potential source thereby deenergizing it and simultaneously extinguishes the 120-check thyratron. If a code combination is read from the tape during the set time of delay flop DF7 (FIG. 37), the recovery output of either delay flop DF6 (FIG. 38) or delay flop DF2 is applied as a restore input to flip-flop FF1 to stop tape movement and also is applied to fire the 120 check thyratron via the normally closed contacts RM–6. The output of the 120-check thyratron energizes the 120-check relay and is applied to light the 120 neon on the control panel through closed contacts RM–2. The effect of the 120-check relay in a greater than 120 error is the same as in a less than 120 error except that the carriage is already returned by the trip operation.

It is to be understood that the form of our invention, herewith shown and described, is to be taken as a preferred example of the same, and that various changes in the shape, size and arrangement of the parts may be resorted to, without departing from the spirit of our invention, or the scope of the subjoined claims.

What is claimed is:

1. The combination with the key mechanism of a writing machine; of data decoding means including magnets for receiving impulses from a data circuit, serrated plates adjustable by said magnets, movable decoding arms for lateral swinging engagement with the serrations of said plates for operating the key mechanism in accordance with the adjustment of said plates, and means controlling the operation of said decoding arms in accordance with the lateral swinging movement thereof as determined by said plates.

2. The combination with the key mechanism of a writing machine; of data decoding means including magnets for receiving impulses from a data circuit, serrated plates adjustable by said magnets, stop means, and pivoted decoding arms for lateral engagement with the serrations of said plates to avoid said stop means and movable by the key mechanism in accordance with the adjustment of said plates.

3. The combination with the key mechanism of a writing machine; of data decoding means including magnets for receiving data impulses from a circuit, serrated plates shiftable by said magnets, and upper and lower case decoding arms for lateral swinging engagement with the serrations of said plates; means for moving said arms to actuate the key mechanism in accordance with the lateral swinging movement of said arms and the adjustment of said plates, movable stop means blocking operation of said key mechanism by arms corresponding to one case, and means controlled by movement of said stop means for shifting the latter for blocking the operation of arms corresponding to another case.

4. The combination with the key and case shift mechanisms of a writing machine; of data decoding means including magnets for receiving impulses from a data circuit, code plates adjustable by said magnets, decoding arms connected to upper and lower case keys of said key mechanism and adapted for engagement with said plates, means for moving said arms to actuate the key mechanism in accordance with the adjustment of said plates, means for detecting operation of the decoding arms corresponding to one case and means controlled by said detecting means for operating said case shift mechanism.

5. The combination with the key and case shift mechanisms of a writing machine; of data encoding means, data decoding means, said means each including a group of code plates shiftable to upper and lower case positions, arms extending from the upper and lower case keys of the key mechanism and adapted for engagement with each group of plates, means for detecting operation of some of said arms corresponding to one case, means controlled by the case shift mechanism for adjusting said encoding means, means controlled by said encoding means for adjusting said decoding means, and means controlled by said detecting means for operating said case shift mechanism.

6. The combination with the printing key and case shift mechanisms of a writing machine; of data decoding means including data circuit pulse means, serrated code plates adjusted by said pulse means, stop means, and decoding arms connected to the keys of said key mechanism and pivotally aligned with said stop means and one of said arms being adapted to engage the serrations of said code plates for movement out of range of said stop means and be movable by manual operation of one of the keys of said key mechanism to activate the latter when the adjustment of said plates, by said pulse means, coincides with the character corresponding to said manually operated key.

7. The combination with the printing key and case shift mechanisms of a writing machine; of data decoding means including magnets for receiving impulses from a data circuit, serrated plates adjustable by said magnets, upper and lower case decoding arms for engagement with the serrations of said plates and individually movable by the keys of the printing mechanism in accordance with the adjustment of said plates, movable stop means shiftable for blocking operation of the arms of one case, and means controlled by movement of said stop means for initiating an operation of said case shift mechanism and for shifting said stop means for blocking operation of the arms of another case.

8. In a machine for recording data from code designations thereof including a data circuit; code means including longitudinally movable slides arranged in superposed relation and each having an elongated median opening therein defining opposed edges serrated in code form; means included in said circuit for adjusting said slides to position serrations thereof in accordance with code pulses received from said circuit; pendant arms extending through said openings and biased for lateral movement in opposite directions; means for moving the arms downwardly that, in lateral movement, have sensed positioned serrations; and means operated by the downward movement of the arms for printing characters corresponding to said positioned serrations.

9. In a machine for printing data on a work sheet and simultaneously recording said data on a tape including a tape recording and reading circuit; a typewriter mechanism including type bars presenting upper and lower type characters; keyboard controlled means for operating said type bars in printing action; a unit included in said circuit for encoding the data being printed and being operable by said type bar operating means for pulsing said circuit; a unit for decoding the data and actuating said type bar operating means under control of said circuit; case shift means; and means controlled by said shift means for conditioning the encoding unit and the decoding unit in accordance with said case shift.

10. In a machine for recording data from code designations thereof including a data circuit; code means including movable slides arranged in superposed relation and each having an elongated median opening therein defining opposed edges serrated in code form; means included in said circuit for adjusting said slides to position serrations thereof in accordance with code pulses received from said circuit; pairs of pendant arms extending through said openings, the arms of each pair being biased for lateral movement in opposite directions; means for moving the arms downwardly that, in lateral movement, have sensed positioned serrations; and means operated by the downward movement of the arms for printing characters and controlling machine operations in accordance with said sensed serrations.

11. In a machine of the character described; a work sheet supporting platen; a type bar carrier mounted for case shift adjustment with respect to said platen; case shift key means; coacting means for yieldably resisting movement of said carrier in one direction including a lift spring and a spring biased lift arm associated with said carrier; plate means pivoted on said carrier and having a demountable pin and notch connection with said lift arm; decoding means including a case adjusting shift link connected to said carrier; and means actuated by said case shift key means for dismounting said plate from said lift arm to overcome the resistance of the latter to adjustment of said carrier and to case adjustment of the decoding means through said shift link.

12. In an apparatus for entering data on a record and recording code designations of said data on a tape; means for feeding said record; means for feeding said tape; key means for effecting entry of data on the record and controlling the operation of said record feeding means; data encoding means; data decoding means; means for operatively connecting the key means with the encoding means; means for operatively connecting the key means and the decoding means; and means for operatively connecting said encoding means and said decoding means.

13. In a machine of the character described, the combination with a typewriter having a movable work sheet supporting carriage, mechanism for printing on said sheet and escapement means controlled by said mechanism for governing the movement of said carriage; of a tape feeding means; circuit means including tape reading means and means for decoding the data read from the tape; means extending through said decoding means for operating said printing mechanism; and make and break means in said circuit connected to said escapement means and actuated by the movement of said carriage for controlling the operation of said decoding means.

14. The combination set forth in claim 4 in which said key mechanism is adapted for printing data on a work sheet in original and in verified form; keyboard means for conditioning the operation of said key mechanism for selectively printing in each of said forms; a multi-colored ribbon mechanism for causing the printing of said original and verified forms in different colors; and means controlled by said key mechanism conditioning means for adjusting the ribbon mechanism accordingly.

15. In a machine of the character described, ball lock means, data printing key means including arms engaging said ball lock means to limit manual operation of said key means to successive printing action, means for converting manual operation of the keys to mechanical control thereof and means controlled by said converting means for moving the ball lock means out of range of said key arms.

16. In a typewriter having a power roll, type bars, key controlled mechanisms each including a cam roller for engagement with the power roll for operating each type bar and a detent means for releasing the cam roller for operating; that improvement which includes a ball unit common to all of said detent means, lock means adapted to be positioned and held by said detent means between balls of said unit for blocking cam roller releasing movement of the detent means of other mechanisms, and means for moving said ball unit out of range of said lock means.

17. The combination defined in claim 1 wherein said data decoding means comprises means adapted to selectively condition said machine to translate said impulses back to said data.

18. The combination defined in claim 1 wherein said data decoding means comprises means adapted to selectively condition said machine to translate said impulses back to said data, means responsive to said conditioning means for providing a chosen group of electrical signals representing a given datum and means responsive to said group of electrical signals for effecting the printing of said datum.

19. The combination defined in claim 1 wherein said data decoding means comprises means adapted to selectively condition said machine to translate said impulses back to said data, means responsive to said conditioning means for providing a chosen group of electrical signals representing a given datum, and means adapted for conditioning said machine to effect a comparison of said given datum with a second datum.

20. The combination defined in claim 1 wherein said data decoding means further comprises means responsive to said conditioning means and adapted for effecting data comparison in accordance with predetermined settings on said machine.

21. The combination defined in claim 1 wherein said data decoding means comprises means adapted to selectively condition said machine to translate said impulses back to said data, means responsive to said conditioning means for providing a chosen group of electrical signals representing a given datum and means adapted for conditioning said machine to effect printing only of said given datum.

22. The combination defined in claim 1 wherein said data decoding means comprises means adapted to selectively condition said machine to translate said impulses back to said data and means responsive to said conditioning means and adapted to permit correction of a chosen group of said signals which represent an incorrect datum.

23. The combination defined in claim 1 wherein said data decoding means comprises means adapted to selectively condition said machine to translate said impulses back to said data and means responsive to said conditioning means and adapted to permit correction of a chosen group of data.

24. The combination defined in claim 5 wherein said data encoding means comprises means for selectively conditioning said machine to provide respective chosen groups of electrical signals for given data and means for recording said groups of signals.

25. The combination defined in claim 5 wherein said data encoding means comprises means for selectively conditioning said machine to provide respective chosen groups of electrical signals for given data, means for recording said groups of signals, and means responsive to said conditioning means for effecting movement of said recording means.

26. The combination set forth in claim 14 in which said ribbon mechanism is automatically adjusted to vary the color of the typing in original and in verified form.

27. An apparatus for printing characters on a work sheet and recording code designations thereof on a record tape and for printing characters on the work sheet from recorded code designations read from the tape, including a circuit, a movable platen carriage for holding the work sheet, key means operable to effect character printing on the work sheet during said recording, said key means being also operable to effect character printing on the work sheet when the character of the key means being operated corresponds to the code designation read from the tape, means for controlling movement of the carriage in tabulating operations when the code designations are being recorded and means for disabling said carriage moving control means when the key means are operable to effect character printing on the work sheet under control of said code designations.

28. An apparatus of the character set forth in claim 27 in which the means for controlling the movement of the carriage in tabulating and the disabling means therefor include an escapement wheel holding dog, a slide plate for disengaging the dog from the wheel, a key controlled rocker bail for moving said slide to disengage the dog, and means for moving the slide out of operating range of said bail.

29. In an apparatus for printing characters on a work sheet and recording code designations thereof on a record tape including a circuit; a movable platen carriage for holding the work sheet; key means operable on the work sheet; means in the circuit controlled by the operation of said key means for recording the code designations on the tape; means controlled by the operation of said key means for moving the carriage past the printing means, said carriage moving means including a tabulating mechanism; clutch means included in said circuit for moving the tape in synchronism with the movement of said carriage; and means for automatically recording fill-in character on the tape during a tabulating operation.

References Cited in the file of this patent

UNITED STATES PATENTS

| | | |
|---|---|---|
| 1,606,126 | Houston | Nov. 9, 1926 |
| 2,240,562 | Lake et al. | May 6, 1941 |
| 2,247,275 | Buckley | June 24, 1941 |
| 2,315,723 | Mills | Apr. 6, 1943 |
| 2,453,781 | Chisholm | Nov. 16, 1948 |
| 2,700,446 | Blodgett | Jan. 25, 1955 |
| 2,747,718 | May | May 29, 1956 |
| 2,774,056 | Stafford | Dec. 11, 1956 |
| 2,785,388 | McWhirter | Mar. 12, 1957 |
| 2,827,623 | Ainsworth | Mar. 18, 1958 |
| 2,871,289 | Cox | Jan. 27, 1959 |

FOREIGN PATENTS

| | | |
|---|---|---|
| 1,149,678 | France | July 22, 1957 |